US012306561B2

(12) United States Patent
Nomura et al.

(10) Patent No.: US 12,306,561 B2
(45) Date of Patent: May 20, 2025

(54) IMAGE FORMING APPARATUS AND IMAGE HEATING APPARATUS

(71) Applicant: CANON KABUSHIKI KAISHA, Tokyo (JP)

(72) Inventors: Takashi Nomura, Susono (JP); Atsushi Iwasaki, Susono (JP); Takahiro Uchiyama, Mishima (JP); Keisuke Mochizuki, Suntou-gun (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/885,788

(22) Filed: Aug. 11, 2022

(65) Prior Publication Data

US 2022/0382189 A1 Dec. 1, 2022

Related U.S. Application Data

(63) Continuation of application No. 17/128,596, filed on Dec. 21, 2020, now Pat. No. 11,448,986, which is a (Continued)

(30) Foreign Application Priority Data

Jul. 1, 2016 (JP) ................................ 2016-131594
Jul. 1, 2016 (JP) ................................ 2016-131620

(51) Int. Cl.
*G03G 15/20* (2006.01)

(52) U.S. Cl.
CPC ..... *G03G 15/2039* (2013.01); *G03G 15/2017* (2013.01); *G03G 15/2042* (2013.01);

(Continued)

(58) Field of Classification Search
CPC ............ G03G 15/205; G03G 15/2017; G03G 15/2039; G03G 15/2042; G03G 15/2046; G03G 15/2053
See application file for complete search history.

(56) References Cited

U.S. PATENT DOCUMENTS 7,193,181 B2 3/2007 Makihira et al.
7,283,145 B2 10/2007 Kato et al.

(Continued)

FOREIGN PATENT DOCUMENTS

JP H06-95540 A 4/1994
JP 2013-041118 A 2/2013

(Continued)

OTHER PUBLICATIONS

Japanese Office Action issued May 26, 2020 in counterpart Japanese Patent Application No. 2016-131620.

(Continued)

*Primary Examiner* — Thomas S Giampaolo, II
(74) *Attorney, Agent, or Firm* — Venable LLP

(57) ABSTRACT

Provided is an image heating apparatus including: a heater having a plurality of heating elements arranged in a direction orthogonal to a conveying direction of the recording material; and a control portion that controls electric power to be supplied to the plurality of heating elements and is capable of individually controlling the plurality of heating elements, the image heating apparatus heating an image formed on the recording material with heat by the heater, wherein the control portion sets a heating condition when controlling each of the plurality of heating elements, according to the thermal history of a heating region heated by one heating element and the thermal history of a heating region heated by a heating element adjacent to the one heating element.

1 Claim, 31 Drawing Sheets

Related U.S. Application Data continuation of application No. 16/415,801, filed on May 17, 2019, now Pat. No. 10,901,349, which is a continuation of application No. 16/052,925, filed on Aug. 2, 2018, now Pat. No. 10,338,505, which is a continuation of application No. 15/631,394, filed on Jun. 23, 2017, now Pat. No. 10,054,882.

(52) U.S. Cl.
CPC ..... *G03G 15/2053* (2013.01); *G03G 15/2028* (2013.01); *G03G 15/205* (2013.01); *G03G 2215/2035* (2013.01)

(56) References Cited

U.S. PATENT DOCUMENTS

| | | | |
|---|---|---|---|
| 7,599,637 | B2 | 10/2009 | Nanataki et al. |
| 7,865,102 | B2 | 1/2011 | Nanataki et al. |
| 9,091,974 | B2 | 7/2015 | Yoshioka et al. |
| 9,304,454 | B2 | 4/2016 | Sugnuma et al. |
| 9,335,709 | B2 | 5/2016 | Iwasaki et al. |
| 9,377,727 | B2 | 6/2016 | Yoshioka et al. |
| 9,389,553 | B2 | 7/2016 | Yamamoto et al. |
| 9,568,867 | B2 | 2/2017 | Yoshioka et al. |
| 9,665,048 | B2 | 5/2017 | Iwasaki et al. |
| 9,989,900 | B2 | 6/2018 | Yoshioka et al. |
| 10,054,882 | B2 | 8/2018 | Nomura et al. |
| 10,114,318 | B2 | 10/2018 | Sako et al. |
| 10,185,258 | B2 | 1/2019 | Sako et al. |
| 10,228,641 | B2 | 3/2019 | Takagi |
| 10,268,144 | B2 | 4/2019 | Iwasaki |
| 10,338,505 | B2 | 7/2019 | Nomura et al. |
| 2004/0190924 | A1 | 9/2004 | Iwasaki et al. |
| 2012/0122049 | A1* | 5/2012 | Kanamori ............... F24V 99/00 432/92 |
| 2014/0226999 | A1 | 8/2014 | Kishi |
| 2015/0050038 | A1 | 2/2015 | Suganuma et al. |
| 2015/0286174 | A1 | 10/2015 | Yamamoto et al. |
| 2015/0331372 | A1 | 11/2015 | Takagi |
| 2018/0004135 | A1 | 1/2018 | Sako et al. |
| 2018/0004136 | A1 | 1/2018 | Iwasaki |
| 2018/0032008 | A1 | 2/2018 | Sako et al. |
| 2018/0210380 | A1 | 7/2018 | Uchiyama et al. |
| 2018/0267442 | A1 | 9/2018 | Yoshioka et al. |
| 2018/0341202 | A1 | 11/2018 | Nomura et al. |

FOREIGN PATENT DOCUMENTS

| | | | |
|---|---|---|---|
| JP | 2014-153505 | A | 8/2014 |
| JP | 2014-153506 | A | 8/2014 |
| JP | 2015-014645 | A | 1/2015 |
| JP | 2015-036771 | A | 2/2015 |
| JP | 2015-125165 | A | 7/2015 |
| JP | 2015-176010 | A | 10/2015 |
| JP | 2015-197653 | A | 11/2015 |
| JP | 2016-114914 | A | 6/2016 |
| JP | 2018-004943 | A | 1/2018 |

OTHER PUBLICATIONS

Japanese Office Action issued May 26, 2020 in counterpart Japanese Patent Application No. 2016-131594.

Japanese Office Action issued on Dec. 21, 2021 in counterpart Japanese Patent Appln. No. 2021-008129.

* cited by examiner

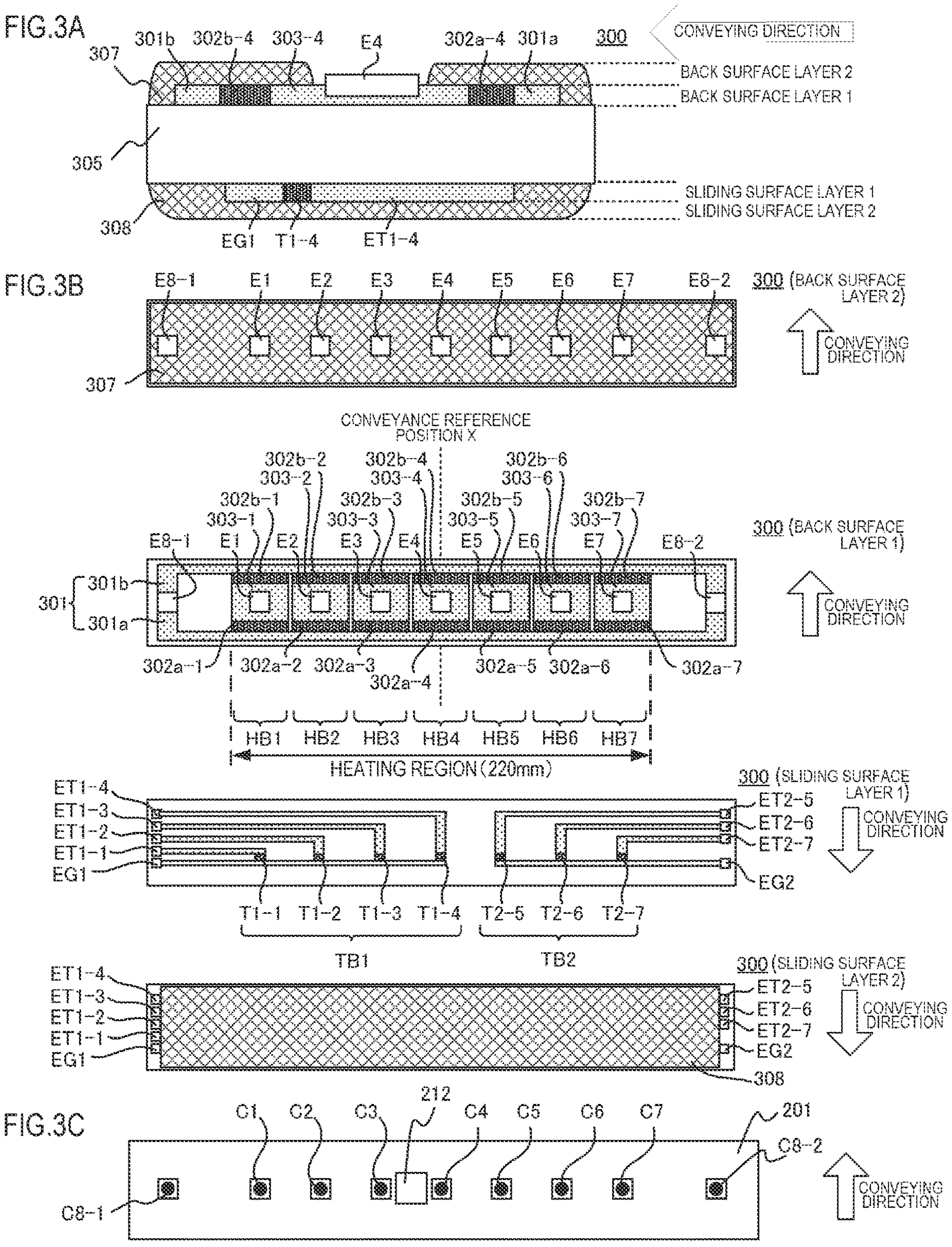
FIG.3A
307
301b
302b-4
303-4
E4
302a-4
301a
300
CONVEYING DIRECTION
BACK SURFACE LAYER 2
BACK SURFACE LAYER 1
305
SLIDING SURFACE LAYER 1
SLIDING SURFACE LAYER 2
308
EG1
T1-4
ET1-4
FIG.3B
E8-1 E1 E2 E3 E4 E5 E6 E7 E8-2
300 (BACK SURFACE LAYER 2)
CONVEYING DIRECTION
307
CONVEYANCE REFERENCE POSITION X
302b-2 302b-4 302b-6
303-2 303-4 303-6
302b-1 302b-3 302b-5 302b-7
303-1 303-3 303-5 303-7
300 (BACK SURFACE LAYER 1)
301 301b 301a
302a-1 302a-2 302a-3 302a-4 302a-5 302a-6 302a-7
HB1 HB2 HB3 HB4 HB5 HB6 HB7
HEATING REGION (220mm)
300 (SLIDING SURFACE LAYER 1)
ET1-4 ET1-3 ET1-2 ET1-1 EG1
ET2-5 ET2-6 ET2-7 EG2
T1-1 T1-2 T1-3 T1-4 T2-5 T2-6 T2-7
TB1 TB2
300 (SLIDING SURFACE LAYER 2)
308
FIG.3C
C1 C2 C3 212 C4 C5 C6 C7
201
C8-2
C8-1

FIG.7

| $D_{MAX}(i)$ (%) | $FT_i$ (°C) |
|---|---|
| $200 \leqq D_{MAX} \leqq 230$ | 205 |
| $170 \leqq D_{MAX} < 200$ | 202 |
| $140 \leqq D_{MAX} < 170$ | 199 |
| $100 \leqq D_{MAX} < 140$ | 196 |
| $0 < D_{MAX} < 100$ | 193 |

FIG.8A

| TGT (℃) | TC |
|---|---|
| 200<TGT≦205 | 1.1 |
| 195<TGT≦200 | 1.0 |
| 190<TGT≦195 | 0.9 |
| 120<TGT≦190 | 0.7 |
| TGT=120 | 0.4 |

FIG.8B

| HL (mm) | LC |
|---|---|
| HL≦50 | 1 |
| 50<HL≦100 | 2 |
| 100<HL≦150 | 3 |
| 150<HL≦200 | 4 |
| 200<HL≦250 | 5 |
| 250<HL≦300 | 6 |
| 300<HL≦400 | 7 |
| 400<HL | 8 |

FIG.8C

| | |
|---|---|
| START-UP COUNT | WUC=2.0 |
| INTER-SHEET INTERVAL COUNT | INC=0.5 |
| POST-ROTATION COUNT | PC=1.0 |
| RECORDING MATERIAL SHEET PASSING COUNT | RMC=0.4 |
| HEAT RADIATION COUNT | DC=0.1 |

FIG.9

| HRV (EXAMPLE 1) | VA |
|---|---|
| 20≦HRV<50 | −1 |
| 50≦HRV<100 | −2 |
| 100≦HRV<150 | −4 |
| 150≦HRV<200 | −6 |
| 200≦HRV | −8 |

FIG.12

| | | $A_1$ | $A_2$ | $A_3$ | $A_4$ | $A_5$ | $A_6$ | $A_7$ |
|---|---|---|---|---|---|---|---|---|
| IMAGE HEATING PORTION | $D_{MAX}$(%) | 0 | 0 | 210 | 0 | 210 | 0 | 0 |
| | FT(°C) | — | — | 205 | — | 205 | — | — |
| NON-IMAGE HEATING PORTION | PT(°C) | 120 | 120 | 120 | 120 | 120 | 120 | 120 |

FIG.14

| CT (COMPARATIVE EXAMPLE 1-2) | VA |
|---|---|
| 20≦CT＜50 | −1 |
| 50≦CT＜100 | −2 |
| 100≦CT＜150 | −4 |
| 150≦CT＜200 | −6 |
| 200≦CT | −8 |

FIG. 16

| | | | $A_1$ | $A_2$ | $A_3$ | $A_4$ | $A_5$ | $A_6$ | $A_7$ | |
|---|---|---|---|---|---|---|---|---|---|---|
| IMAGE (FIG. 13) | IMAGE HEATING PORTION | $D_{MAX}$ | 0 | 0 | 40 | 40 | 40 | 0 | 0 | (%) |
| | | FT | — | — | 193 | 193 | 193 | — | — | (°C) |
| | NON-IMAGE HEATING PORTION | PT | 120 | 120 | 120 | 120 | 120 | 120 | 120 | (°C) |
| EXAMPLE 1 | REGION HEAT STORAGE AMOUNT | HRV | 89.4 | 128.2 | 223.8 | 152.1 | 223.8 | 128.2 | 89.4 | |
| | CONTROL TARGET TEMPERATURE | TGT($PR_i$) | — | — | 185 | 187 | 185 | — | — | (°C) |
| | | TGT(PP) | 120 | 120 | 120 | 120 | 120 | 120 | 120 | (°C) |
| COMPARATIVE EXAMPLE 1-1 | CONTROL TARGET TEMPERATURE | TGT($PR_i$) | — | — | 193 | 193 | 193 | — | — | (°C) |
| | | TGT(PP) | 120 | 120 | 120 | 120 | 120 | 120 | 120 | (°C) |
| COMPARATIVE EXAMPLE 1-2 | HEAT STORAGE COUNT VALUE | CT | 74.5 | 74.5 | 195.8 | 74.5 | 195.8 | 74.5 | 74.5 | |
| | CONTROL TARGET TEMPERATURE | TGT($PR_i$) | — | — | 187 | 191 | 187 | — | — | (°C) |
| | | TGT(PP) | 120 | 120 | 120 | 120 | 120 | 120 | 120 | (°C) |

FIG.18A

| TGT(℃) | TC |
|---|---|
| 200＜TGT≦205 | 1.1 |
| 195＜TGT≦200 | 1.0 |
| 190＜TGT≦195 | 0.9 |
| 120＜TGT≦190 | 0.7 |
| TGT＝120 | 0.4 |

FIG.18B

| HL(mm) | LC |
|---|---|
| HL≦1 | 0.02 |
| 1＜HL≦2 | 0.04 |
| 2＜HL≦3 | 0.06 |
| 3＜HL≦4 | 0.08 |
| 4＜HL≦5 | 0.10 |
| 5＜HL＜6 | 0.12 |

FIG.18C

| | |
|---|---|
| START-UP COUNT | WUC＝0.011 |
| INTER-SHEET INTERVAL COUNT | INC＝0.050 |
| POST-ROTATION COUNT | PC＝0.006 |

FIG.18D

| | |
|---|---|
| RECORDING MATERIAL SHEET PASSING COUNT | RMC＝0.008 |
| HEAT RADIATION COUNT | DC＝0.002 |

FIG.20

| | | | $A_1$ | $A_2$ | $A_3$ | $A_4$ | $A_5$ | $A_6$ | $A_7$ | |
|---|---|---|---|---|---|---|---|---|---|---|
| IMAGE (LH2 PART IN FIG.17) | IMAGE HEATING PORTION | $D_{MAX}$ | 0 | 0 | 40 | 40 | 40 | 0 | 0 | (%) |
| | | FT | — | — | 193 | 193 | 193 | — | — | (°C) |
| | NON-IMAGE HEATING PORTION | PT | 120 | 120 | — | — | — | 120 | 120 | (°C) |
| EXAMPLE 2 (LH2 PART IN FIG.17) | REGION HEAT STORAGE AMOUNT | $HRV_{i[n-10]}$ | 89.9 | 127.5 | 220.2 | 150.7 | 220.2 | 127.5 | 89.9 | |
| | CONTROL TARGET TEMPERATURE | $TGT(PR_{i[n]})$ | — | — | 185 | 187 | 185 | — | — | (°C) |
| | | TGT(PP) | 120 | 120 | — | — | — | 120 | 120 | (°C) |
| EXAMPLE 1 (LH2 PART IN FIG.17) | REGION HEAT STORAGE AMOUNT | $HRV_{i[29]}$ | 86.5 | 124.1 | 216.8 | 147.3 | 216.8 | 124.1 | 86.5 | |
| | CONTROL TARGET TEMPERATURE | $TGT(PR_i)$ | — | — | 185 | 189 | 185 | — | — | (°C) |
| | | TGT(PP) | 120 | 120 | — | — | — | 120 | 120 | (°C) |

| | $A_1$ | $A_2$ | $A_3$ | $A_4$ | $A_5$ | $A_6$ | $A_7$ |
|---|---|---|---|---|---|---|---|
| $T_1$ | AN | AI | AI | AI | AP | AP | AN |
| $T_2$ | AN | AP | AP | AI | AI | AP | AN |
| $T_3$ | AN | AP | AP | AI | AI | AP | AN |
| ⋮ | | | | | | | |

FIG.24A SET VALUE OF TEMPERATURE CORRECTION TERM $K_{AI}$ OF IMAGE HEATING REGION

| HEAT STORAGE COUNT VALUE $CT_i$ | $K_{AI}$ (°C) |
|---|---|
| $CTi \leqq 100$ | 0 |
| $100 < CTi \leqq 200$ | 2 |
| $200 < CTi \leqq 300$ | 4 |
| $300 < CTi \leqq 400$ | 6 |
| $400 < CTi \leqq 500$ | 9 |
| $500 < CTi \leqq 600$ | 11 |
| $600 < CTi$ | 13 |

FIG.24B SET VALUE OF TEMPERATURE CORRECTION TERM $K_{AP}$ OF NON-IMAGE HEATING REGION

| HEAT STORAGE COUNT VALUE $CT_i$ | $K_{AP}$ (°C) |
|---|---|
| $CTi \leqq 100$ | 0 |
| $100 < CTi \leqq 200$ | 4 |
| $200 < CTi \leqq 300$ | 8 |
| $300 < CTi \leqq 400$ | 12 |
| $400 < CTi \leqq 500$ | 16 |
| $500 < CTi$ | 20 |

FIG.24C SET VALUE OF TEMPERATURE CORRECTION TERM $K_{AN}$ OF NON-SHEET PASSING HEATING REGION

| | |
|---|---|
| TEMPERATURE CORRECTION TERM OF NON-SHEET PASSING HEATING | $K_{AN}=0$ |

FIG.25A SET VALUE OF HEATING COUNT TC

| CONTROL TARGET TEMPERATURE TGTi (°C) | TC |
|---|---|
| TGTi ≦ 125 | 0.7 |
| 125 < TGTi ≦ 135 | 0.8 |
| 135 < TGTi ≦ 145 | 0.9 |
| 145 < TGTi ≦ 155 | 1.0 |
| 155 < TGTi ≦ 165 | 1.1 |
| 165 < TGTi ≦ 170 | 1.2 |
| 170 < TGTi ≦ 175 | 1.3 |
| 175 < TGTi ≦ 180 | 1.4 |
| 180 < TGTi ≦ 185 | 1.5 |
| 185 < TGTi ≦ 188 | 1.6 |
| 188 < TGTi ≦ 191 | 1.7 |
| 191 < TGTi ≦ 194 | 1.8 |
| 194 < TGTi ≦ 197 | 1.9 |
| 197 < TGTi ≦ 200 | 2.0 |
| 200 < TGTi | 2.1 |

FIG.25B SET VALUE OF RECORDING MATERIAL SHEET PASSING COUNT RMC

| CLASSIFICATION OF HEATING REGION $A_i$ | RMC |
|---|---|
| NON-SHEET PASSING HEATING REGION AN | 0.0 |
| IMAGE HEATING REGION AI | 1.1 |
| NON-IMAGE HEATING REGION AP | 1.1 |

FIG.25C SET VALUE OF HEAT RADIATION COUNT DC

| HEAT STORAGE COUNT VALUE $CT_i$ | DC |
|---|---|
| CTi ≦ 100 | 0.01 |
| 100 < CTi ≦ 250 | 0.11 |
| 250 < CTi ≦ 400 | 0.30 |
| 400 < CTi ≦ 550 | 0.50 |
| 550 < CTi ≦ 700 | 0.80 |
| 700 < CTi | 1.20 |

FIG.25D SET VALUE OF START-UP COUNT WUC

| HEAT STORAGE COUNT VALUE $CT_i$ | WUC |
|---|---|
| CTi ≦ 100 | 14.0 |
| 100 < CTi ≦ 200 | 11.0 |
| 200 < CTi ≦ 300 | 8.0 |
| 300 < CTi ≦ 450 | 5.0 |
| 450 < CTi ≦ 650 | 2.0 |
| 650 < CTi | 0.4 |

FIG.28

SET VALUE OF START-UP COUNT WUC

| HEAT STORAGE COUNT VALUE $CT_i$ | WUC |
|---|---|
| $CTi \leqq 100$ | 6.0 |
| $100 < CTi \leqq 200$ | 4.0 |
| $200 < CTi \leqq 300$ | 2.2 |
| $300 < CTi \leqq 450$ | 0.8 |
| $450 < CTi$ | 0.2 |

FIG.29A SET VALUE OF HEAT RADIATION COUNT $DC_N$

| STORAGE COUNT VALUE $CT_{Nj}$ OF NON-SHEET PASSING PORTION | $DC_N$ |
|---|---|
| $CT_{Nj} \leqq 100$ | 0.01 |
| $100 < CT_{Nj} \leqq 250$ | 0.11 |
| $250 < CT_{Nj} \leqq 400$ | 0.30 |
| $400 < CT_{Nj} \leqq 550$ | 0.50 |
| $550 < CT_{Nj} \leqq 700$ | 0.80 |
| $700 < CT_{Nj}$ | 1.20 |

FIG.29B SET VALUE OF $K_{NAI}$

| STORAGE COUNT VALUE $CT_{Nj}$ OF NON-SHEET PASSING PORTION | $K_{NAI}$ (°C) |
|---|---|
| $CT_{Nj} \leqq 100$ | 0 |
| $100 < CT_{Nj} \leqq 200$ | 2 |
| $200 < CT_{Nj} \leqq 300$ | 4 |
| $300 < CT_{Nj} \leqq 400$ | 6 |
| $400 < CT_{Nj} \leqq 500$ | 9 |
| $500 < CT_{Nj} \leqq 600$ | 11 |
| $600 < CT_{Nj}$ | 13 |

| NUMBER OF PASSING SHEETS OF P2 | CONTROL TARGET TEMPERATURE FOR P3 IMAGE RANGE (°C) | | | | | | COOLING CONTROL |
|---|---|---|---|---|---|---|---|
| | HEATING REGION $A_2$ | | | HEATING REGION $A_6$ | | | |
| | $TGT_2$ | $TGT_{N2}$ | $\Delta T_2$ | $TGT_6$ | $TGT_{N6}$ | $\Delta T_6$ | |
| 10 SHEETS | 198 | 196 | 2 | 198 | 198 | 0 | NOT PERFORMED |
| 30 SHEETS | 196 | 192 | 4 | 198 | 196 | 2 | NOT PERFORMED |
| 50 SHEETS | 194 | 189 | 5 | 198 | 194 | 4 | PERFORMED |
| 70 SHEETS | 194 | 187 | 7 | 198 | 192 | 6 | PERFORMED |

IMAGE FORMING APPARATUS AND IMAGE HEATING APPARATUS

This is a continuation of U.S. patent applicant Ser. No. 17/128,596, filed on Dec. 21, 2020, which is a continuation of U.S. patent application Ser. No. 16/415,801, filed on May 17, 2019, which issued as U.S. Pat. No. 10,901,349, which is a continuation of U.S. patent application Ser. No. 16/052,925, filed on Aug. 2, 2018, which issued as U.S. Pat. No. 10,338,505, which is a continuation of U.S. patent application Ser. No. 15/631,394, filed on Jun. 23, 2017, which issued as U.S. Pat. No. 10,054,882, and which claims the benefit of Japanese Patent Application No. 2016-131620, filed Jul. 1, 2016, and Japanese Patent Application No. 2016-131594, filed Jul. 1, 2016. Each of the priority applications is hereby incorporated by reference herein in its entirety.

BACKGROUND OF THE INVENTION

Field of the Invention

The present invention relates to an image forming apparatus such as a copying machine or a printer using an electrophotographic method or an electrostatic recording system. The present invention also relates to an image heating apparatus such as a fixing unit mounted on an image forming apparatus and a gloss applying apparatus for improving the gloss level of a toner image by heating the toner image fixed on the recording material again.

Description of the Related Art

For an image heating apparatus such as a gloss applying apparatus and a fixing unit used in an electrophotographic image forming apparatus (hereinafter referred to as an image forming apparatus) such as a copying machine or a printer, a method of selectively heating an image portion formed on a recording material has been proposed in order to save power consumption (Japanese Patent Application Publication No. H6-95540). In this type of heater, a plurality of divided heating regions are set in a direction orthogonal to the passing direction of the recording material (hereinafter referred to as a longitudinal direction), and a plurality of heating elements for heating the respective heating regions are provided in the longitudinal direction. Then, based on the image information of the image formed in each heating region, the image portion is selectively heated by the corresponding heating element. Further, by using together a method for achieving power saving by adjusting the heating condition according to the image information (Japanese Patent Application Publication No. 2013-41118), further power saving can be achieved. Furthermore, it is possible to further save power consumption by applying, to each heating region, heating condition correction according to the thermal history of the image heating apparatus.

If the power supply to each heating element is controlled under the optimal heating condition for the image of each heating region using the methods described in Japanese Patent Application Publication No. H6-95540 and Japanese Patent Application Publication No. 2013-41118, it is possible to save power as compared with the case where selective heating for the image portion is not performed. However, as heating in accordance with an image formed in the heating region is continued in each heating region, a difference occurs in the degree of warming (hereinafter referred to as heat storage amount) of a portion corresponding to each heating region of the image heating apparatus. If heating conditions of each heating region are set without considering the heat storage amount, proper heat supply to the unfixed toner image on the recording material is not performed and image defects resulting from this may occur. It is also not preferable from the viewpoint of power saving performance. To cope with this, it is conceivable to predict the heat storage amount of the heating region from the thermal history of each heating region and to correct the heating condition in each heating region according to this heat storage amount.

However, the heat storage amount in one heating region is not determined only by the thermal history of the heating region. The heat storage amount is subjected to influence of the heat propagating from the adjacent heating region, that is, the influence of the thermal history of the adjacent heating region. Therefore, the heat storage amount predicted for each heating region may be greatly different from the actual heat storage amount in some cases, and there is a possibility that sufficient prediction accuracy can not necessarily be obtained.

SUMMARY OF THE INVENTION

An object of the present invention is to provide a technique capable of more accurately predicting the heat storage amount in each heating region and obtaining even more power saving effect.

In order to achieve the above object, the image heating apparatus of the present invention is an image heating apparatus that heats an image formed on a recording material, the image heating apparatus comprising:

a heater, the heater having a plurality of heating elements arranged in a direction orthogonal to a conveying direction of the recording material; and a control portion that controls electric power to be supplied to the plurality of heating elements, the control portion being capable of individually controlling the plurality of heating elements, wherein the control portion sets a heating condition when controlling each of the plurality of heating elements, according to the thermal history of a heating region heated by one heating element and the thermal history of a heating region heated by a heating element adjacent to the one heating element.

In order to achieve the above object, the image heating apparatus of the present invention is an image heating apparatus that heats an image formed on a recording material, the image heating apparatus comprising:

a heater, the heater having a plurality of heating elements arranged in a direction orthogonal to a conveying direction of the recording material; and a control portion that controls electric power to be supplied to the plurality of heating elements, the control portion being capable of individually controlling the plurality of heating elements, wherein the control portion controls a heat generating quantity of each of the plurality of heating elements depending on a timing at which a heating region heated by each of the plurality of heating elements is a first region including an image, a timing at which the heating region is a second region not including an image in the recording material, or a timing at which the heating region is a third region where there is no recording material.

In order to achieve the above object, the image forming apparatus of the present invention is an image forming apparatus comprising:

an image forming portion that forms an image on a recording material; and a fixing portion that fixes the image formed on the recording material to the recording material, wherein the fixing portion is the image heating apparatus.

In order to achieve the above object, the image forming apparatus of the present invention is an image forming apparatus comprising:

an image forming portion that forms an image on a recording material; and a fixing portion that fixes the image formed on the recording material to the recording material, wherein the fixing portion is the image heating apparatus.

Further features of the present invention will become apparent from the following description of exemplary embodiments with reference to the attached drawings.

BRIEF DESCRIPTION OF THE DRAWINGS

FIGS. 3A to 3C are views showing a heater configuration of Example 1;

FIG. 7 is a view showing a relationship between $D_{MAX}(i)$ and heating temperature $FT_i$ in Example 1;

FIGS. 8A to 8C are explanatory views of TC, LC, WUC, INC, PC, RMC, DC in Example 1;

FIG. 9 is a view showing a relation between a heat storage amount of the region HRV and a control target temperature TGT correction value according to Example 1;

FIG. 12 is an explanatory view of the values of $D_{MAX}(i)$ and $FT_i$ of each heating region;

FIG. 14 is a view showing a relationship between a count value $CT_i$ of a heat storage counter of Comparative Example 1-2 and a correction value VA;

FIG. 16 is a view showing results of comparative experiments between Example 1 and Comparative Example;

FIGS. 18A to 18D are explanatory views of TC, LC, WUC, INC, PC, RMC, DC of Example 2;

FIG. 20 is a view showing the results of comparative experiments between Example 2 and Example 1;

FIGS. 24A to 24C are set values of a parameter related to a control target temperature in Example 3;

FIGS. 25A to 25D are set values of a parameter related to the heat storage count value in Example 3;

FIG. 28 shows a set value of a parameter related to a heat storage count value in Example 4;

FIGS. 29A and 29B are set values of a parameter related to a heat storage count value and a control target temperature in Example 5;

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Example 1

1. Configuration of Image Forming Apparatus

Figure 1:
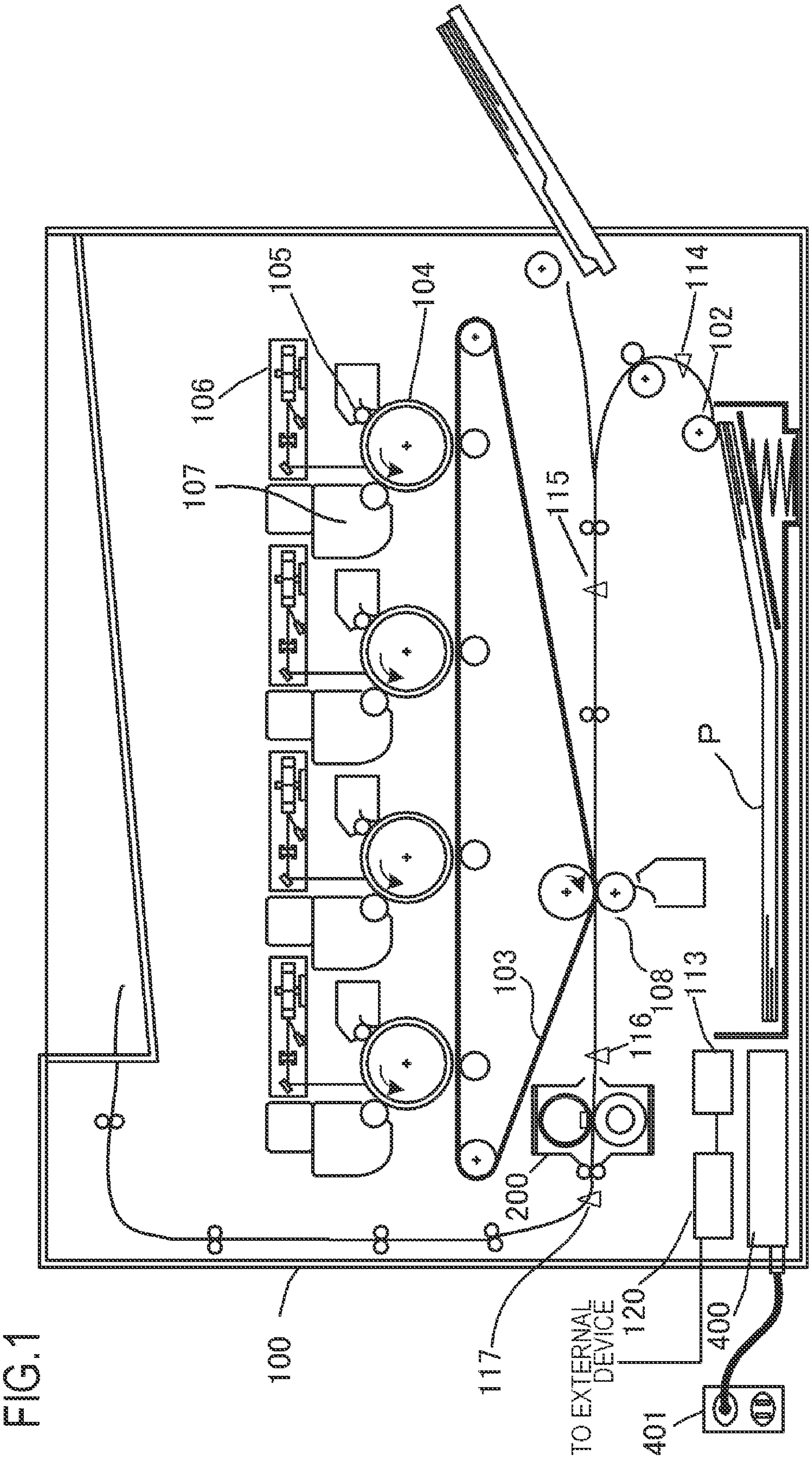
FIG. 1 is a sectional view of an image forming apparatus according to an example of the present invention.

FIG. 1 is a configuration diagram of an electrophotographic image forming apparatus according to an example of the present invention. Examples of the image forming apparatus to which the present invention can be applied include copying machines and printers using an electrophotographic system and an electrostatic recording system. Here, a case where the image forming apparatus is applied to a laser printer will be described.

The image forming apparatus 100 includes a video controller 120 and a control portion 113. As an acquisition unit for acquiring information of an image formed on a recording material, the video controller 120 receives and processes image information and a print instruction transmitted from an external device such as a personal computer. The control portion 113 is connected to the video controller 120 and controls each unit constituting the image forming apparatus 100 according to an instruction from the video controller 120. When the video controller 120 receives a print instruction from an external device, image formation is executed by the following operations.

In the image forming apparatus 100, a recording material P is fed by a feeding roller 102 and conveyed toward an intermediate transfer member 103. A photosensitive drum 104 is rotationally driven counterclockwise at a predetermined speed by the power of a driving motor (not shown), and uniformly charged by a primary charging device 105 in the rotation process. The laser beam modulated corresponding to the image signal is outputted from a laser beam scanner 106, and selectively scans and exposes the photosensitive drum 104 to form an electrostatic latent image. A developing device 107 causes powder toner as a developer adhere to the electrostatic latent image and visualizes it as a toner image (developer image). The toner image formed on the photosensitive drum 104 is primarily transferred onto the intermediate transfer member 103 rotating in contact with the photosensitive drum 104.

Each of the photosensitive drum 104, the primary charging device 105, the laser beam scanner 106, and the developing device 107 is provided with four color components of cyan (C), magenta (M), yellow (Y), and black (K). Toner images for four colors are sequentially transferred onto the intermediate transfer member 103 by the same procedure. The toner image transferred onto the intermediate transfer member 103 is secondarily transferred onto the recording material P by a transfer bias applied to the transfer roller 108 in a secondary transfer portion formed by the intermediate transfer member 103 and the transfer roller 108. In the above configuration, the configuration related to the formation of the toner image on the recording material P corresponds to the image forming portion in the present invention. Thereafter, the fixing apparatus 200 serving as the image heating apparatus heats and pressurizes the recording material P, whereby the toner image is fixed on the recording material, and is discharged outside the apparatus as an image formation material.

The control portion 113 manages the conveyance status of the recording material P by a conveyance sensor 114, a registration sensor 115, a pre-fixing sensor 116, and a fixing discharge sensor 117 on the conveyance path of the recording material P. In addition, the control portion 113 has a storage unit that stores a temperature control program and a temperature control table of the fixing apparatus 200. A control circuit 400 as heater driving means connected to a commercial AC power supply 401 supplies power to the fixing apparatus 200.

2. Configuration of Fixing Apparatus (Fixing Portion)

Figure 2:
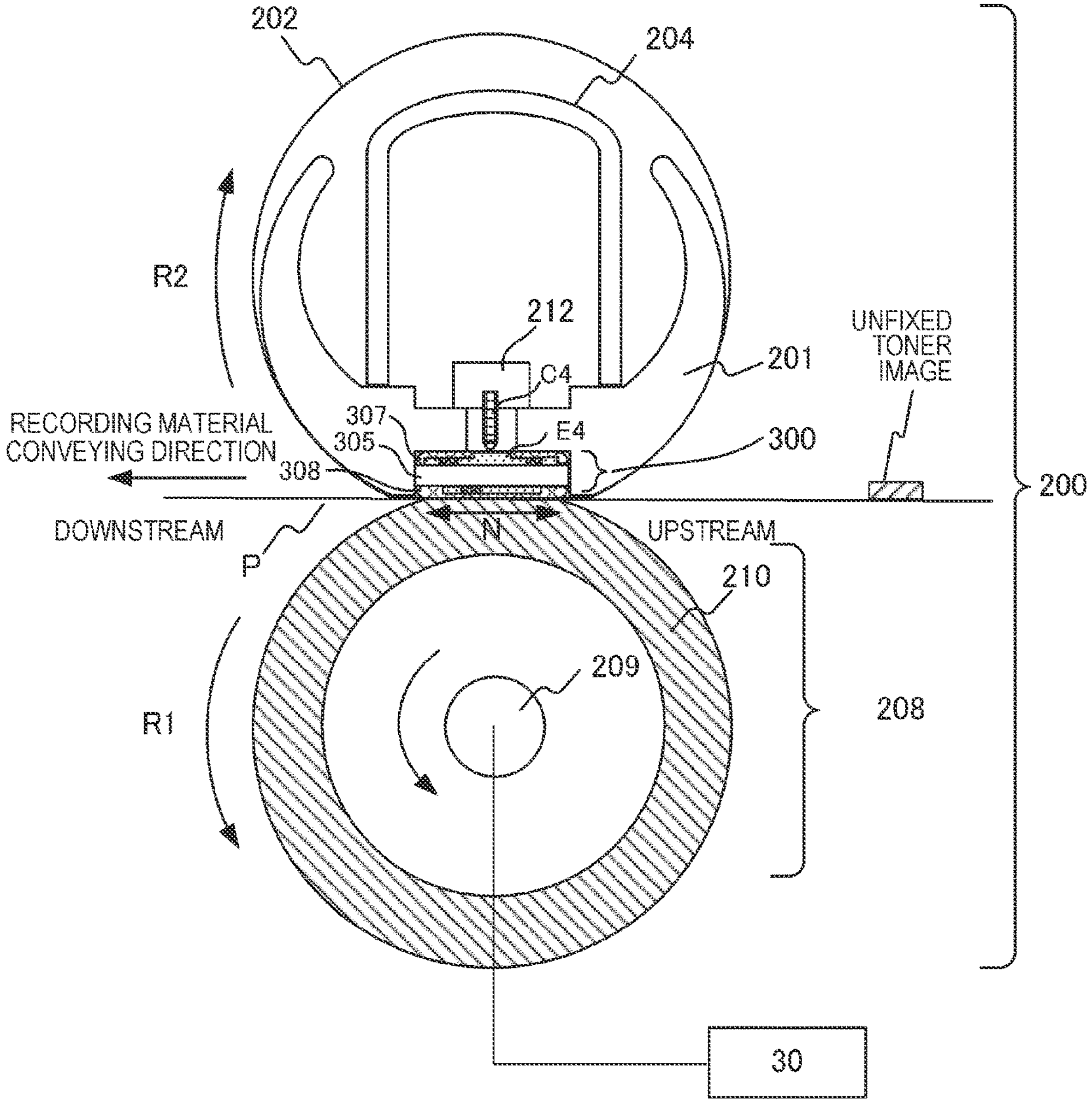
FIG. 2 is a cross-sectional view of an image heating apparatus according to Example 1.

FIG. 2 is a schematic cross-sectional view of the fixing apparatus 200 of this example. The fixing apparatus 200 includes a fixing film 202, a heater 300 that is in contact with the inner surface of a fixing film 202, and a pressure roller 208 that forms a fixing nip portion N together with the heater 300 via the fixing film 202.

The fixing film 202 is a flexible multi-layer heat-resistant film formed in a tubular shape. A heat-resistant resin such as polyimide having a thickness of about 50 to 100 μm or a metal such as stainless steel having a thickness of about 20 to 50 μm can be used as a base layer. Further, on the surface of the fixing film 202, a releasing layer for preventing toner adhesion and ensuring separability from the recording material P is provided. The releasing layer is a heat-resistant resin excellent in releasability such as a tetrafluoroethylene/perfluoroalkyl vinyl ether copolymer (PFA) having a thickness of about 10 to 50 μm. Further, in the fixing film used for an apparatus for forming a color image, in order to improve the image quality, between the base layer and the releasing layer, as the elastic layer, heat resistant rubber such as silicone rubber having a thickness of about 100 to 400 μm and a thermal conductivity of about 0.2 to 3.0 W/m·K may be provided. In this example, from the viewpoints of thermal responsiveness, image quality, durability and the like, polyimide having a thickness of 60 μm as a base layer, a silicone rubber having a thickness of 300 μm as an elastic layer and a thermal conductivity of 1.6 W/m·K, and PFA having a thickness of 30 μm as a releasing layer are used.

The pressure roller 208 has a core metal 209 made of a material such as iron or aluminum and an elastic layer 210 made of a material such as silicone rubber. The heater 300 is held by a heater holding member 201 made of a heat-resistant resin, and heats the fixing film 202. The heater holding member 201 also has a guide function for guiding the rotation of the fixing film 202. The metal stay 204 receives a pressing force from an unillustrated biasing member or the like and urges the heater holding member 201 toward the pressure roller 208. The pressure roller 208 receives the power from the motor 30 and rotates in an arrow R1 direction. As the pressure roller 208 rotates, the fixing film 202 follows the rotation and rotates in an arrow R2 direction. By applying heat of the fixing film 202 while sandwiching and conveying the recording material P in the fixing nip portion N, the unfixed toner image on the recording material P is fixed.

The heater 300 is a heater in which a heating resistor as a heating element provided on a ceramic substrate 305 generates heat when energized. The heater 300 includes a surface protective layer 308 contacting the inner surface of the fixing film 202, a surface protective layer 307 provided on the side (hereinafter referred to as the back surface side) of the substrate 305 opposite to the side (hereinafter referred to as the sliding surface side) provided with the surface protective layer 308. On the back surface side of the heater 300, a power supply electrode (here, a representative electrode E4 is shown) is provided. C4 is an electrical contact that contacts the electrode E4 and supplies power from the electrical contact to the electrode. Details of the heater 300 will be described later. In addition, a safety element 212 such as a thermo switch and a thermal fuse which operates by abnormal heat generation of the heater 300 to cut off electric power to be supplied to the heater 300 is arranged to face the back surface side of the heater 300.

3. Configuration of Heater

FIGS. 3A to 3C are schematic views showing the configuration of the heater 300 according to Example 1 of the present invention.

FIG. 3A is a sectional view of the heater near a conveyance reference position X shown in FIG. 3B. The conveyance reference position X is defined as a reference position when the recording material P is conveyed. In the image forming apparatus of this example, the recording material is conveyed such that the central portion in the width direction orthogonal to the conveying direction of the recording material P passes through the conveyance reference position X. In general, the heater 300 has a five-layer structure in which two layers (back surface layers 1, 2) are formed on one surface (back surface) of the substrate 305 and two layers (sliding surface layers 1, 2) are formed on the other surface (sliding surface) are formed.

The heater 300 has the first electric conductor 301 (301*a*, 301*b*) provided along the longitudinal direction of the heater 300 on the back surface layer side surface of the substrate 305. In addition, the heater 300 has, on the substrate 305, a first electric conductor 301 and a second electric conductor 303 (303-4 near the conveyance reference position X) provided along the longitudinal direction of the heater 300 at different positions in the lateral direction (direction orthogonal to the longitudinal direction) of the heater 300.

The first electric conductor 301 is separated into the electric conductor 301*a* disposed on the upstream side in the conveying direction of the recording material P and the electric conductor 301*b* arranged on the downstream side. Further, the heater 300 is provided between the first electric conductor 301 and the second electric conductor 303, and has a heating resistor 302 that generates heat by electric power supplied via the first electric conductor 301 and the second electric conductor 303.

The heating resistor 302 is divided into a heating resistor 302*a* disposed on the upstream side in the conveying direction of the recording material P (302*a*-4 near the conveyance reference position X), and a heating resistor 302*b* disposed on the downstream side (302*b*-4 near the conveyance reference position X). Further, the insulating surface protective layer 307 (glass in the present example) covering the heating resistor 302, the first electric conductor 301, and the second electric conductor 303 is provided on the back surface layer 2 of the heater 300 while avoiding the electrode portion (E4 near the conveyance reference position X).

FIG. 3B shows a plan view of each layer of the heater 300. In the back surface layer 1 of the heater 300, a plurality of heating blocks formed of a combination of the first electric conductor 301, the second electric conductor 303, and the heating resistor 302 are provided in the longitudinal direction of the heater 300. The heater 300 of the present example has seven heating blocks HB1 to HB7 in total in the longitudinal direction of the heater 300. A region from the left end of the heating block HB1 to the right end of the heating block HB7 in FIG. 3B is a heat generating region, and has a length of 220 mm. In this example, the longitudinal widths of the heating blocks are all the same (not necessarily all the same longitudinal width).

The heating blocks HB1 to HB7 are constituted by heating resistors 302*a*-1 to 302*a*-7 and heating resistors 302*b*-1 to 302*b*-7 formed symmetrically in the lateral direction of the heater 300. The first electric conductor 301 includes the electric conductor 301*a* connected to the heating resistors (302*a*-1 to 302*a*-7) and the electric conductor 301*b* connected to the heating resistors (302*b*-1 to 302*b*-7). Similarly, the second electric conductor 303 is divided into seven electric conductors 303-1 to 303-7 so as to correspond to the seven heating blocks HB1 to HB7.

Electrodes E1 to E7, E8-1 and E8-2 are connected to electrical contacts C1 to C7, C8-1 and C8-2. The electrodes E1 to E7 are electrodes for supplying electric power to the heating blocks HB1 to HB7 via the electric conductors 303-1 to 303-7. The electrodes E8-1 and E8-2 are common electrodes for supplying electric power to the seven heating blocks HB1 to HB7 via the electric conductor 301*a* and the electric conductor 301*b*. In the present example, the electrodes E8-1 and E8-2 are provided at both ends in the longitudinal direction. However, for example, a configuration in which only the electrode E8-1 is provided on one side (that is, a configuration without providing the electrode E8-2) may be adopted, and the electrode E8-1 and the electrode E8-2 may be divided into two in a recording material conveying direction.

The surface protective layer 307 of the back surface layer 2 of the heater 300 is formed so that the electrodes E1 to E7, E8-1 and E8-2 are exposed. In this way, the electrical contacts C1 to C7, C8-1 and C8-2 can be connected to each electrode from the back surface layer side of the heater 300. The heater 300 is configured to be able to supply electric power from the back surface layer side. In addition, the power supplied to at least one heat-generating block of the heating block and the power supplied to the other heating block can be controlled independently.

By disposing an electrode on the back surface of the heater 300, it is unnecessary to conduct the wiring by the conductive pattern on the substrate 305, so that the width of the substrate 305 in the lateral direction can be shortened. Therefore, it is possible to reduce the material cost of the substrate 305 and shorten the start-up time required for the temperature rise of the heater 300 due to the reduction in the heat capacity of the substrate 305. The electrodes E1 to E7 are provided in a region where the heating resistors are provided in the longitudinal direction of the substrate.

In this example, as the heating resistor 302, a material having a characteristic that the resistance value rises with increasing temperature (hereinafter referred to as PTC characteristic) is used. By using a material having a PTC characteristic as the heating resistor, there is obtained the effect that the resistance value of the heating resistor in the non-sheet passing portion becomes higher than the heating resistor in the sheet passing portion at the time of fixation processing of the small size sheet and the current hardly flows. As a result, it is possible to enhance the effect of suppressing the temperature rise in the non-sheet passing portion. However, a material used for the heating resistor 302 is not limited to a material having PTC characteristics. It is also possible to use a material having a characteristic that the resistance value decreases as the temperature rises (hereinafter referred to as an NTC characteristic) or a material having a property that the resistance value does not change with temperature change.

On the sliding surface layer 1 at the side of the sliding surface of the heater 300 (the surface in contact with the fixing film), in order to detect the temperature of each of the heating blocks HB1 to HB7 of the heater 300, thermistors T1-1 to T1-4, and thermistors T2-5 to T2-7 are provided. The thermistors T1-1 to T1-4 and the thermistors T2-5 to T2-7 are formed by thinly forming a material having PTC characteristics or NTC characteristics (NTC characteristics in this example) on a substrate. Since all the heating blocks HB1 to HB7 have a thermistor, by detecting the resistance value of the thermistor, the temperature of all heating blocks can be detected.

In order to energize the four thermistors T1-1 to T1-4, electric conductors ET1-1 to ET1-4 for detecting the resistance value of the thermistor and a common electric conductor EG1 of the thermistor are formed. A thermistor block TB1 is formed by a combination of these electric conductors and the thermistors T1-1 to T1-4. Similarly, in order to energize the three thermistors T2-5 to T2-7, electric conductors ET2-5 to ET2-7 for detecting the resistance value of the thermistor and a common electric conductor EG2 of the thermistor are formed. A thermistor block TB2 is formed by a combination of these electric conductors and the thermistors T2-5 to T2-7.

The effect of using the thermistor block TB1 will be described. First, by forming the common electric conductor EG1 of the thermistor, the cost of forming the wiring of the electric conductor pattern can be reduced as compared with the case where the electric conductors are connected to the thermistors T1-1 to T1-4 and wired, respectively. Furthermore, it is unnecessary to conduct the wiring by the conductive pattern on the substrate 305, so that the width of the substrate 305 in the lateral direction can be shortened. Therefore, it is possible to reduce the material cost of the substrate 305 and shorten the start-up time required for the temperature rise of the heater 300 due to the reduction in the heat capacity of the substrate 305. Since the effect of using the thermistor block TB2 is the same as that of the thermistor block TB1, its explanation will be omitted.

In order to shorten the width of the substrate 305 in the lateral direction, a method used by combining the configuration of the heating blocks HB1 to HB7 described in the surface layer 1 of FIG. 3A and the thermistor blocks TB1 to TB2 described in the sliding surface layer 1 of FIG. 3A is advantageous.

The sliding surface layer 2 on the sliding surface (the surface in contact with the fixing film) of the heater 300 has the sliding surface protective layer 308 (glass in the present example). In order to connect the electrical contacts to the electric conductors ET1-1 to ET1-4, ET2-5 to ET2-7 for detecting the resistance value of the thermistor to the common electric conductors EG1 and EG2 of the thermistor, the surface protective layer 308 is formed while avoiding both end portions of the heater 300. The surface protective layer 308 is provided at least in a region that slides on the film 202 except for both end portions on the surface of the heater 300 facing the film 202.

As shown in FIG. 3C, on the surface of the heater holding member 201 facing the heater 300, holes for connecting the electrodes E1, E2, E3, E4, E5, E6, E7, E8-1 and E8-2 to the electrical contacts C1 to C7, C8-1 and C8-2 are provided. Between the stay 204 and the heater holding member 201, the above-described safety element 212, electrical contacts C1 to C7, C8-1, and C8-2 are provided. The electrical contacts C1 to C7, C8-1, and C8-2 that contact the electrodes E1 to E7, E8-1 and E8-2 are electrically connected to the electrode portion of the heater and the electrical by a method such as urging by spring or welding. Each electrical contact is connected to a control circuit 400 of the heater 300, which will be described later, via a conductive material such as a cable or a thin metal plate provided between the stay 204 and the heater holding member 201. The electrical contact provided in the electric conductors ET1-1 to ET1-4, ET2-5 to ET2-7 for detecting the resistance value of the thermistor and the common electric conductors EG1 and EG2 of the thermistor is also connected to the control circuit 400.

4. Configuration of Heater Control Circuit

Figure 4:
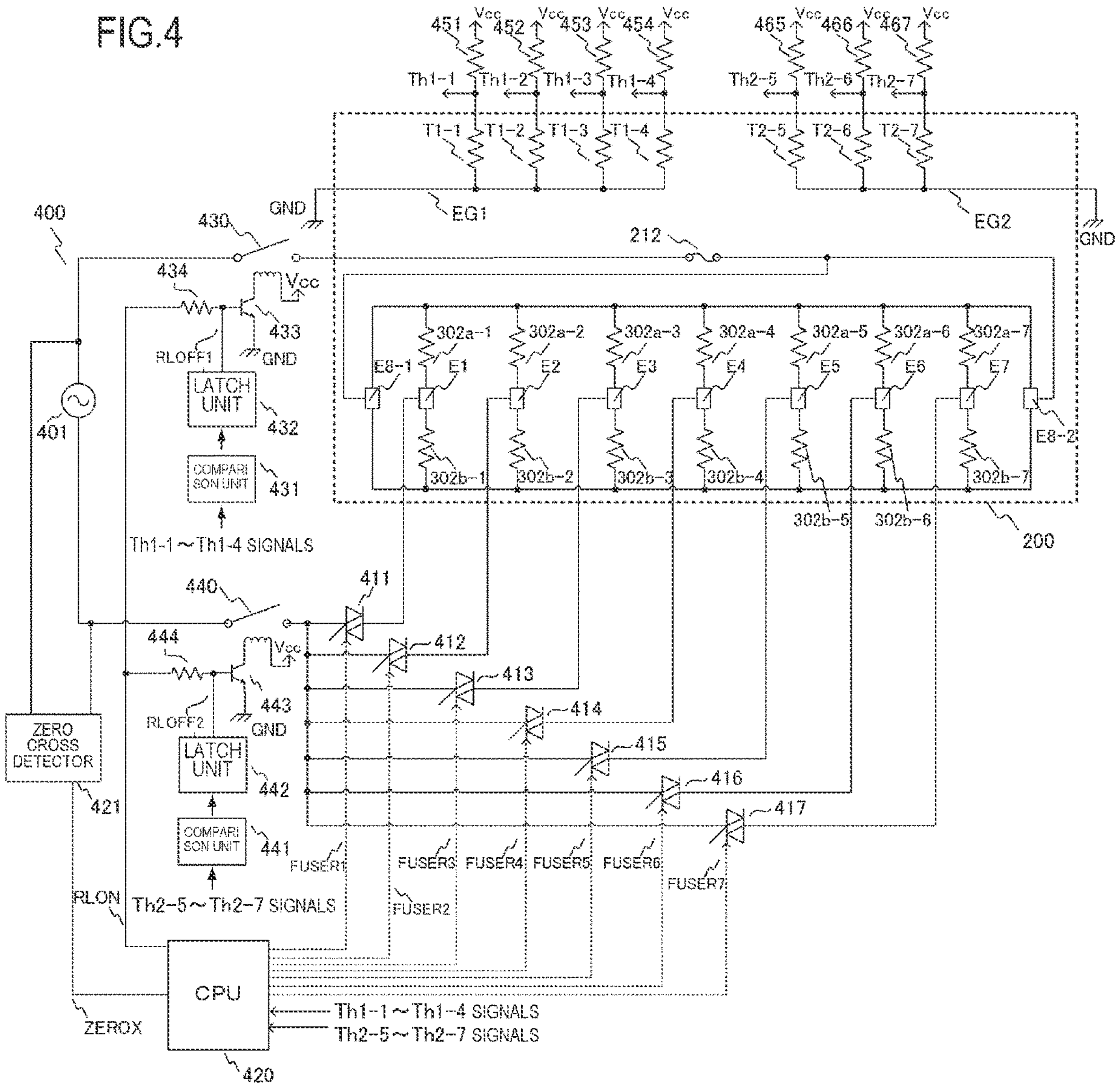
FIG. 4 is a circuit diagram of a heater control circuit of Example 1.

FIG. 4 is a circuit diagram of the control circuit 400 of the heater 300 according to Example 1. Reference numeral 401 denotes a commercial AC power supply connected to the image forming apparatus 100. Power control of the heater 300 is performed by energizing/shutting off the triac 411 to the triac 417. The triacs 411 to 417 operate in accordance with FUSER 1 to FUSER 7 signals from CPU 420, respectively. The driving circuits of triacs 411 to 417 are omitted. The control circuit 400 of the heater 300 has a circuit configuration in which seven heating blocks HB1 to HB7 can be independently controlled by seven triacs 411 to 417. A zero cross detector 421 is a circuit for detecting the zero cross of the AC power supply 401 and outputs a ZEROX signal to the CPU 420. The ZEROX signal is used for phase control of the triacs 411 to 417, detection of timing of wavenumber control, and the like.

A method of detecting the temperature of the heater 300 will be described. Assuming that divided voltages of the thermistors T1-1 to T1-4 and resistors 451 to 454 are Th1-1 to Th1-4 signals, the temperature detected by the thermistors T1-1 to T1-4 of the thermistor block TB1 is detected by the CPU 420. Similarly, assuming that divided voltages of the thermistors T2-5 to T2-7 and resistors 465 to 467 are Th2-5 to Th2-7 signals, the temperature detected by the thermistors T2-5 to T2-7 of the thermistor block TB2 is detected by the CPU 420. In the internal processing of the CPU 420, the power to be supplied is calculated based on the difference between the control target temperature of each heating block and the current detected temperature of the thermistor. For example, the power to be supplied is calculated by PI control. Further, conversion into a control level of a phase angle (phase control) and a wave number (wavenumber control) corresponding to the electric power to be supplied is performed, and the triacs 411 to 417 are controlled according to the control conditions.

The relay 430 and the relay 440 are used as power interruption means to the heater 300 when the heater 300 is overheated due to a failure or the like. A circuit operation of the relay 430 and the relay 440 will be described. When an RLON signal goes high, a transistor 433 is turned on. Then, a secondary side coil of the relay 430 is energized from a power supply voltage Vcc, so that a primary side contact of the relay 430 is turned on. When the RLON signal goes low, the transistor 433 is turned off. Then, the current flowing from the power supply voltage Vcc to the secondary side coil of the relay 430 is cut off and the primary side contact of the relay 430 is turned off. Similarly, when the RLON signal goes high, the transistor 443 is turned on. Then, the secondary side coil of the relay 440 is energized from a power supply voltage Vcc, so that the primary side contact of the relay 440 is turned on. When the RLON signal goes low, the transistor 443 is turned off. Then, the current flowing from the power supply voltage Vcc to the secondary side coil of the relay 440 is cut off and the primary side contact of the relay 440 is turned off. The resistors 434 and 444 are current limiting resistors.

The operation of the safety circuit using the relay 430 and the relay 440 will be described. When any one of the temperatures detected by the thermistors Th1-1 to Th1-4 exceeds a preset predetermined value, a comparison unit 431 operates a latch unit 432, and the latch unit 432 latches an RLOFF1 signal in a low state. When the RLOFF1 signal goes low, even if the CPU 420 sets the RLON signal to a high state, since the transistor 433 is kept in the off state, the relay 430 can be kept in an off state (safe state). It should be noted that the latch unit 442 outputs the RLOFF1 signal in the open state in the non-latched state. Similarly, when any one of the temperatures detected by the thermistors Th2-5 to Th2-7 exceeds a preset predetermined value, a comparison unit 441 operates a latch unit 442, and the latch unit 442 latches an RLOFF2 signal in a low state. When the RLOFF2 signal goes low, even if the CPU 420 sets the RLON signal to a high state, since the transistor 443 is kept in the off state, the relay 440 can be kept in an off state (safe state). Similarly, the latch unit 442 outputs the RLOFF2 signal in the open state in the non-latched state.

5. Outline of Heater Control Method

In accordance with image data (image information) sent from an external device (not shown) such as a host computer, the image forming apparatus of this example is configured to optimally control the power supplied to each of the seven heating blocks HB1 to HB7 of the heater 300 to selectively heat the image portion. In the apparatus of this example, the control target temperature (hereinafter referred to as the control target temperature TGT) as one of the heating conditions to be set for each of the heating blocks HB1 to HB7 determines the power supplied to each of the heating blocks HB1 to HB7. The CPU 420 controls power supplied to each heating block so that the temperatures detected by the thermistors T1-1 to T2-7 corresponding to the heating blocks HB1 to HB7 maintain the control target temperature TGT set for each of the heating blocks HB1 to HB7.

The control target temperature TGT set for each of the heating blocks HB1 to HB7 is determined by the image formed on the recording material and the heat accumulation state of each heating block. In this example, first, from the image data (image information), in order to heat the image with a large amount of toner at a higher temperature, a predetermined value of the control target temperature TGT (hereinafter referred to as a predetermined heating temperature FT) is determined. Further, in accordance with the heat storage amount of the fixing apparatus in the portion corresponding to the image position, the predetermined heating temperature FT is corrected, and the control target temperature TGT is determined. In Example 1, the heat storage amount of the fixing apparatus is predicted from the heating history and the heat radiation history of the fixing apparatus.

Figure 5:
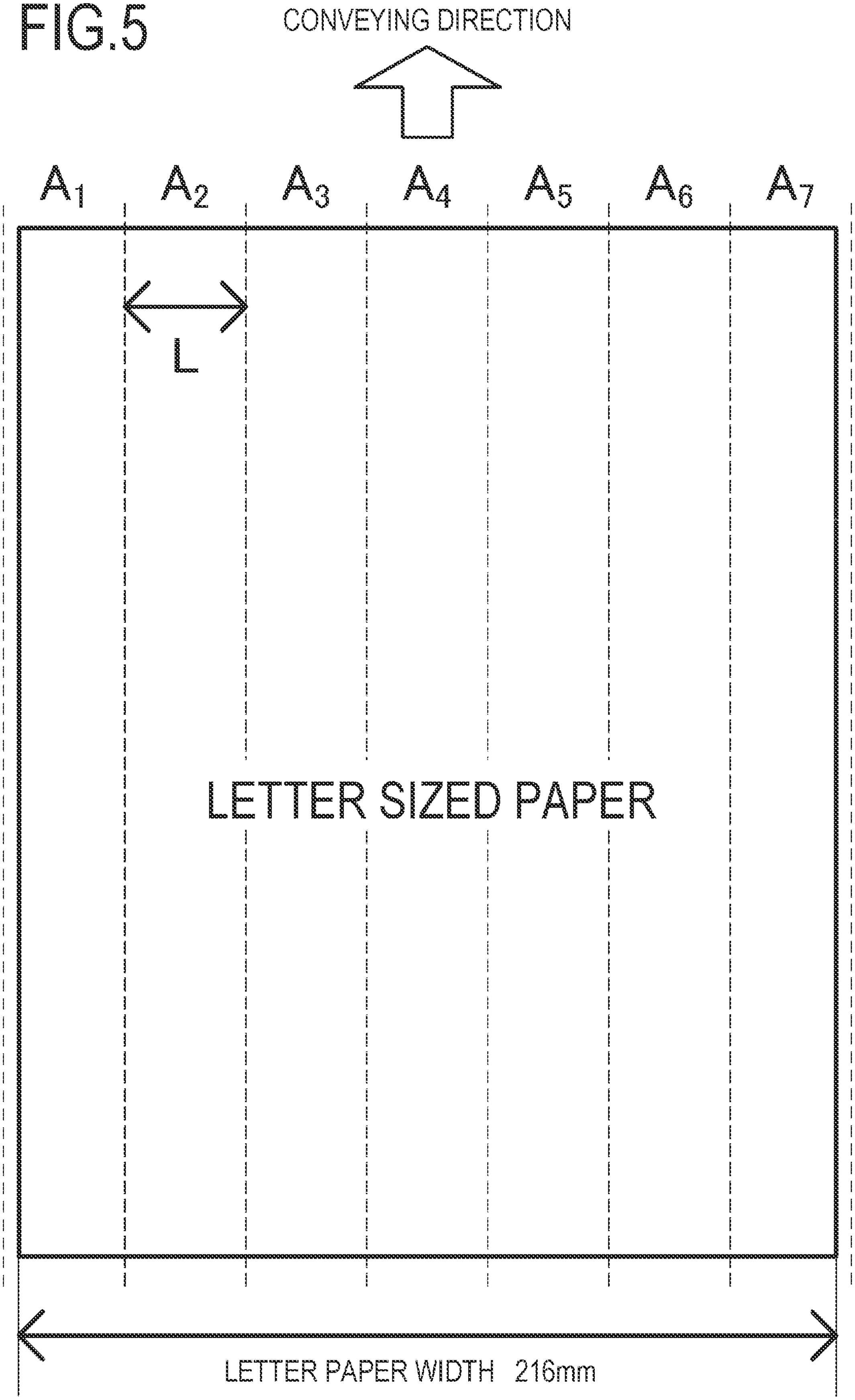
FIG. 5 is an explanatory view of heating regions $A_1$ to $A_7$.

FIG. 5 is a view showing seven heating regions $A_1$ to $A_7$ that can be heated by the heater 300, and shows in contrast to the size of LETTER sized paper. The heating regions $A_1$ to $A_7$ indicate regions that heating blocks HB1 to HB7 can respectively heat. The heating region $A_1$ is heated by the heating block HB1 and the heating region $A_7$ is heated by the heating block HB7. In the seven heating blocks HB1 to HB7, the amount of current to the heating resistors in each block is individually controlled, so that the heat generating quantity of each heating block is individually controlled. The total length of the heating regions $A_1$ to $A_7$ is 220 mm, and each region is equally divided into seven segments (L=31.4 mm).

Here, in the case where an image is formed only in a part of the recording material conveying direction in one heating region $A_i$ (i=1 to 7) among the seven heating regions, the area where the image exists is referred to as an image heating portion $PR_i$ (i=1 to 7). The image heating portion $PR_i$ (i=1 to 7) is heated at the above-described control target temperature TGT. In Example 1, in the case where there are a plurality of images to be formed in one heating region $A_i$ (i=1 to 7) in the recording material conveying direction, the smallest region including all of a plurality of images in the recording material conveying direction is the image heating portion $PR_i$ (i=1 to 7). A portion other than the image heating portion $PR_i$ in one heating region is a non-image heating portion PP, and heating is performed at a lower temperature than the image heating portion $PR_i$. Details of the heater control method according to the image information and the heater control correction method according to the predicted heat storage amount under the above conditions will be described below.

6. Heater Control Method According to Image Information

When the video controller 120 receives the image information from the host computer, the video controller 120 determines what kind of image is formed in each heating region. Then, the predetermined heating temperature FT which is a predetermined value of the control target temperature TGT is determined so that the image having a large amount of toner is heated at a higher temperature. Specifically, in accordance with the toner amount conversion value obtained by converting the image density of each color obtained from the CMYK image data into the toner amount, the predetermined heating temperature FT is determined so that heating is performed at a higher temperature for an image having a higher toner amount conversion value.

(Method of Determining Predetermined Heating Temperature)

First, a method of obtaining the toner amount conversion value D will be described. Image data from an external device such as a host computer is received by the video controller 120 of the image forming apparatus and converted into bitmap data. The number of pixels of the image forming apparatus of the present example is 600 dpi, and the video controller 120 creates bit map data (image density data of each color of CMYK) according to the number of pixels. The image forming apparatus of this example acquires the image density of each color of CMYK for each dot from bitmap data and converts the image density into the toner amount conversion value D.

Figure 6:
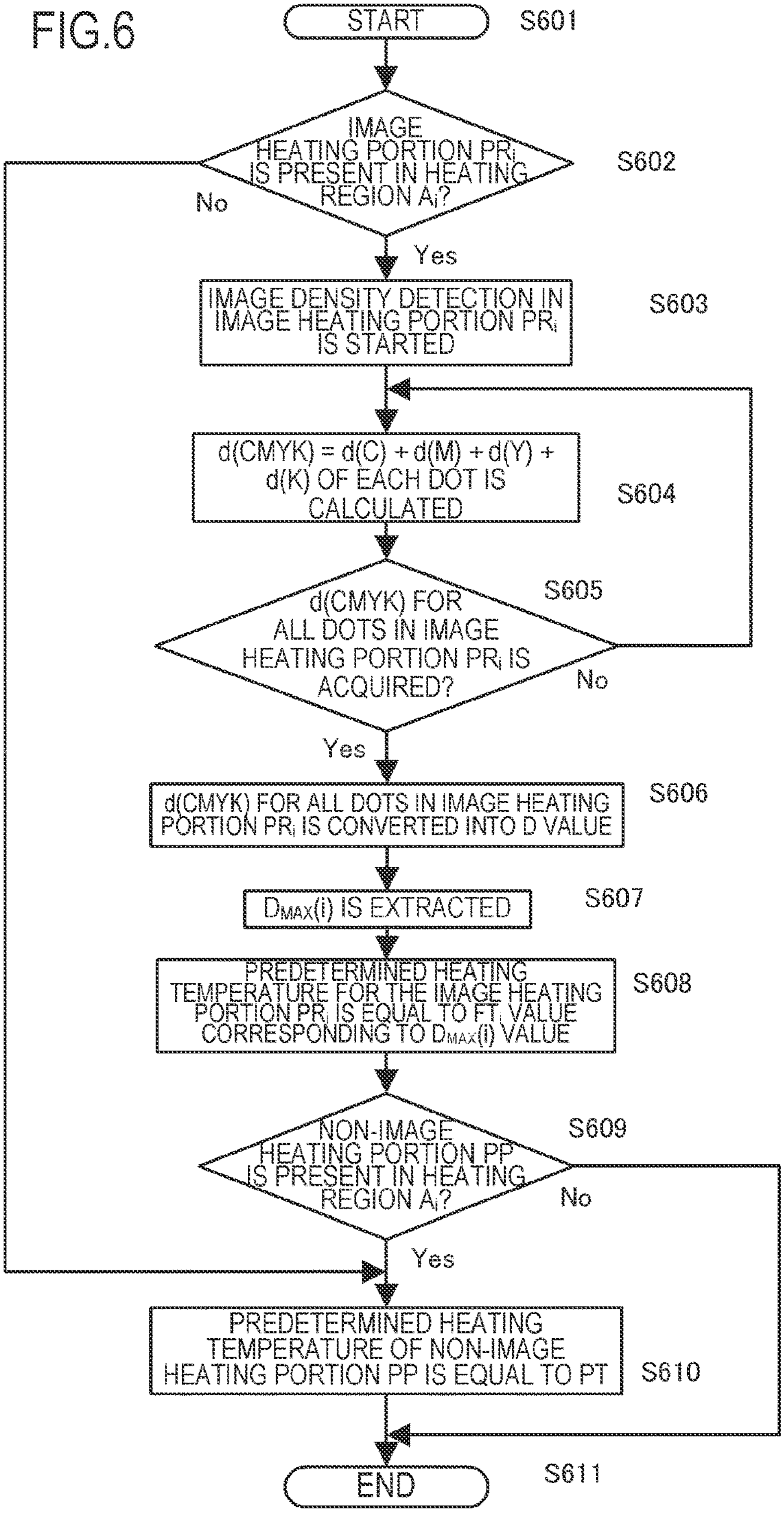
FIG. 6 is a flowchart showing a flow of acquiring a maximum value $D_{MAX}(i)$ of a toner amount conversion value D in Example 1.

FIG. 6 is a flowchart showing, in Example 1, a process of acquiring the maximum value $D_{MAX}(i)$ of the toner amount conversion value D in the image heating portion $PR_i$ in each heating region (for example, $A_1$) in each page and determining the predetermined heating temperature according to the maximum value $D_{MAX}(i)$. When the conversion to the bit map data is completed as described above, the flow starts from S601. In S602, it is confirmed whether the image heating portion $PR_i$ is present in the heating region $A_i$. If there is no image heating portion $PR_i$, the process proceeds to S610, the predetermined heating temperature PT for the non-image heating portion PP is set, and the process is terminated. When the image heating portion $PR_i$ is present, image density detection of each dot in the image heating portion $PR_i$ is started in S603. From the image data converted into CMYK image data, d(C), d(M), d(Y), and d(K) which are the image densities of C, M, Y and K for each dot are obtained. In S604, the sum value, that is, d(CMYK) is calculated. When this is performed for all the dots in the image heating portion $PR_i$ and acquisition of d(CMYK) for all dots is confirmed in S605, d(CMYK) is converted into the toner amount conversion value D in S606.

Here, the image information in the video controller 120 is an 8-bit signal, image densities d(C), d(M), d(Y), d(K) per toner single color are expressed in the range of minimum density 00h to maximum density FFh. The sum value d(CMYK) is a 2 byte and 8 bit signal. As described above, this d(CMYK) value is converted into the toner amount conversion value D(C) in S606. More specifically, the minimum image density 00h per toner monochrome is converted to 0, and the maximum image density FFh is converted to 100%. This toner amount conversion value D (%) corresponds to the actual toner amount per unit area on the recording material P, and in this example, the toner amount on the recording material is 0.50 $mg/cm^2$=100%.

Then, in S607, the toner amount conversion maximum value $D_{MAX}(i)$ (%) is extracted from the toner amount conversion values D (%) of all the dots in the image heating portion $PR_i$. d(CMYK) is a total value of a plurality of toner colors, and the value of the toner amount conversion maximum value $D_{MAX}(i)$ may exceed 100% in some cases. In the image forming apparatus of this example, the toner amount on the recording material P is adjusted so that the upper limit is 1.15 $mg/cm^2$ (corresponding to 230% in terms of the toner amount conversion value D) in the entire solid image. When the toner amount conversion maximum value $D_{MAX}(i)$ is obtained in S607, the $FT_i$ value (which will be described in detail later), which is the heating temperature corresponding to the toner amount conversion maximum value $D_{MAX}(i)$, is set as the predetermined heating temperature for the image heating portion $PR_i$ in S608. Next, in S609, it is confirmed whether the non-image heating portion PP is present in the heating region $A_i$, and if there is no non-image heating portion PP, the flow is ended as it is. If the non-image heating portion PP is present, the process proceeds to S610, the predetermined heating temperature PT for the non-image heating portion PP is set and the process is terminated.

The above flow is performed for the heating regions $A_i$ to $A_7$. For each region, a predetermined heating temperature $FT_i$ corresponding to each toner amount conversion maximum value $D_{MAX}(i)$ is set for the image heating portion $PR_i$. The predetermined heating temperature PT is set for the non-image heating portion PP.

FIG. 7 shows the relationship between the toner amount conversion maximum value $D_{MAX}(i)$ and the predetermined heating temperature $FT_i$ in the present example (i=1 to 7). In the present example, the predetermined heating temperature $FT_i$ is variable in five stages according to the toner amount conversion maximum value $D_{MAX}(i)$. A high temperature is set as the predetermined heating temperature $FT_i$ so that the toner is melted sufficiently for an image in which the toner amount conversion maximum value $D_{MAX}(i)$ is large and the toner amount is large. For the non-image heating portion PP where no image is formed, the predetermined heating temperature PT (for example, 120° C.) lower than the image heating portion $PR_i$ is set. The predetermined heating temperature PT is a fixed value.

7. Heater Control Correction Method According to Predicted Heat Storage Amount

As described above, with respect to each of the heating regions $A_1$ to $A_7$, for each region, a predetermined heating temperature $FT_i$ corresponding to each toner amount conversion maximum value $D_{MAX}(i)$ is set for the image heating portion $PR_i$. The predetermined heating temperature PT is set for the non-image heating portion PP. In the configuration of Example 1, the predetermined heating temperature thus determined is corrected in accordance with the predicted heat storage amount of each heating region, and the control target temperature TGT (details will be described later) which is one of the heating conditions for actually heating the recording material P is determined.

(Method for Determining the Predicted Heat Storage Amount)

First, in this example, a heat storage counter that indicates the thermal history of each of the heating regions $A_1$ to $A_7$ is provided. When the value of the heat storage counter is CT, the heat storage count value CT shows the heating history and heat radiation history about how much each heating region has been heated and how much heat has been released (details will be described later). Then, using the value CT of the heat storage counter, the heat storage amount of the region HRV as the predicted heat storage amount for the heating regions $A_1$ to $A_7$ is determined.

When determining the heat storage amount of the region $HRV_i$ for one heating region $A_i$, the values $CT_i$, $CT_{i-1}$, $CT_{i+1}$ of the heat storage counter for the heating region $A_i$ and the adjacent heating regions $A_{i-1}$, $A_{i+1}$ are used (details will be described later). In Example 1, the heat storage amount of the region HRV as the predicted heat storage amount is obtained every page (immediately after the printing of the page is executed). On the next page, in accordance with this value, the control target temperature TGT(PR) which is the temperature when actually heating the image heating portion $PR_i$ of the recording material P is determined. Hereinafter, the heat storage count value CT and the heat storage amount of the region HRV will be described in detail.

7-1. How to Count Heat Storage Counter

A method of determining the heat storage count value CT indicating the heating history and heat radiation history of each heating region will be described. Depending on the heating operation on the heating region and the paper passing state of the recording material, the heat storage counter for each heating region counts the thermal history according to the prescribed method. The count value CT of the heat storage counter is represented by the following (Equation 1).

$$CT=(TC\times LC)+(WUC+INC+PC)-(RMC+DC) \quad \text{(Equation 1)}$$

Referring to FIGS. 8A to 8C, (TC×LC), (WUC+INC+PC) as the heating history, and (RMC+DC) as the heat radiation history in (Equation 1) will be described. It is assumed that the heat storage count value CT in this example is updated every page (immediately after the printing of the page is executed).

The TC is a value determined according to the control target temperature TGT ($PR_i$) at the time of heating the image heating portion $PR_i$ of the recording material, as shown in FIG. 8A. The higher the control target temperature TGT($PR_i$) is, the larger the value becomes.

As shown in FIG. 8B, the LC is a value determined according to a distance HL (mm) at which heating is performed when the image heating portion $PR_i$ is heated. The longer the HL is, the larger the value is.

In the heating region where an image is formed, (TC×LC) for the image heating portion $PR_i$ and the other non-image heating portion PP is added to form one page.

As shown in FIG. 8C, the other WUC, INC, and PC are fixed values counted for a startup at the start of printing, an inter-sheet interval, and a post-rotation at the end of printing. These WUC, INC, and PC can also be changed accordingly, for example, when a startup time, the inter-sheet interval, and a post-rotation time have changed due to operating conditions. It is to be noted that the parameter representing the heating history is not limited to the above parameters. However, other parameters indicating the history of the heater temperature history or the power supplied to the heating element may be used.

Further, as shown in FIG. 8C, the RMC and DC are fixed values counted against the heat taken away from the image heating apparatus by the passage of the recording material P and the heat radiation to the outside air. In FIG. 8C, the value when one sheet of LETTER sized paper is passed is displayed. These RMC and DC can also be changed to values depending on the type of recording material and environmental conditions. The heat radiation count DC is also counted except during printing. When the specified time has elapsed, the prescribed value is counted (for example, counted up by 3 in one minute). It is to be noted that the parameter representing the heat radiation history is not limited to the above parameters. However, other parameters indicating the history of the passage of the recording material in the heating region and a period during which the power supply to the heating element is not performed may be used.

As described above, the count value CT of the heat storage counter in this example is counted on a page-by-page basis (immediately after the printing of the page is executed) only from the thermal history information for each region in each region.

7-2. Method for Determining the Heat Storage Amount of the Region

In Example 1, the heat storage amount of the region HRV as the predicted heat storage amount is obtained for each page (immediately after the printing of the page is executed)

from the above-described heat storage count value CT. Then, on the next page, the control target temperature $TGT(PR_i)$ which is the temperature when actually heating the image heating portion $PR_i$ of the recording material P is determined according to this value. First, when the count value of the heat storage counter for the heating region $A_i$ is represented by $CT_i$, the heat storage amount of the region $HRV_i$ for the heating region $A_i$ is calculated from the heat storage count values $CT_{i-1}$, $CT_i$, $CT_{i+1}$ by the following (Equation 2).

$$HRV_i=CT_i+\alpha(CT_{i-1}+CT_{i+1}) \quad \text{(Equation 2)}$$

Here, α is a constant.

As can be seen from (Equation 2), the heat storage amount of the region $HRV_i$ for one heating region $A_1$ is a value determined from the heating region $A_i$ as the heating region and the thermal history of the adjacent heating regions $A_{i-1}$, $A_{i+1}$ on both sides of the heating region $A_i$. This value is a value indicating the predicted heat storage amount of the heating region $A_i$. The heat storage amount of the region $HRV_i$ of the heating regions $A_1$ and $A_7$ at both ends is determined from the thermal history of one heating region adjacent to the heating region.

The constant α in (Equation 2) is a value indicating the degree of influence of the thermal history of the adjacent heating region on the predicted heat storage amount of the heating region, and in the configuration of Example 1, α=0.2. As described above, in the image forming apparatus according to the present example, the predicted heat storage amount of each heating region is determined in consideration of the thermal history of the heating region adjacent to the region, thereby improving the prediction accuracy of the predicted heat storage amount. In the present example, by using the heat storage amount of the region $HRV_i$ determined in this way, and correcting the predetermined heating temperature $FT_i$ for the image heating portion $PR_1$, a more appropriate control target temperature $TGT(PR_i)$ can be obtained.

FIG. 9 shows the relationship between the heat storage amount of the region $HRV_i$ and the correction value VA with respect to the predetermined heating temperature $FT_i$. In the fixing apparatus in Example 1, the heat accumulation state and the image characteristics after fixing are confirmed in advance, and from the result, the relationship between the heat storage amount of the region $HRV_i$ and the correction value VA for the predetermined heating temperature $FT_i$ is determined. In this example, for the non-image heating portion PP, no correction is made by the heat storage amount of the region $HRV_i$ (the control target temperature TGT (PP)=120° C. regardless of the value of the region thermal storage amount $HRV_i$).

7-3. Method of Determining Control Target Temperature

Figure 10:
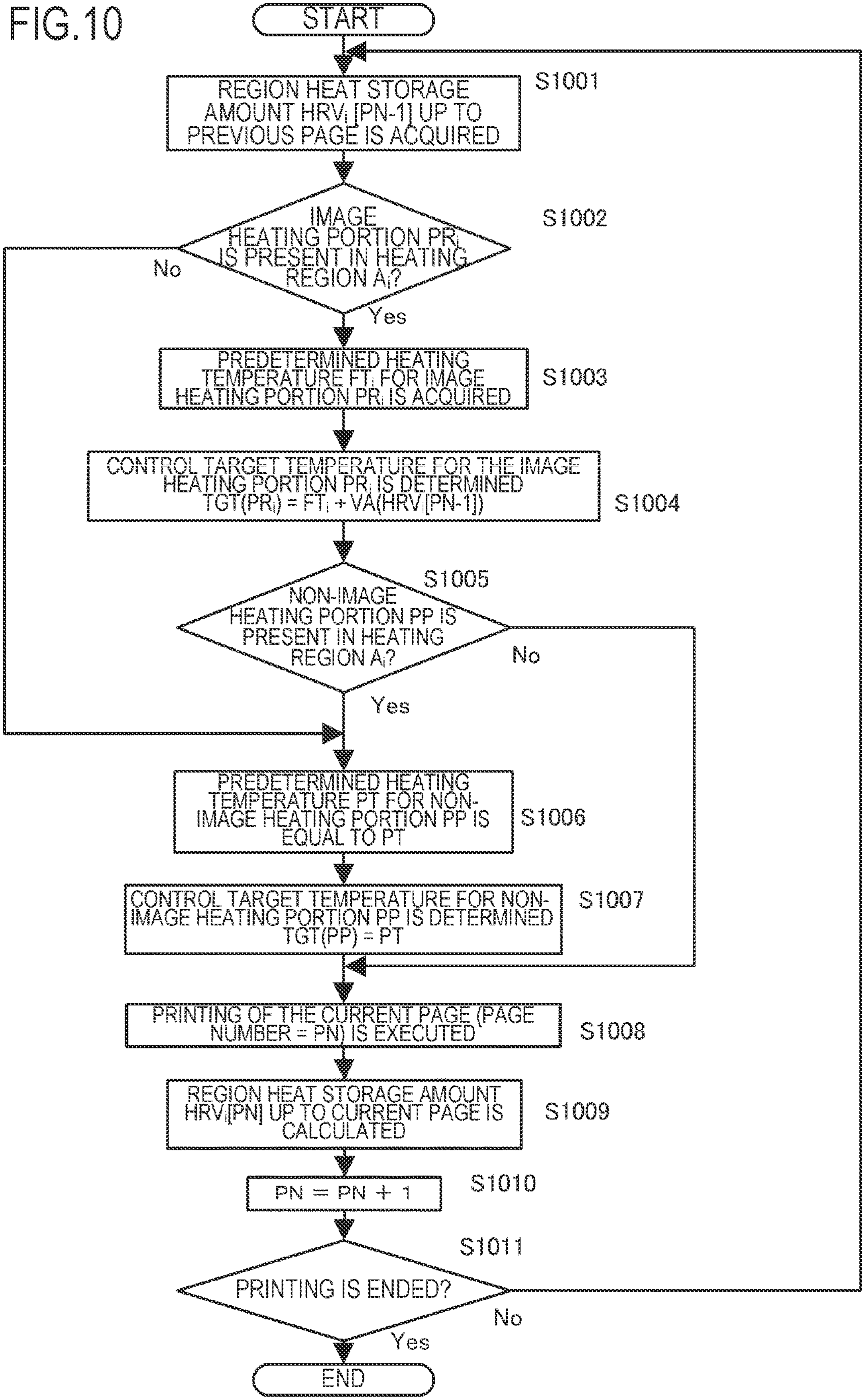
FIG. 10 is a flowchart of a TGT determination flow of an image heating portion $PR_i$ and a non-image heating portion PP.

FIG. 10 shows a determination flow of the control target temperature TGT for the image heating portion $PR_i$ and the non-image heating portion PP in the heating region $A_i$ in this example. Here, the current page number is represented by PN. When the flow starts, first in S1001, the heat storage amount of the region $HRV_i[PN-1]$ up to the previous page is acquired. In S1002, it is confirmed whether the image heating portion $PR_i$ is present in the heating region $A_i$. When the image heating portion $PR_i$ is present, in S1003, the predetermined heating temperature $FT_i$ determined by the above-described control flow of FIG. 6 is acquired for the image heating portion $PR_i$. If the image heating portion $PR_i$ is not present, the process goes to S1006 to determine the control target temperature for the non-image heating portion PP.

In S1004, correction is performed according to the predicted heat storage amount with respect to the predetermined heating temperature $FT_i$ for the image heating portion $PR_i$ obtained in S1003. First, in accordance with FIG. 9, in response to the heat storage amount of the region HRV; [PN−1] up to the previous page obtained in S1001, the correction value VA(HRV; [PN−1]) for the predetermined heating temperature $FT_i$ is selected. Next, using the correction value $VA(HRV_i\ [PN-1])$, correction is performed on the predetermined heating temperature $FT_i$ using the following (Equation 3), and the control target temperature TGT $(PR_i)$ for the image heating portion $PR_i$ is determined.

$$TGT(PR_i)=FT_i+VA(HRV_i[PN-1]) \quad \text{(Equation 3)}$$

As described above, when the control target temperature $TGT(PR_i)$ for the image heating portion $PR_i$ is determined in S1004, in S1005, it is confirmed whether the non-image heating portion PP is present in the heating region $A_i$. When the non-image heating portion PP is present, in S1006 and S1007, the predetermined heating temperature PT and the control target temperature TGT(PP) for the non-image heating portion PP are determined (TGT(PP)=PT), and the process proceeds to S1008. If the non-image heating portion PP is not present, the process proceeds directly from S1005 to S1008. In step S1008, printing of the current page (page number=PN) is executed using the control target temperature TGT determined in the flow up to this point. Next, in S1009, the heat storage amount of the region $HRV_1[PN]$ up to the current page is calculated, and in S1010 the page number is updated to that of the next page. In S1011, it is confirmed whether the printing is ended. If the printing is ended on the current page, the flow ends here, and in the case where the printing is continued, the flow from S1001 is repeated.

8. Comparison with Comparative Example

Figure 11:
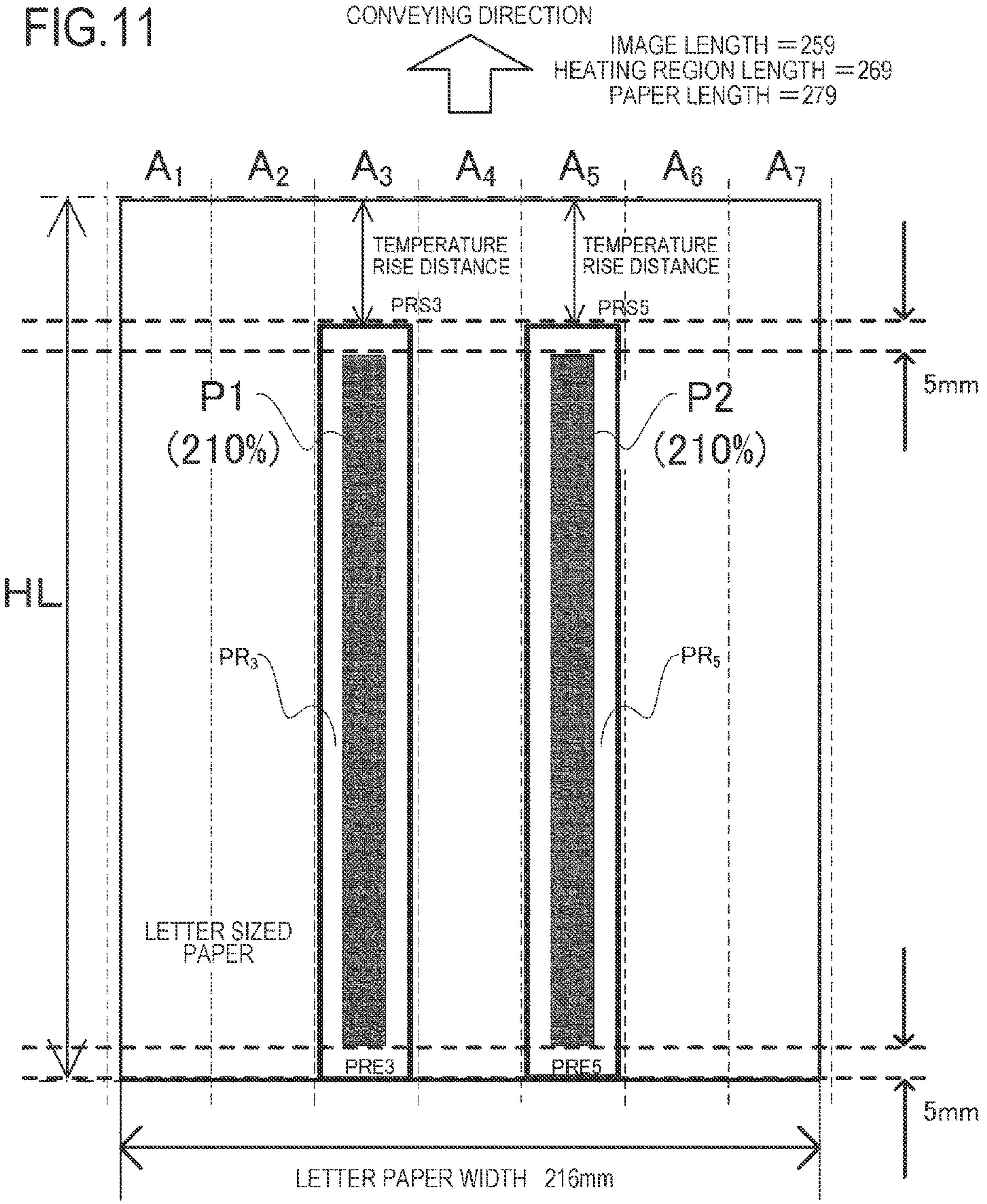
FIG. 11 is an explanatory view of an example of an image pattern in Example 1.
Figure 13:
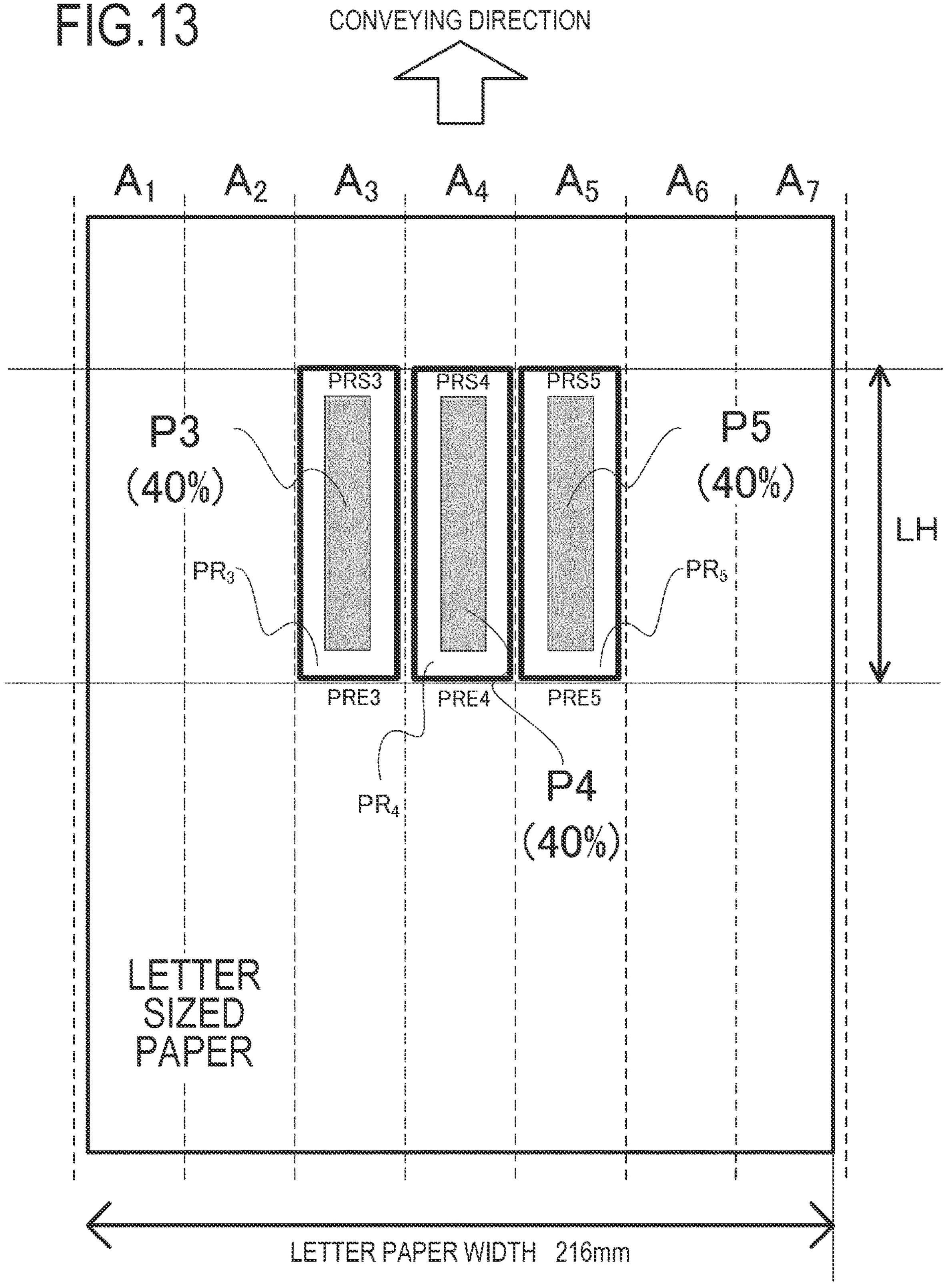
FIG. 13 is an explanatory view of an example of an image pattern in Example 1.

From here, a manner in which the prediction accuracy of the predicted heat storage amount is improved by the present invention will be described while comparing with the configuration of the comparative example. Description will be given taking as an example a case where printing is performed by using the two types of image patterns shown in FIGS. 11 and 13 shown below.

8-1. Description of Image Pattern

The image patterns shown in FIGS. 11 and 13 will be described. FIG. 11 shows images P1 and P2 formed on the LETTER sized paper. These images P1 and P2 are tertiary colors of uniform image density of cyan (C), magenta (M), and yellow (Y). It is assumed that both the values obtained by converting the image density of P1 and P2 into the toner amount conversion value D (%) are 210%. It is assumed that an image is not formed in the heating region, $A_1$, $A_2$, $A_4$, $A_6$, and $A_7$. The image heating portions $PR_i$ in the heating regions $A_3$ and $A_5$ are $PR_3$ and $PR_5$, a start portion thereof is indicated by PRS, and an end portion is indicated by PRE. In the present example, the start portion PRS of the image heating portion $PR_i$ is set at the tip side of the recording material by 5 mm from the leading edge of the image. In addition, the end portion PRE of the image heating portion $PR_i$ in the present example has been set at the rear end side of the recording material by 5 mm from the rear end portion of the image.

Here, as described above, the temperature at which the recording material P is actually heated is referred to as the control target temperature TGT. In this example, up to the start portion PRS of the image heating portion $PR_i$, the heater temperature is raised from the control target temperature TGT(PP) (for example, the predetermined heating temperature PT=120° C.) for the non-image heating portion PP to the control target temperature $TGT(PR_i)$ used for heating the image heating portion $PR_i$. That is, up to the start portion PRS of the image heating portion $PR_i$, the temperature raising is started so that the surface temperature of the fixing film 202 reaches the temperature required for fixing the image.

In Example 1, the heated distance HL (mm) shown in FIG. 8B is a distance obtained by adding the length of the image heating portion $PR_i$ in the recording material conveying direction and the above-described distance required for temperature raising. According to the distance HL (mm) at which heating is performed, the value of LC in the above-described (Equation 1) is determined and used for calculation of the heat storage count value CT. In the image pattern of FIG. 11, the distance HL (mm) for heating the image heating portions $PR_7$ and $PR_5$ is 279 mm which is equal to the conveying direction length of the LETTER sized paper. It is assumed that the above-described temperature raising operation is started from the leading edge of the recording material. The heating distance HL (mm) for the image used in the following description is also the distance obtained by adding the length of the image heating portion PR in the recording material conveying direction and the distance required for the temperature raising operation, as described above.

FIG. 12 shows the values of the toner amount conversion maximum value $D_{MAX}$ of the image heating portion $PR_i$, the predetermined heating temperature $FT_i$ and the predetermined heating temperature PT of the non-image heating portion PP in each heating region $A_1$ to $A_7$ of the image pattern of FIG. 11. The values are determined by the method described in FIGS. 6 and 7.

FIG. 13 shows an image pattern in which an image P3 in the heating region $A_3$, an image P4 in the heating region $A_4$, and an image P5 in the heating region $A_5$ are formed. The images P3, P4, and P5 are formed such that a tertiary color of cyan (C), magenta (M), and yellow (Y) having a toner amount conversion value D (%) of 40% is uniformly formed (toner amount conversion maximum value $D_{MAX}$(i) (%)=40%). It is assumed that an image is not formed in the heating region, $A_1$, $A_2$, $A_6$, and $A_7$. The image heating portions $PR_i$ in the heating regions $A_3$, $A_4$, $A_5$ are $PR_3$, $PR_4$, and PRs, the start portion thereof is indicated by PRS and the end portion is indicated by PRE.

8-2. Explanation of Comparison Condition

Using the above two types of image patterns shown in FIGS. 11 and 13, the following printing is performed. First, 30 image patterns of FIG. 11 are continuously printed on the LETTER sized paper. Immediately thereafter, one image pattern of FIG. 13 is printed on the LETTER sized paper. At this time, when printing the image pattern of FIG. 13, at the conveying direction position LH in FIG. 13, what kind of temperature is set to the control target temperature TGT for each heating region will be compared with Example 1 of the present invention which will be described below in the comparative example.

8-3. Explanation of Example 1

In the present example, using the heat storage amount of the region $HRV_i$ obtained from the above-described (Equation 1) and (Equation 2), the predetermined heating temperature $FT_i$ for the image heating portion $PR_i$ is corrected and the control target temperature $TGT(PR_i)$ is determined, according to FIG. 9. As described above, FIG. 9 shows the relationship between the heat storage amount of the region $HRV_i$ and the correction value VA with respect to the predetermined heating temperature $FT_i$.

Figure 15A:
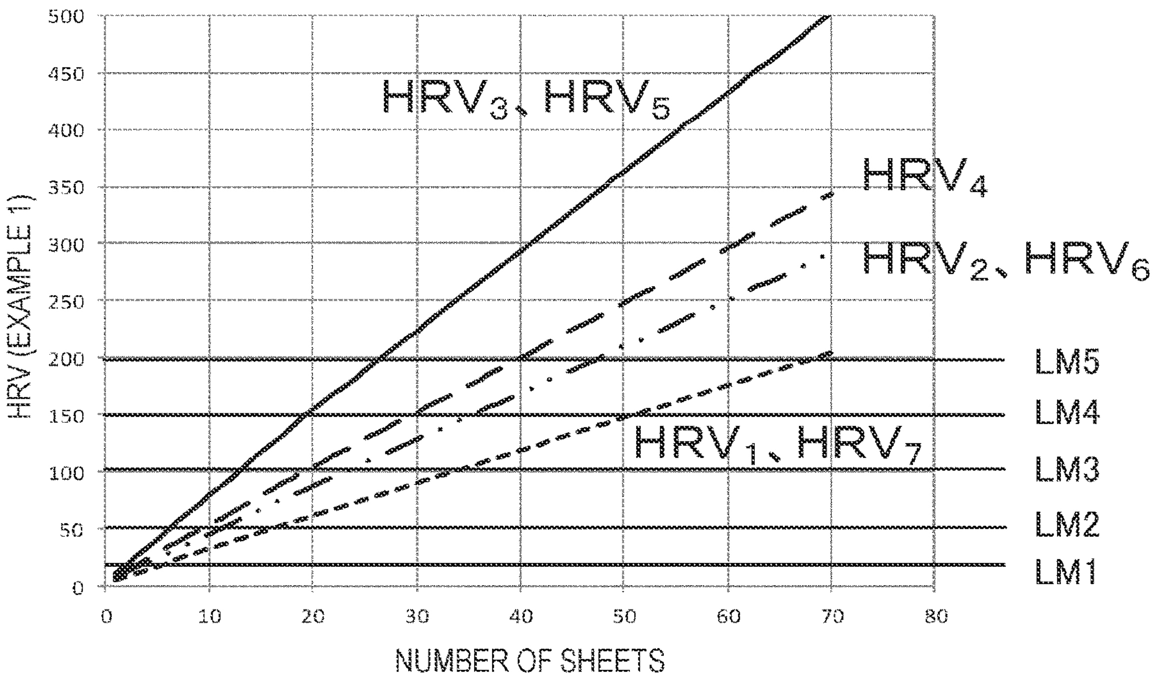
FIGS. 15A and 15B are explanatory views of transition between HRV of Example 1 during continuous printing and CT of Comparative Example 1-2.

First, the heat storage amount of the region HRV; of Example 1 in each of the heating regions $A_1$ to $A_7$ when the LETTER sized paper is continuously printed with the image pattern of FIG. 11 is confirmed. FIG. 15A shows the transition of the heat storage amount of the region $HRV_Z$ in Example 1 when the image pattern of FIG. 11 is continuously printed. In the relationship between the heat storage amount of the region $HRV_i$ and the correction value VA with respect to the control target temperature $TGT(PR_i)$, shown in FIG. 9, LM1 to LM5 in FIG. 15A indicate the value of the heat storage amount of the region HRV in which the correction value VA changes. Specifically, the values of LM1, LM2, LM3, LM4, LM5 are in order of 20, 50, 100, 150, 200.

As shown in FIG. 15A, the transition of the heat storage amount of the region $HRV_i$ in Example 1 is divided into four types. First, the increase rate of the heat storage amount of the region HRV; is the fastest in the heating regions $A_3$ and $A_5$ where the image is formed, and the increase rate is the second fastest in the heating region $A_4$ sandwiched between the heating regions where the image is formed. The increase rate of the heat storage amount of the region $HRV_i$ is the third fastest in the heating regions $A_2$ and $A_6$ in contact with the heating region where an image is formed only on one side, and the increase rate is the slowest in the heating regions $A_1$ and $A_7$ located at both ends. The value of the heat storage amount of the region immediately after 30 sheets of paper printing is 223.8 for $HRV_3$ and $HRV_5$, 152.1 for $HRV_4$, 128.2 for $HRV_2$ and $HRV_6$, and 89.4 for $HRV_1$ and $HRV_7$.

With reference to FIG. 16, immediately after printing 30 sheets of LETTER sized paper in the image pattern of FIG. 11, the control target temperature TGT set at the conveying direction position LH in FIG. 13 when printing the image pattern of FIG. 13 will be described. FIG. 16 shows, in each heating region in the image pattern of FIG. 13, the toner amount conversion maximum value $D_{MAX}$(i) for the image heating portion $PR_i$, the predetermined heating temperature $FT_i$ corresponding thereto, and the predetermined heating temperature PT for the non-image heating portion PP. Based on these values, the control target temperatures determined in the configurations of Example 1 and Comparative Example 1-1 and Comparative Example 1-2 described below are shown.

As described above, in Example 1, the heat storage amount of the region $HRV_i$ is calculated as the predicted heat storage amount of each heating region by printing 30 sheets of paper of the immediately preceding image pattern of FIG. 11, and from the above-described (Equation 3), the control target temperature $TGT(PR_i)$ is determined. In Example 1, the values of $TGT(PR_i)$, $TGT(PR_4)$ and TGT(PRs) are 185° C., 187° C. and 185° C., respectively.

8-4. Explanation of Comparative Example 1-1

In Comparative Example 1-1, the predetermined heating temperature $FT_i$ is used as it is as the control target temperature $TGT(PR_i)$ in the image heating portion $PR_i$ of each heating region without performing correction by the heat storage amount in each heating region. In Comparative Example 1-1, the correction by the heat storage amount is not performed; therefore, the predetermined heating temperature $FT_i$ is used as it is for the control target temperature TGT(PR). Therefore, as shown in FIG. 16, the values of TGT($PR_3$), TGT($PR_4$) and TGT($PR_5$) are 193° C., 193° C. and 193° C., respectively, in Comparative Example 1-1.

8-5. Explanation of Comparative Example 1-2

Comparative Example 1-2 has a configuration in which the predicted heat storage amount of each heating region is determined only from the thermal history of the heating region, and based on this predicted heat storage amount, the predetermined heating temperature $FT_i$ for the image heating portion $PR_i$ is corrected to determine the control target temperature TGT($PR_i$). That is, the count value $CT_i$ of the heat storage counter is used as it is as the predicted heat storage amount for comparison.

Figure 15B:
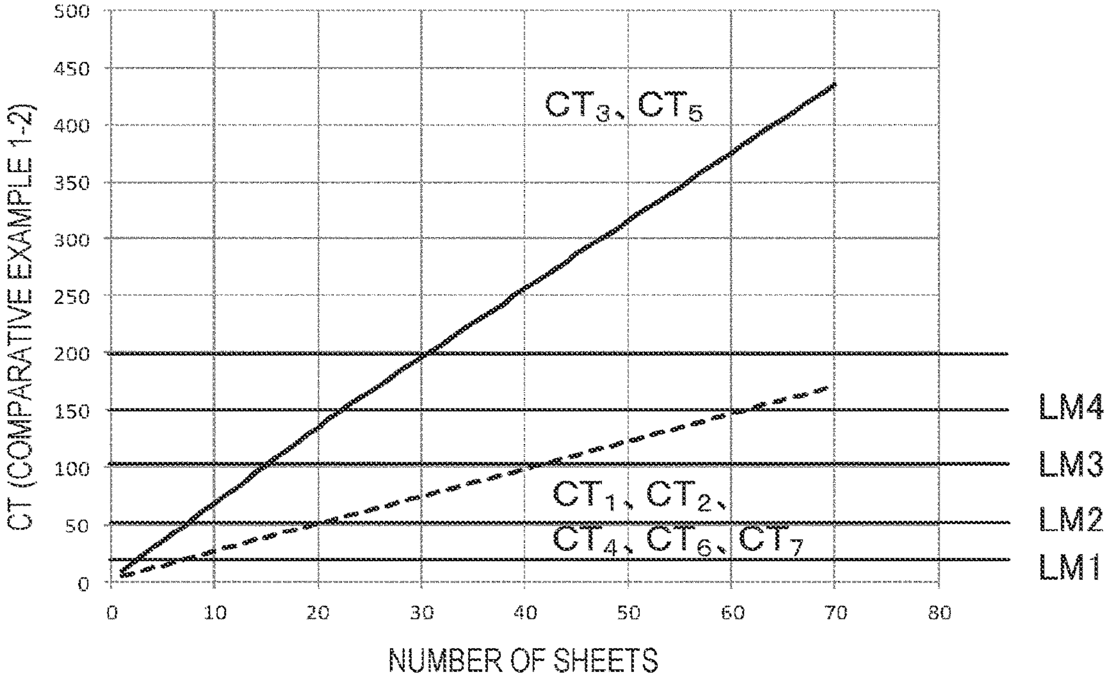

FIG. 14 shows the relationship between the count value $CT_i$ of the heat storage counter in Comparative Example 1-2 and the correction value VA with respect to the predetermined heating temperature $FT_i$. FIG. 15B shows the transition of the heat storage count value $CT_i$ in Comparative Example 1-2 when the image pattern of FIG. 11 is continuously printed. The transition of the heat storage count value $CT_i$ is different between the heating regions $A_3$ and $A_5$ where the image is formed and the heating regions $A_1$, $A_2$, $A_4$, $A_6$, and $A_7$ where no image is formed. The increase rate of the heat storage count value $CT_i$ is faster in the heating region where the image is formed. The heat storage count values immediately after 30 sheets are printed are 195.8 for $CT_3$ and $CT_5$, and 74.5 for $CT_1$, $CT_2$, $CT_4$, $CT_6$, and $CT_7$.

In Comparative Example 1-2, the heat storage count value $CT_i$ is calculated as the predicted heat storage amount of each heating region by the immediately preceding 30 sheets of printing, and using the correction value VA obtained from FIG. 14 described above, the control target temperature TGT($PR_i$) is determined from the following (Equation 4).

$$TGT(PR_i)=FT_i+VA(CT_i[PN-1]) \quad \text{(Equation 4)}$$

As shown in FIG. 16, in Comparative Example 1-2, the values of TGT ($PR_3$), TGT ($PR_4$) and TGT ($PR_5$) are 187° C., 191° C. and 187° C., respectively.

8-6. Comparison Between Examples and Comparative Example

As described above, regardless of the same print history and the same printing condition, the control target temperature for the image heating portion $PR_i$ varies depending on the configuration. In Example 1, since the heat storage amount prediction is performed in consideration of the influence of the thermal history of the adjacent heating region, a value close to the actual heat storage amount can be predicted more accurately than the comparative example. Therefore, the values of the control target temperatures TGT($PR_3$), TGT($PR_4$) and TGT($PR_i$) for the image heating region in FIG. 13 are set lower than those in the comparative example.

In Comparative Example 1-1 and Comparative Example 1-2 in which the control target temperature is set higher than in Example 1. Excessive heat is supplied to the image heating region. As a result, in Comparative Example 1-1 in which the heat storage amount is not considered at all, the toner of images P3, P4, and P5 adheres to the surface of the fixing film 202 due to overheating, and a so-called hot offset disadvantageously occurs in which the toner adheres to the recording material one rotation after the rotation. In Comparative Example 1-2 in which the control target temperature is determined in consideration of only the thermal history of the heating region, although the hot offset as described above does not occur, the control target temperatures TGT($PR_3$), TGT($PR_4$) and TGT(PRS) are set higher than that in Example 1. Therefore, unnecessary electric power is consumed by the high temperature setting, and power saving performance is lowered.

As described above, in the image forming apparatus for adjusting heating conditions of the plurality of heating blocks provided in a longitudinal direction according to image information, it is possible to accurately predict the heat storage amount of each heating region in Example 1. This makes it possible to obtain a good output image while improving power saving performance.

In the above example, the control target temperature is set as the heating condition in accordance with the predicted heat storage amount. However, as the heating condition, for example, the power to be supplied to the heater may be adjusted according to the predicted heat storage amount of each heating region. Further, for example, as the heating condition, the heating start timing can be made variable according to the predicted heat storage amount. When the predicted heat storage amount is small, the fixing apparatus may be warmed up by advancing a heating start timing. In the description of the present example, the control target temperature at the time of the previous printing is used as the thermal history to be referred to when anticipating the heat storage amount, but by referring to the supplied power supplied to the heater and according to this power amount It is also possible to estimate the heat storage amount. In the present example, the acquisition (updating) of the heat storage amount of the region HRV as the predicted heat storage amount is performed for each page, that is, each time one recording material passes through the image heating portion. However, the update frequency may be set for each predetermined page (every time a specified number of sheets are passed).

For ease of explanation, Example 1 is described using a configuration in which correction by the heat storage amount of the region $HRV_i$ is not performed for the non-image heating portion PP (control target temperature TGT(PP) =120° C. regardless of the value of heat storage amount of the region $HRV_i$). However, the non-image heating portion PP can also be corrected by the heat storage amount of the region $HRV_i$ to achieve further power saving.

Example 2

In Example 2 of the present invention, the plurality of image heating portions PR are set in the heating region $A_i$, and the optimum control target temperature TGT is set for each individual image heating portion PR. With this configuration, it is possible to further improve the power saving performance as compared with the configuration used in Example 1. Since the configurations of the image forming apparatus, the fixing apparatus (image heating apparatus), the heater, and the heater control circuit in Example 2 are the same as those in Example 1, the description thereof will be omitted. Items not specifically described in Example 2 are the same as those in Example 1.

Figure 17:
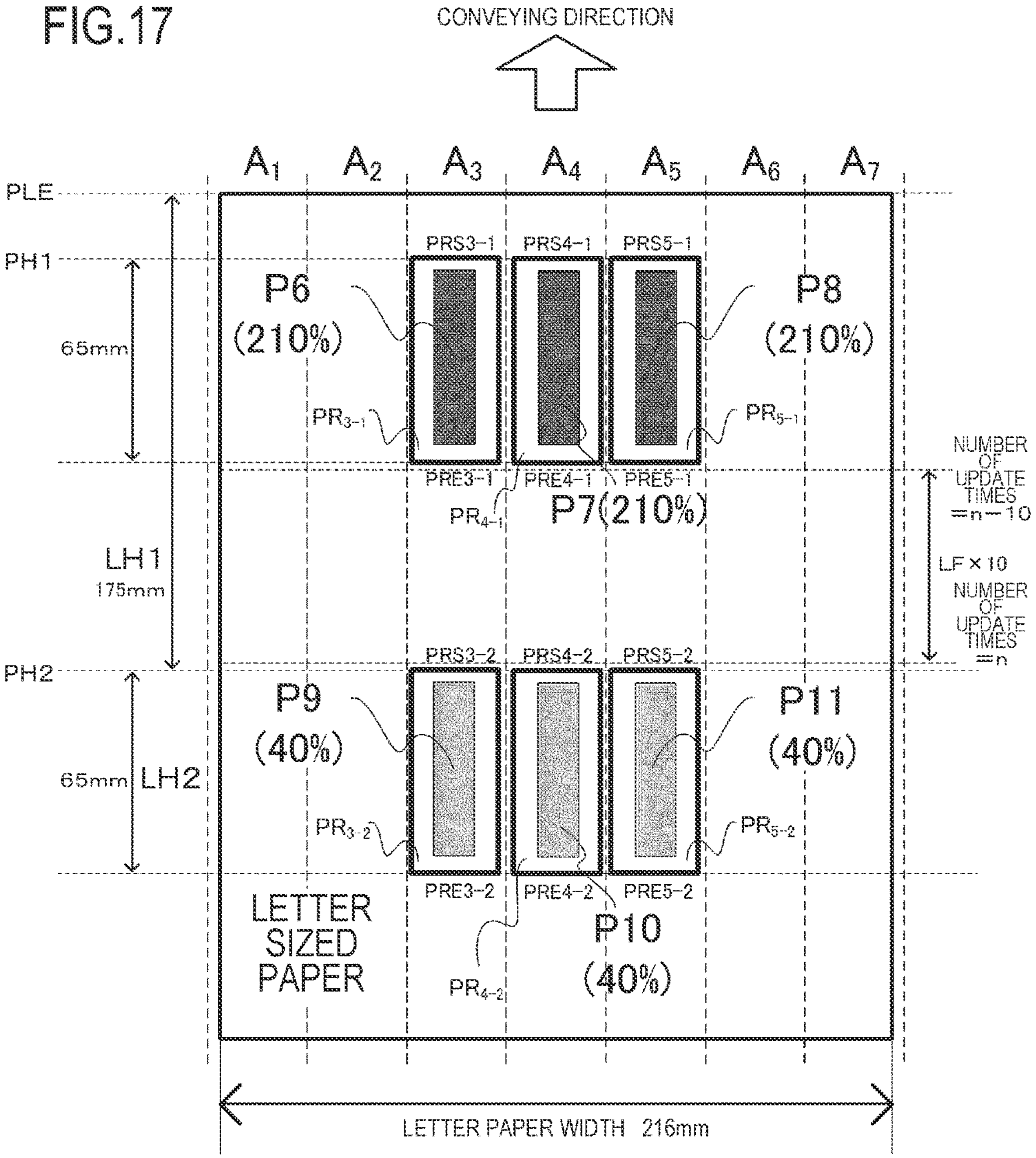
FIG. 17 is an explanatory view of an example of an image pattern in Example 2.

9. Method of Determining Control Target Temperature for Plural Image Heating Sections PR This will be explained using the image pattern shown in FIG. 17. FIG. 17 shows images P6 to P11 formed on a LETTER sized paper. These images P6 to P11 are tertiary colors of uniform image density of cyan (C), magenta (M), and yellow (Y). The value obtained by converting the image density of P6 to P8 into the toner amount conversion value D (%) is 210%, and the value obtained by converting the image density of P9 to P11 to the toner amount conversion value D (%) is 40'. The image heating portions set for the respective images P6 to P11 are $PR_{3-1}$, $PR_{4-1}$, $PR_{5-1}$, $PR_{3-2}$, $PR_{4-2}$, and $PR_{5-2}$, respectively. The length in the conveying direction of all the image heating portions is 65 mm. The start portions PRS3-2, 4-2, and 5-2 of the image heating portions $PR_{3-2}$, $PR_{4-2}$, and $PR_{5-2}$ are positioned 175 mm downstream from the leading edge PLE of the recording material. In the present example, for example, separate control target temperatures are set for $PR_{4-1}$ and $PR_{4-2}$ in the heating region $A_4$. At this time, with reference to the predicted heat storage amount of the heating region $A_4$ immediately before the image heating portion, the same correction as in Example 1 is performed based on this predicted heat storage amount.

9-1. How to Update Heat Storage Count Value, and Heat Storage Amount of the Region In Example 2, the value of the heat storage amount of the region $HRV_i$ is updated at a regular interval, and the control target temperature TGT(PR) for the image heating portion PR is determined according to the heat storage amount of the region $HRV_i$ just before the respective image heating portions PR start. That is, in the present example, the value of the heat storage amount of the region $HRV_i$ as the predicted heat storage amount is updated a plurality of times while one sheet of recording material passes through the fixing portion.

Here, in the present example, the update interval of the heat storage amount of the region $HRV_i$ is set to 5.58 mm as the conveying distance of the recording material. This length will be referred to as an update interval LF in the following description. As the update interval LF is set to a shorter distance, the value of the heat storage amount of the region $HRV_i$ closer to the actual heat storage amount can be obtained. However, if the distance is set to be shorter than necessary, calculation of the heat storage amount of the region HRV and the heat storage count value CT, which will be described later, requires to be frequently executed; therefore, the load of a calculation unit (not shown) of the control portion 113 that performs this calculation increases more than necessary, which is not preferable. Therefore, in Example 2, as the update interval LF capable of obtaining the heat storage amount of the region HRV with necessary and sufficient precision while avoiding the above adverse effect, 5.58 mm which is a distance equivalent to 1/50 of the length of LETTER sized paper in the conveying direction is adopted. It should be noted that an optimum value can be used for the update interval LF according to the configuration of the apparatus, printing speed, and the like.

In the present example, the value of the heat storage amount of the region $HRV_i$ is successively updated at an update interval LF, and the control target temperature TGT (PR) for the image heating portion PR is determined according to the heat storage amount of the region $HRV_i$ just before the respective image heating portions PR start. Let n denote the number of update times since the image forming apparatus is turned on and the heat storage amount of the region $HRV_i$ has been updated. The number of update times n is reset when the power supply is turned on, and then counted up at an interval of the update interval LF.

9-2. Method of Determining Heat Storage Amount of the Region

In Example 2, the heat storage amount of the region in the heating region $A_i$ is $HRV_{i[n]}$, and the heat storage count value is $CT_{i[n]}$. The initial value of the heat storage amount of the region when the power supply is turned on is $HRV_{i[0]}$, and the initial value of heat storage count is $CT_{i[0]}$. As in Example 1, the heat storage amount of the region $HRV_{i[n]}$ in the heating region $A_1$ is calculated as the heat storage count values $CT_{i[n]}$, $CT_{i-1[n]}$, and $CT_{i+1[n]}$ in the heating regions $A_i$, $A_{i-1}$, and $A_{i+1}$, and it is determined by (Equation 5) shown below.

$$HRV_{i[n]}=CT_{i[n]}+\alpha(CT_{i-1[n]}+CT_{i+1[n]}) \quad \text{(Equation 5)}$$

In addition, α is a constant, and also in Example 2, α=0.2 as in Example 1.

9-3. How to Count Heat Storage Counter

Next, the heat storage count value $CT_{i[n]}$ in this example will be described in detail. The parameters used in calculating the heat storage count value $CT_{i[n]}$ of this example are basically the same as (Equation 1) in Example 1. However, as values of these parameters, a value updated with the above-described update interval LF is used. The heat storage count value $CT_{i[n]}$ in Example 2 is expressed by the following (Equation 6):

$$CT_{i[n]}=CT_{i[n-1]}+(TC\times LC)_{i[n]}+(WUC+INC+PC)_{i[n]}-(RMC+DC)_{i[n]} \quad \text{(Equation 6)}$$

where $CT_{i[0]}=CT_{INT}$.

Referring to FIGS. 18A to 18D, TC, LC, RMC, DC, WUC, INC and PC in (Equation 6) will be described. The TC in (Equation 6) is a value determined according to the control target temperature TGT at the time of heating the recording material P, as shown in FIG. 18A. The higher the control target temperature TGT is, the larger the value becomes. FIG. 18A is completely the same as in FIG. 8A in Example 1. As shown in FIG. 18B, the LC in (Equation 6) is a value determined according to a distance HL (mm) at which heating is performed when the recording material P is heated. The longer the HL is, the larger the value is. In Example 2, the $(TC\times LC)_{i[n]}$ part in (Equation 6) is obtained according to the control target temperature TGT used at the update interval LF and the distance HL (mm) at which heating has been performed. Hence, the HL in FIG. 18B is set for a value range corresponding to the update interval LF (5.58 mm). When the control target temperature TGT changes within the update interval LF, in $(TC\times LC)_{i[n]}$, part, a value can be obtained by adding the control target temperature TGT and TC×LC corresponding to the distance at which heating has been performed, by the update interval LF.

As shown in FIG. 18C, the WUC, INC, and PC are fixed values counted for a startup at the start of printing, an inter-sheet interval, and a post-rotation at the end of printing, and the value shown in FIG. 18C is a value corresponding to the update interval LF. In Example 2, the time required for the startup at the start of printing, the inter-sheet interval, and the post-rotation at the end of printing at the time of normal operation are 180 times, 10 times, and 180 times of the update interval LF, respectively. At the time of startup at the start of printing, the inter-sheet interval, and at the time of post-rotation at the end of printing, for the $(WUC+INC+PC)_{i[n]}$ part in (Equation 6), values are obtained for each update interval LF using the values in FIG. 18C corresponding to the respective operations.

Also, the RMC, DC in (Equation 6) are fixed values counted against the heat taken away from the image heating apparatus by the passage of the recording material P and the heat radiation to the outside air. The value shown in FIG. 18D is a value corresponding to the update interval LF. As in Example 1, these RMC and DC can also be changed to values depending on the type of recording material and environmental conditions. For the $(RMC+DC)_{i[PN,n]}$ part in (Equation 6), the value is obtained using the value of FIG. 18D for each update interval LF. Further, as in Example 1, the heat radiation count DC of Example 2 is counted in addition to the time of printing, and when the specified time elapses, the specified value is counted (for example, counted up by 3 in one minute).

The initial value of the heat storage amount of the region when the power supply is turned on is $HRV_{i[0]}$, and the initial value of heat storage count is $CT_{i[0]}$. Here, the heat storage count value $CT_{i[0]}$ at n=0 is an initial value at the time of power-on or at the time of recovery from a power saving standby mode (hereinafter referred to as a sleep mode) used in a general image forming apparatus. As the value of the heat storage count value $CT_{i[0]}$, a value obtained based on the final value $CT_{i[n]}$ of the heat storage count stored at the time of the last power-off or transition to the sleep mode may be used. Further, as the value of the heat storage count value $CT_{i[0]}$, a value corresponding to the detected temperature of temperature detecting means such as a thermistor etc. provided in the image heating apparatus at the time of power-on or recovery from the sleep mode can also be used. The heat storage count value thus obtained at the time of power-on or at the time of recovery from the sleep mode is taken as the heat storage count initial value $CT_{INT}$. The heat storage count value $CT_{i[0]}$ at the start of the heat storage count is set to the above-described heat storage count initial value $CT_{INT}$.

Figure 19:
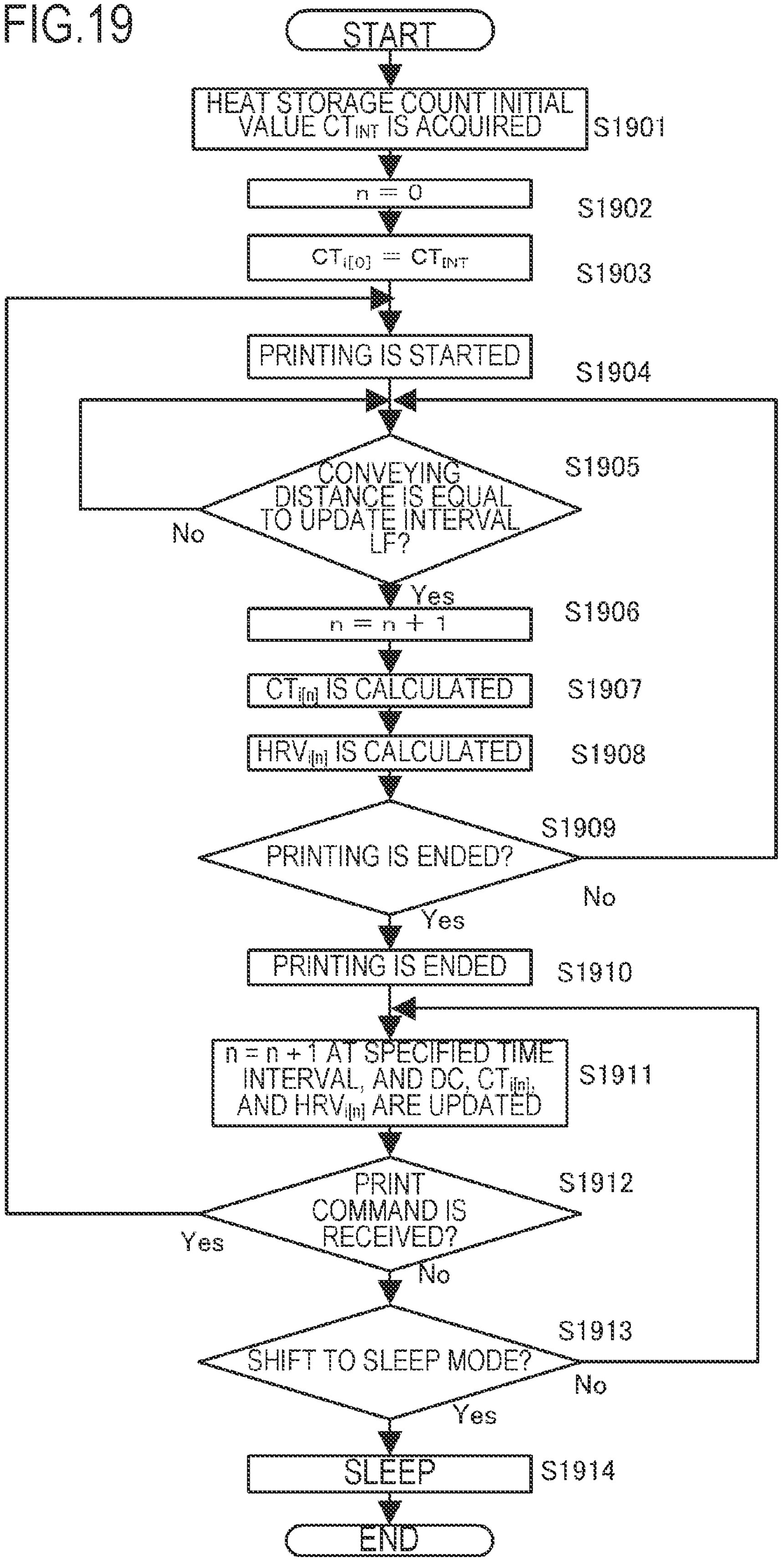
FIG. 19 is a flowchart for calculating a heat storage count value $CT_{i[n]}$ of a heating region $A_i$ of Example 2.

9-4. Update Flow of Heat Storage Count Value, and Heat Storage Amount of the Region FIG. 19 shows, in Example 2, a calculation flow of the heat storage count value $CT_{i[n]}$, and the heat storage amount of the region $HRV_{i[n]}$ of the heating region $A_i$, from the start of printing immediately after returning from the power-on or recovery from the sleep mode until the transition to the sleep mode again. First, in S1901, the initial value $CT_{INT}$ of the heat storage count described above is obtained. In S1902, n=0, and in S1903, the value of the initial value $CT_{INT}$ is set in $CT_{i[0]}$. Printing is started in S1904.

In S1905, when the conveying distance of the fixing film 202 and the pressure roller 208 advances by the update interval LF, the value of n is incremented in step S1906, and the updated value $CT_{i[n]}$ of the heat storage count is calculated in S1907. In the present example, in the same flow as above, the heat storage count values $CT_{i[n]}$ and $CT_{i+1[n]}$ of the adjacent heating region $A_{i-1}$ and the heating region $A_{i+1}$ are calculated. In S1908, the heat storage amount of the region $HRV_{i[n]}$ indicated by (Equation 5) described above is calculated using the above values. Thereafter, in S1909, it is confirmed whether printing is continued. When printing is continued, the flow from S1905 is repeated. When the end of printing is confirmed in S1909, printing ends in S1910.

After completion of printing, as described above, the value of n is incremented when the specified time elapses in S1911, and the heat radiation count DC is counted up by a specified value (for example, counted up by 3 in one minute). In conjunction with this, the heat storage count value $CT_{i[n]}$ and the heat storage amount of the region $HRV_{i[n]}$ are updated. In S1912, it is confirmed whether there is a next print command. If the next print command has come, the flow from S1904 is repeated.

If the next print has not come, it is confirmed in S1913 whether to shift to the sleep mode. In Example 2, if the next print command has not come during the predetermined specified elapsed time (for example, five minutes) from the end of printing, the process shifts to the sleep mode. In S1913, it is confirmed whether the specified elapsed time has been reached since the end of the previous printing. If the specified elapsed time has been reached, the process shifts to sleep in S1914, and the flow ends. If the specified elapsed time has not been reached, the process returns from S1913 to S1911 and the flow is continued. When the print command is received during sleep mode, the process returns from the sleep mode, and the flow starts from the beginning of FIG. 19.

As described above, the heat storage count value $CT_{i[n]}$, and the heat storage amount of the region $HRV_{i[n]}$ are obtained for every update interval LF at the time of printing, except for printing, at prescribed time intervals.

9-5. Method of Determining Control Target Temperature

In the present example, for each image heating portion PR, the predetermined heating temperature FT is determined in advance in the same manner as in Example 1 before the page on which the image heating portion PR is present reaches the fixing apparatus 200. Then, the predetermined heating temperature FT for each image heating portion PR is corrected by using the heat storage amount of the region HRV immediately before the start portion PRS of each image heating portion PR, and is set as the control target temperature TGT for the image heating portion PR. Further, in the heating region $A_i$, the start portion PRS displays $PR_{i[n]}$ as the image heating portion PR at the position corresponding to the section within the interval from the number of update times n to n+1.

In Example 2, the control target temperature $TGT(PR_{i[n]})$ for the image heating portion $PR_{i[n]}$ is determined as follows. That is, considering the heating time and the like from the start of heating until the surface temperature of the fixing film 202 reaches the temperature required for fixing the image, the heat storage amount of the region $HRV_{i[n-10]}$ before by the conveying distance corresponding to 10 times the update interval LF is used. In the present example, as described above, the heat storage amount of the region $HRV_{i[n-10]}$ before by the conveying distance corresponding to 10 times the update interval LF is used. Depending on the heat capacity of the image heating apparatus to be used and the electric power supplied to the heater, it is sufficient to select how far the heat storage amount of the region is to be used from the image heating portion.

In the image forming apparatus of this example, it is known beforehand where the image heating portion PR is located in the heating region $A_i$, and in which updating number interval the start portion PRS exists. Accordingly, when determining the control target temperature TGT(PR) for each of the image heating portions PR in the heating region $A_i$, it is also determined in advance which heat storage amount of the region HRV at which the number of update times is used. Therefore, when the heat storage amount of the region HRV used for correcting the control target temperature TGT(PR) for the image heating portion PR is obtained, using this value, the control target temperature TGT(PR) is determined, and the temperature raising operation for heating the image heating portion $PR_{i[n]}$ is started.

As described above, in the present example, when determining the control target temperature TGT $(PR_{i[n]})$ for the image heating portion $PR_{i[n]}$, the heat storage amount of the region $HRV_{i[n-10]}$ is used. Here, in the same manner as in Example 1, the predetermined heating temperature FT determined in advance for the image heating portion $PR_{i[n]}$ is displayed as $FT_{i[n]}$. The control target temperature TGT ($PR_{i[n]}$) for the image heating portion $PR_{i[n]}$ is obtained by correcting the predetermined heating temperature $FT_{i[n]}$ by using the heat storage amount of the region $HRV_{i[n-10]}$. In this case, as in Example 1, correction is performed according to the relationship between the heat storage amount of the region HRV shown in FIG. 9 and the correction value VA and is expressed by the following (Equation 7).

$$TGT(PR_{i[n]})=FT_{i[n]}+VA(HRV_{i[n-10]}) \quad \text{(Equation 7)}$$

As in Example 1, in this example, for the non-image heating portion PP, no correction is made by the heat storage amount of the region HRV (the control target temperature TGT(PP)=120° C. regardless of the value of the region thermal storage amount HRV).

10. Comparison with Example 1

Here, immediately after printing 29 sheets of LETTER sized paper in the image pattern of FIG. 11, the control target temperature TGT of Example 2 set at the conveying direction position LH2 in FIG. 17 when printing the image pattern of FIG. 17 will be described is compared with that of Example 1.

FIG. 20 shows, in each heating region in an LH2 part in FIG. 17, the toner amount conversion maximum value $D_{MAX}(i)$ for the image heating portion $PR_i$, the predetermined heating temperature $FT_i$ corresponding thereto, and the predetermined heating temperature PT for the non-image heating portion PP. In addition, FIG. 20 shows the control target temperatures TGT ($PR_i$) and TGT (PP) in the LH2 part, and the heat storage amount of the region HRV; used for determining the control target temperatures. The control target temperature TGT($PR_i$) for the image heating portion $PR_i$ in Example 2 and Example 1 is determined by the correction by the heat storage amount of the region $HRV_i$, but there are the following differences.

In Example 1, the heat storage amount of the region $HRV_{i[29]}$ is calculated as the predicted heat storage amount of each heating region by the immediately preceding 29 sheets of printing, and by using this, from the above-described (Equation 3), the control target temperature TGT ($PR_i$) is determined. Therefore, the heat storage amount of the region $HRV_{i[29]}$ does not include any thermal history of an LH1 part of FIG. 17 in the current page. On the other hand, in Example 2, the heat storage amount of the region $HRV_{i[n-10]}$ including the thermal history up to the number of update times n−10, that is, ten times before the number of update times n where the leading end PH2 of the LH2 part is located is calculated in addition to the predicted heat storage amount of each heating region by the immediately preceding 29 sheets of printing. By using this, the control target temperature TGT($PR_{i[n]}$) is determined in the same manner as in Example 1.

In Example 2 and Example 1, there is a difference in the value of the heat storage amount of the region $HRV_i$ by the thermal history up to the update number of times n−10 in the LH1 part of FIG. 17 on the current page. As a result, the control target temperature TGT ($PR_{4-2}$) for an image P10 in the heating region $A_4$ is set to a different temperature. In Example 2, the control target temperature TGT ($PR_{4-2}$) is set to 187° C., and is set to 189° C. in Example 1. Therefore, in Example 2 in which the control target temperature is kept low, it is possible to further improve the power saving performance as compared with the case of using the control of Example 1.

As described above, in Example 2, while the recording material P passes through the fixing nip portion N, the value of the heat storage amount of the region $HRV_{i[n]}$ is updated at the specified interval, and the control target temperature for the image heating portion is determined using the most recent value. As a result, the predicted heat storage amount of each heating region at that point in time can be calculated with higher accuracy than in Example 1; therefore, it is possible to improve power saving performance by using a more optimal control target temperature.

Also in this example, as in Example 1, the heating condition may be electric power or the like instead of the control target temperature.

For ease of explanation, as in Example 1, Example 2 is described using a configuration in which correction by the heat storage amount of the region $HRV_i$ is not performed for the non-image heating portion PP (control target temperature TGT(PP)=120° C. regardless of the value of heat storage amount of the region $HRV_i$). However, the non-image heating portion PP can also be corrected by the heat storage amount of the region $HRV_i$ to achieve further power saving.

In both of Examples 1 and 2, the heating condition is set using the image information and the thermal history, but the heating condition may be set using only the thermal history. That is, depending on the thermal history of the heating region heated by one heating element and the thermal history of the heating region heated by the heating element adjacent to one heating element, the heating conditions for controlling each of the plurality of heating elements may be set.

Example 3

Next, Example 3 of the present invention will be described.

Figure 21:
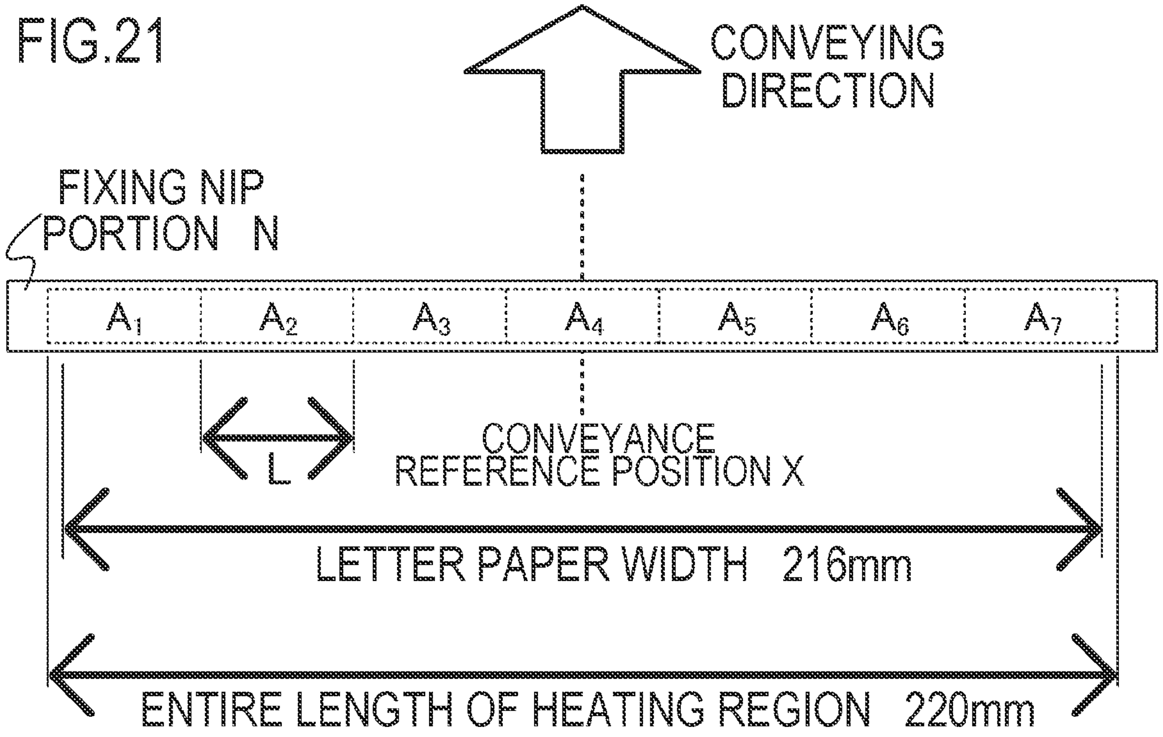
FIG. 21 is an explanatory view of a heating region of Example 3.
Figure 22:
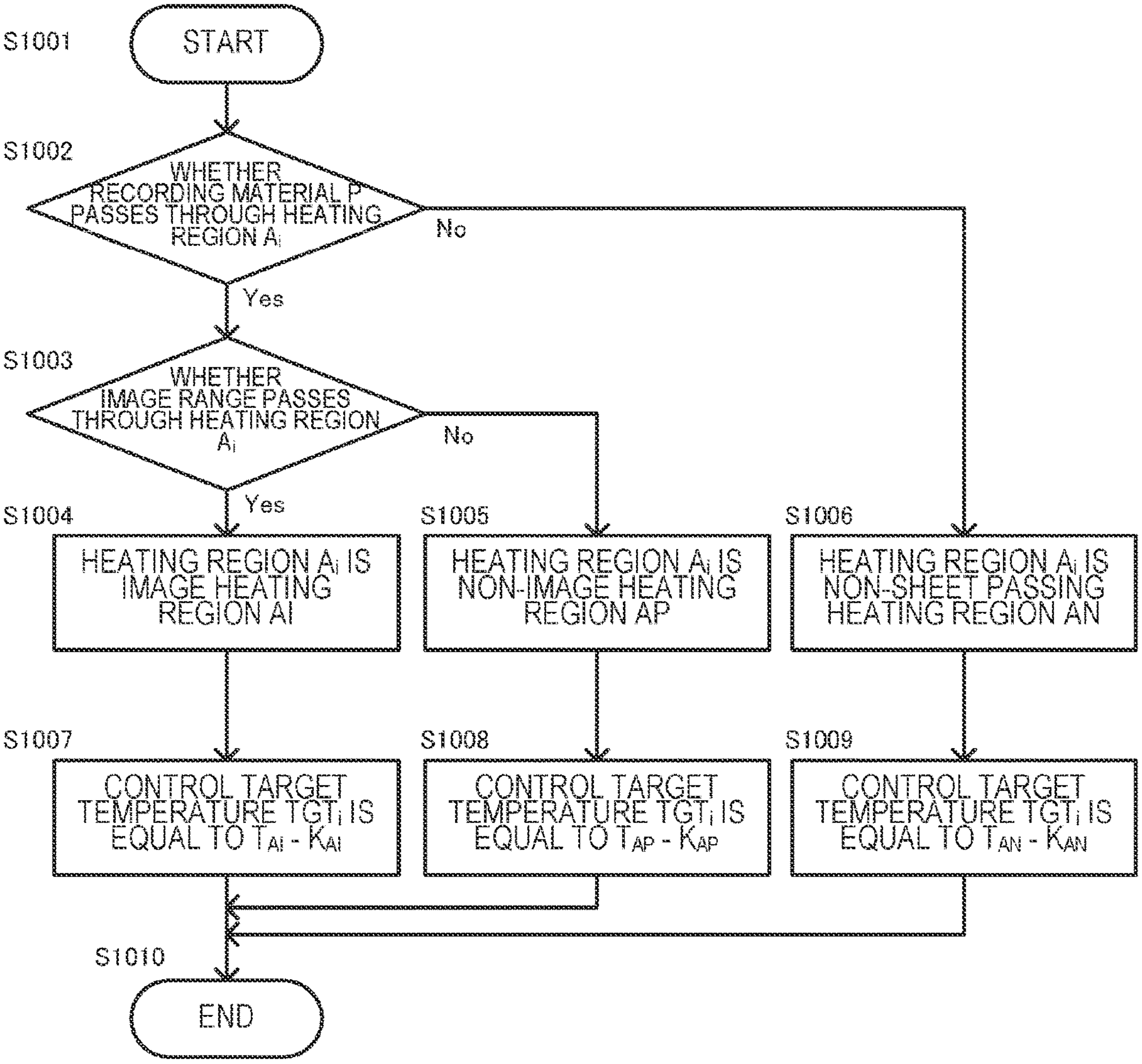
FIG. 22 is a flowchart for determining the classification of a heating region and a control target temperature according to Example 3.

FIG. 21 is a view showing the heating regions $A_1$ to $A_7$ in the present example, and shows in contrast to the paper width of LETTER sized paper. The heating regions $A_1$ to $A_7$ are regions (regions heated by the heating blocks $HB_1$ to $HB_7$) corresponding to the heating blocks $HB_1$ to $HB_7$ in the fixing nip portion N. The heating region $A_i$ (i=1 to 7) is heated by the heat generation of the heating block $HB_i$ (i=1 to 7). The total length of the heating regions $A_1$ to $A_7$ is 220 mm, and each region is equally divided into seven segments (L=31.4 mm). As shown in the flowchart of FIG. 22, each heating region $A_i$ (i=1 to 7) is classified into an image heating region AI as a first region, a non-image heating region AP as a second region, and a non-sheet passing heating region AN as a third region. In the present example, CPU 420 controls the heat generating quantity of each of the plurality of heating elements depending on the timing at which the heating region heated by each of the plurality of heating blocks (heating elements) is the first region AI including the image, the timing at which the heating region is the second region AP not including the image in the recording material, and the timing at which the heating region is the third region AN having no recording material.

FIG. 22 is a flowchart for determining the classification of the heating region and the control target temperature in the present example. The classification of the heating region $A_i$ is performed based on image data (image information) sent from an external device (not shown) such as a host computer and size information of the recording material. That is, it is determined whether the recording material P passes through the heating region $A_i$ (S1002). If the recording material P does not pass through the heating region $A_i$, the heating region $A_i$ is classified as the non-sheet passing heating region AN (S1006). When the recording material P passes through the heating region $A_i$, it is determined whether the image area passes through the heating region $A_i$ (S1003). When the recording material P passes through the heating region $A_i$, the heating region $A_i$ is classified as the image heating region AI (S1004). On the other hand, if the recording material P does not pass through the heating region $A_i$, the heating region $A_t$ is classified as the non-image heating region AP (S1005). The classification of the heating region $A_i$ is used for controlling a heat generating quantity of the heating block $HB_i$ as described later.

Figures 23A, 23B:
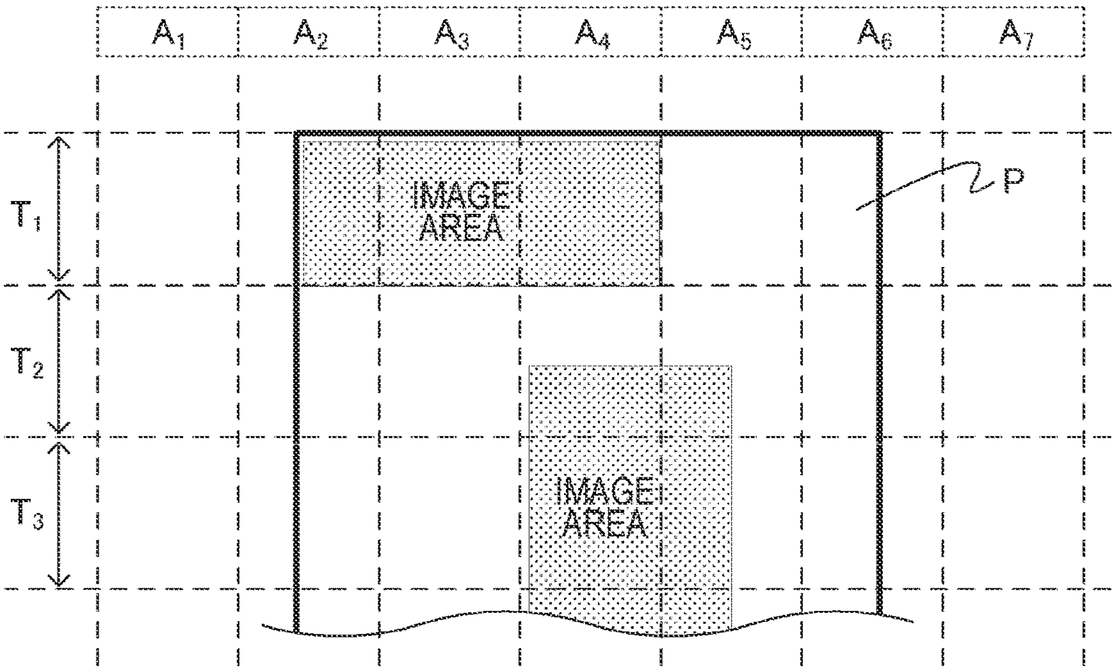
FIGS. 23A and 23B are explanatory views of a specific example relating to classification of heating regions according to Example 3.

With reference to FIGS. 23A and 23B, the classification of the heating region $A_i$ will be described with a specific example. In the present example, the recording material P passing through the fixing nip portion N is divided into sections at predetermined time intervals, and the heating region $A_i$ is classified for each section. In the present example, sections are divided every 0.24 seconds with the leading edge of the recording material P as a reference, and the first section is described as a section $T_1$, the second section as a section $T_2$, and the third section as a section $T_3$. The recording material P shown in FIG. 23 is a recording material, the width of which is smaller than the maximum sheet passing width, and is sized so that the end portion (hereinafter, referred to as a paper width end) in the direction perpendicular to the conveying direction of the recording material P passes through the heating region $A_2$ and the heating region $A_6$. Therefore, when an image exists at the position shown in FIG. 23A, the classification of the heating region $A_i$ is as shown in the table of FIG. 23B.

That is, in the section $T_1$, the heating regions $A_1$ and $A_7$ are classified into the non-sheet passing heating region AN because the recording material P does not pass through the heating regions $A_1$ and $A_7$. The heating regions $A_5$ and $A_6$ are classified as the non-image heating region AP because the image area does not pass through the heating regions $A_5$ and $A_6$. The heating regions $A_2$, $A_3$, and $A_4$ are classified into the image heating region AI because the image area passes through the heating regions $A_2$, $A_3$, and $A_4$.

In the section $T_2$, the heating regions $A_1$ and $A_7$ are classified into the non-sheet passing heating region AN because the recording material P does not pass through the heating regions $A_1$ and $A_7$. The heating regions $A_2$, $A_3$, and $A_6$ are classified as the non-image heating region AP because the image area does not pass through the heating regions $A_2$, $A_3$, and $A_6$. The heating regions $A_4$ and $A_5$ are classified into the image heating region AI because the image area passes through the heating regions $A_4$ and $A_5$.

In the section $T_3$, similarly to the section $T_2$, the heating regions $A_1$ and $A_7$ are classified as the non-sheet passing heating region AN, the heating regions $A_2$, $A_3$, and $A_6$ are classified as the non-image heating region AP, and the heating regions $A_4$ and $A_5$ are classified into the image heating region AI.

Subsequently to outline of heater control method, a heater control method of this example, that is, a method of controlling a heat generating quantity of the heating block $HB_i$ (i=1 to 7) will be described. The heat generating quantity of the heating block $HB_i$ is determined by the power supplied to the heating block $HB_i$. By increasing the electric power supplied to the heating block $HB_i$, the heat generating quantity of the heating block $HB_i$ is increased. By reducing the electric power supplied to the heating block $HB_i$, the heat generating quantity of the heating block $HB_i$ is reduced. The electric power supplied to the heating block $HB_i$ is calculated based on the control target temperature $TGT_i$ (i=1 to 7) set for each heating block and the detected temperature of the thermistor. In the present example, supply power is calculated by PI control (proportional integral control) so that the detected temperature of each thermistor is equal to the control target temperature $TGT_i$ of each heating block. The control target temperature $TGT_i$ of each heating block is set according to the classification of the heating region $A_i$ determined by the flow of FIG. 22.

(Control of Heat Generating Quantity of Image Heating Region AI)

First, a case where the heating region $A_i$ is classified as the image heating region AI as the first region (S1004) will be described. When the heating region $A_i$ is classified as the image heating region AI, the control target temperature $TGT_i$ is set to $TGT_i=T_{AI}-K_{AI}$ (S1007).

Here, the $T_{AI}$ is an image heating region reference temperature, and is set as an appropriate temperature for fixing an unfixed image on the recording material P. When plain paper is passed through the fixing apparatus 200 of the present example, $T_{AI}=198°$ C. It is desirable that the image heating region reference temperature $T_{AI}$ is made variable according to the type of recording material P such as heavy paper or thin paper. In addition, the image heating region reference temperature TAI may be adjusted according to image information such as image density and pixel density.

Further, $K_{AI}$ is an image heating region temperature correction term, which is set according to the heat storage count value $CT_i$ in each heating region $A_i$ as shown in FIG. 24A. Here, the heat storage count value $CT_i$ is a parameter correlated with the heat storage amount of the fixing apparatus 200 in each heating region $A_i$. The larger the heat storage count value $CT_i$ is, the larger the heat storage amount is. The calculation method of the heat storage count value $CT_i$ will be described later.

Incidentally, the amount of heat for fixing the toner image on the recording material P is given by the heat generating quantity of the heating block $HB_i$ and the heat storage amount stored in the heating region $A_i$. That is, the toner image can be fixed on the recording material P even when the heat generating quantity of the heating block $HB_i$ is small, as the heat storage amount in the heating region $A_i$ is larger. Therefore, in the image forming apparatus 100 of this example, the temperature correction term KAI of image heating region value is set to be larger as the heat storage amount (heat storage count value $CT_i$) is larger, the control target temperature $TGT_i$ is lowered, and the heat generating quantity of the heating block $HB_i$ is lowered. With this configuration, it is possible to prevent an excessive amount of heat from being applied to the toner image when the heat storage amount in the heating region $A_i$ is large, thereby saving power consumption.

(Heat Generating Quantity Control of Non-Image Heating Region AP)

Next, a case where the heating region $A_i$ is classified as the non-image heating region AP as the second region (S1005) will be described. When the heating region $A_i$ is classified as the non-image heating region AP, the control target temperature $TGT_i$ is set to $TGT_i=T_{AP}-K_{AP}$ (S1008).

Here, $T_{AP}$ is the non-image heating region reference temperature, and by setting the non-image heating region reference temperature $T_{AP}$ to be lower than the image heating region reference temperature $T_{AI}$, the heat generating quantity of the heating block $HB_i$ in the non-image heating region AP is lower than the image heating region AI, thereby saving power consumption of the image forming apparatus 100.

However, if the non-image heating region reference temperature $T_{AP}$ is excessively lowered, fixing failure may occur. That is, even if the maximum electric power is input to the heating block $HB_i$ at the timing when the heating region $A_i$ switches from the non-image heating region AP to the image heating region AI, it may become impossible to sufficiently heat up to the control target temperature of the image portion. In this case, there is a possibility that a phenomenon (fixing failure) in which the toner image is not sufficiently fixed on the recording material may occur. Therefore, it is necessary to set the non-image heating region reference temperature $T_{AP}$ to an appropriate value. According to experiments by the inventors, in the image forming apparatus 100 of this example, when the non-image heating region reference temperature $T_{AP}$ is set to 158° C. or more, it has been found that a fixing failure does not occur. From the viewpoint of power saving, it is desirable to lower the control target temperature $TGT_i$ as much as possible to lower the heat generating quantity of the heating block $HB_i$. Therefore, in the present example, $T_{AP}$=158° C.

Further, $K_{AP}$ is a non-image heating region temperature correction term, and as shown in FIG. 24B, is set such that the temperature correction term $K_{AP}$ of non-image heating region is set to be larger as the heat storage count value $CT_i$ in each heating region $A_i$ is larger, that is, as the heat storage amount in each heating region $A_i$ is larger.

Incidentally, when the heating region $A_i$ switches from the non-image heating region AP to the image heating region AI, the heat generating quantity necessary for causing the temperature of the heater 300 to reach the control target temperature of the image portion is given by the heat generating quantity of the heating block $HB_i$ and the heat storage amount in the heating region $A_i$. That is, when the maximum electric power that can be input is input to the heating block $HB_i$ (when input power is constant), the larger the heat storage amount in the heating region $A_i$ is, the faster the temperature of the heater 300 reaches the control target temperature of the image portion. The fact that it is possible to reach the control target temperature of the image portion quickly means, that is, that even if the control target temperature $TGT_i$ of the non-image heating region AP is lowered, it is possible to sufficiently heat up to the control target temperature of the image portion, and it is possible to prevent occurrence of fixing failure.

Therefore, in the image forming apparatus 100 of this example, the temperature correction term $K_{AF}$ of non-image heating region value is set to be larger as the heat storage amount (heat storage count value CT) is larger, the control target temperature $TGT_i$ is lowered, and the heat generating quantity of the heating block $HB_i$ is lowered. With this configuration, it is possible to prevent an excessive amount of heat from being applied to the fixing apparatus 200 when the heat storage amount in the heating region $A_i$ is large, thereby saving power consumption.

(Control of Heat Generating Quantity of Non-Sheet Passing Heating Region AN)

Next, a method of controlling the heat generating quantity of the heating block $HB_i$ in the case where the heating region $A_i$, which is a feature of the present example, is classified as the non-sheet passing heating region AN as the third region (S1006) will be described. When the heating region $A_i$ is classified as the non-sheet passing heating region AN, the control target temperature $TGT_i$ is set to $TGT_i=T_{AN}-K_{AN}$ (S1009).

Here, $T_{AN}$ is the non-sheet passing heating region reference temperature, and by setting the non-sheet passing heating region reference temperature $T_{AN}$ to be lower than the non-image heating region reference temperature $T_{AP}$, the heat generating quantity of the heating block $HB_i$ in the non-sheet passing heating region AN is lower than the non-image heating region AP, thereby saving power consumption of the image forming apparatus 100.

However, if the non-sheet passing heating region reference temperature TA is excessively lowered, the slidability between the inner surface of the fixing film 202 and the heater 300 deteriorates, and there is a problem that the conveyance of the recording material P becomes unstable. This is due to the viscosity characteristic of the grease interposed between the fixing film 202 and the heater 300, and this is because the viscosity of the grease increases as the temperature decreases, which hinders the rotation of the fixing film 202. According to experiments by the inventors, in the image forming apparatus 100 of this example, it has been found that the conveyance of the recording material P can be stabilized by setting the non-sheet passing heating region reference temperature $T_{AN}$ to 128° C. or more. From the viewpoint of power saving, it is desirable to lower the control target temperature $TGT_i$ as much as possible to lower the heat generating quantity of the heating block $HB_i$. Therefore, in the present example, $T_{AN}$=128° C. Note that the non-sheet passing heating region reference temperature TA should be determined in consideration of the configuration of the fixing apparatus 200 including the viscosity characteristic of the grease, and is not limited to 128° C.

Further, $K_{AN}$ is a non-sheet passing heating region temperature correction term, which is set to a value different from the temperature correction term $K_{AP}$ of non-image heating region, specifically, $K_{AN}$=0° C. That is, the temperature of the heating region overlapping with the passing region of the recording material among the plurality of heating regions is controlled based on the thermal history of the heating region. On the other hand, the temperature of the heating region out of the passing region of the recording material is controlled to a predetermined temperature regardless of the thermal history of the heating region. Regarding the temperature control of the non-sheet passing heating region, from the beginning, the temperature of the non-sheet passing heating region is at least controlled to a low temperature at which transportability of the recording material P is guaranteed at the minimum, thereby reducing power consumption.

It will be provisionally consider a case where the temperature correction term KA of non-sheet passing heating region is set to the same value as the temperature correction term $K_{AP}$ of non-image heating region and correction is added to the control target temperature $TGT_i$ according to the heat storage amount. In this case, the control target temperature $TGT_i$ is lower than the lower limit temperature (128° C. in the present example) at which the recording material P can be stably conveyed as the heat storage amount increases. Then, there is a possibility that the conveyance of the recording material P becomes unstable; therefore, in order to prevent this, in the present example, $K_{AN}$=0° C., that is, the control target temperature $TGT_i$ is set not to be corrected by $K_{AN}$.

(Heat Generating Quantity Control at Inter-Sheet Interval)

Next, a method of controlling the heat generating quantity generated by the heating block $HB_i$ at an inter-sheet interval (a section between a preceding recording material and a following recording material) when a plurality of images are continuously printed will be described. The recording material does not pass through the heating region $A_i$ at the inter-sheet interval. Therefore, assuming that the flow of FIG. 22 is followed, the heating region $A_i$ is classified into the non-sheet passing heating region AN. However, when the heat generation control based on the classification of the non-sheet passing heating region AN ($TGT_i$=128° C. in the present example) is performed, a fixing failure may occur. That is, when the leading edge of the following recording material is in the image area, even if the maximum electric power is input to the heating block $HB_i$, it may not be possible to sufficiently heat up to the control target temperature of the image portion. In this case, there is a possibility that a phenomenon (fixing failure) in which the toner image does not sufficiently fix on the recording material may occur. In order to prevent this, as for the control target temperature $TGT_i$ at the inter-sheet interval, the same concept as that of the non-image heating region AP is applied, and $TGT_i=T_{AP}-K_{AP}$ is set.

(Control of Heat Generating Quantity at Post-Rotation)

Next, a method of controlling the heat generating quantity of the heating block $HB_i$ at a post-rotation (an idling section from the end of the recording material P passing through the heating region $A_i$ to the transition to the printing standby state, at the end of printing) will be described. The recording material does not pass through the heating region $A_i$ at the post-rotation. Therefore, in accordance with the flow of FIG. 22, the heating region $A_i$ is classified into the non-sheet passing heating region AN. Therefore, the control target temperature $TGT_1$ is set as $TGT_i=T_{AN}-K_{AN}$.

(Control of Heat Generating Quantity at Pre-Rotation)

Next, a method of controlling the heat generating quantity of the heating block $HB_i$ at the time of pre-rotation (startup section) will be described. Here, the pre-rotation is an idling section before the recording material P reaches the heating region $A_i$ at the start of printing, and is a section in which the heating region $A_i$ is controlled to have a predetermined temperature. In the image forming apparatus 100 of the present example, the control target temperature $TGT_i$ at the time of the startup operation is expressed by the following (Equation 8).

$$TGT_i=(T_{AI}-K_{AI}-T0_i)+3\times t+T0_i \quad \text{(Equation 8)}$$

In (Equation 8), $T_{AI}$ is the image heating region reference temperature, and $K_{AI}$ is the image heating region temperature correction term. Further, t indicates the elapsed time (seconds) from the start of the startup operation, and $T\mathbf{0}_i$ indicates the detected temperature of the thermistor TH corresponding to the heating region $A_i$ at the start of the startup operation. That is, the control target temperature $TGT_i$ is linearly changed from $T\mathbf{0}_i$ to $T_{AI}-K_{AI}$ over 3 seconds.

As described above, in the present example, in accordance with the classification of the heating region $A_i$ and the heat storage count value $CT_i$, the control target temperature $TGT_i$ for each heating region $A_i$ is determined. Incidentally, set values of each heating region reference temperature ($T_{AI}$, $T_{AP}$, and $T_{AN}$) and each heating region temperature correction term ($K_{AI}$, $K_{AP}$, and $K_{AN}$) are determined appropriately in consideration of the configurations of the image forming apparatus 100 and the fixing apparatus 200 and printing conditions. It is not limited to the above-mentioned value.

A Method of Calculating the Predicted Heat Storage Amount

In the present example, the heat storage count value $CT_i$ is provided for each heating region $A_i$ as a parameter correlated with the heat storage amount of each heating region $A_i$. The heat storage count value $CT_i$ stores and counts the thermal history (the heating history and heat radiation history) about how much each heating region $A_i$ has been heated and how much heat has been released, and predicts a heat storage amount. The heating history can be obtained based on at least one of, for example, the temperature of the heater and the amount of power supplied to the heating element. Further, the heat radiation history can be obtained, for example, based on at least one of the presence or absence of passage of the recording material in the heating region, the period during which no power is supplied to the heating element, and the temporal change amount of the temperature of the heater. $dCT_i$ expressed by the following (Equation 9) is cumulatively added to the heat storage count value $CT_i$ for each heating region $A_i$ at every predetermined update timing.

$$dCT_i=(TC-RMC-DC)+WUC \quad \text{(Equation 9)}$$

Here, the TC, RMC, DC, WUC in (Equation 9) will be described with reference to FIGS. 25A to 25D. The heat storage count value $CT_i$ of this example is updated every 0.24 seconds (for each classification section of the heating region $A_i$) with the leading edge of the recording material P as a reference except for the pre-rotation at the start of printing. During the standby state in which the printing operation is not performed, the updating is performed every 0.24 seconds on the basis of the point of time at which energization to the heater 300 at the end of the printing operation is ended.

The TC in (Equation 9) is a value indicating the heating amount of the heating region $A_i$ by the heating block $HB_i$, and is calculated from the control target temperature of the heater 300 and the amount of power supplied to each heating element. The TC in Example 3 is determined according to the control target temperature $TGT_i$ of each heating region, as shown in FIG. 25A. The smaller the control target temperature $TGT_i$ is, the smaller the value becomes and the higher the control target temperature $TGT_i$ is, the larger the value becomes.

The RMC in (Equation 9) indicates the amount of heat removed from the image heating apparatus by the recording material P. As shown in FIG. 25B, the RMC is set in accordance with the passing state (presence or absence of passing etc.) of the recording material P with respect to each heating region $A_i$. When the recording material P does not exist in the heating region $A_i$, that is, when the heating region $A_i$ is classified as the non-sheet passing heating region AN, RMC=0. The RMC may be variable according to the type of recording material P such as heavy paper or thin paper.

The DC in (Equation 9) indicates the amount of heat radiation to the outside of the fixing apparatus 200 due to heat transfer and radiation, and is determined according to the heat storage count value $CT_i$ of each heating region. As the heat storage amount increases, the temperature difference from the outside increases and the heat radiation amount increases. Therefore, as shown in FIG. 25C, the DC is set to increase as the heat storage count value $CT_i$ increases.

The updating of the heat storage count value $CT_i$ by the TC, RMC, and DC is carried out every $CT_i$ updating period of 0.24 seconds even at the inter-sheet interval when a plurality of images are continuously printed. In addition, even during standby at the time of post-rotation at the end of printing, or no printing operation, the updating of the heat storage count value $CT_i$ is performed every $CT_i$ update period of 0.24 seconds. Also, when the inter-sheet interval, post-rotation, and standby ends in the middle of the 0.24 second period, the addition/subtraction amount of the TC, RMC, and DC is adjusted according to the end time. For example, the inter-sheet interval time in Example 1 is 0.12 seconds, which is half of the $CT_i$ update period of 0.24 seconds. Therefore, the TC, RMC, and DC are half of the values shown in FIGS. 25A to 25C, and the heat storage count value $CT_i$ is updated. In addition, for example, the post-rotation time in Example 3 is 0.12 seconds, which is the same in the inter-sheet interval time. Therefore, the TC, RMC, and DC are half of the values shown in FIGS. 25A to 25C, and the heat storage count value $CT_i$ is updated. Also, as a result of updating the heat storage count value $CT_i$, when the heat storage count value $CT_i$ is less than 0, the heat storage count value $CT_i$ is set to 0.

The WUC in (Equation 9) indicates the addition amount of the heat storage count value $CT_i$ at the time of pre-rotation (startup section). At the time of the pre-rotation, addition/subtraction of the heat storage count value $CT_i$ by the TC, RMC, and DC is not performed, and only the addition by the WUC is performed at the time point when the pre-rotation is completed (the leading edge timing of the recording material P). As shown in FIG. 25D, the WUC is set so that the value increases as the heat storage count value $CT_i$ increases.

The accumulated heat storage count value $CT_i$ determined as described above indicates that the larger the value is, the larger the heat storage amount in the heating region $A_i$ is. The set values of the TC, RMC, DC, and WUC are appropriately determined in consideration of the configurations of the image forming apparatus 100 and the fixing apparatus 200 and printing conditions, and are not limited to the value shown in FIGS. 25A to 25D.

Effect

Next, a difference between the effects of this example and Comparative Example 2 will be described. In Comparative Example 2, the control target temperature $TGT_i$ of the image heating region AI and the non-image heating region AP is set to the same as in Example 3. In Comparative Example 2, a determination as to whether the recording material P passes through the heating region $A_i$ (S1002 in FIG. 22) is not performed, and the control target temperature $TGT_i$ of the non-sheet passing heating region is the same control as the non-image heating region AP (S1008 in FIG. 22).

Figure 26:
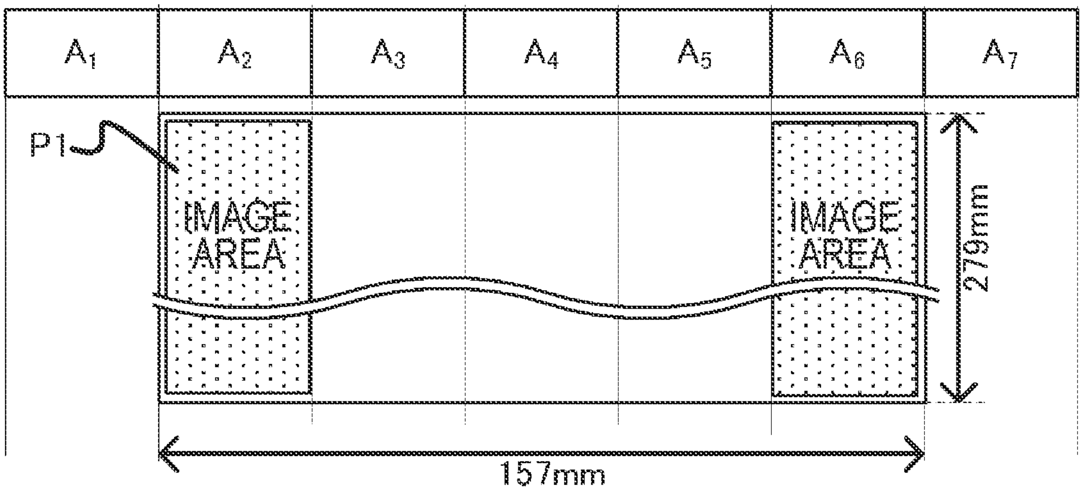
FIG. 26 is an explanatory view of a recording material of Specific Example 1.

Next, the effect of this example will be described by giving Specific Example 1 shown below as a concrete example of a printing case. In Specific Example 1, 170 sheets of recording material P1 (paper width 157 mm, paper length 279 mm) shown in FIG. 26 are continuously printed from the state where the fixing apparatus 200 is in a room temperature state, that is, from the state where the heat storage count value $CT_i$ of each heating region $A_i$ is 0. It is assumed that the printed image is arranged in all of the areas passing through the heating regions $A_2$ and $A_6$ on the recording material P1.

Figure 27A:
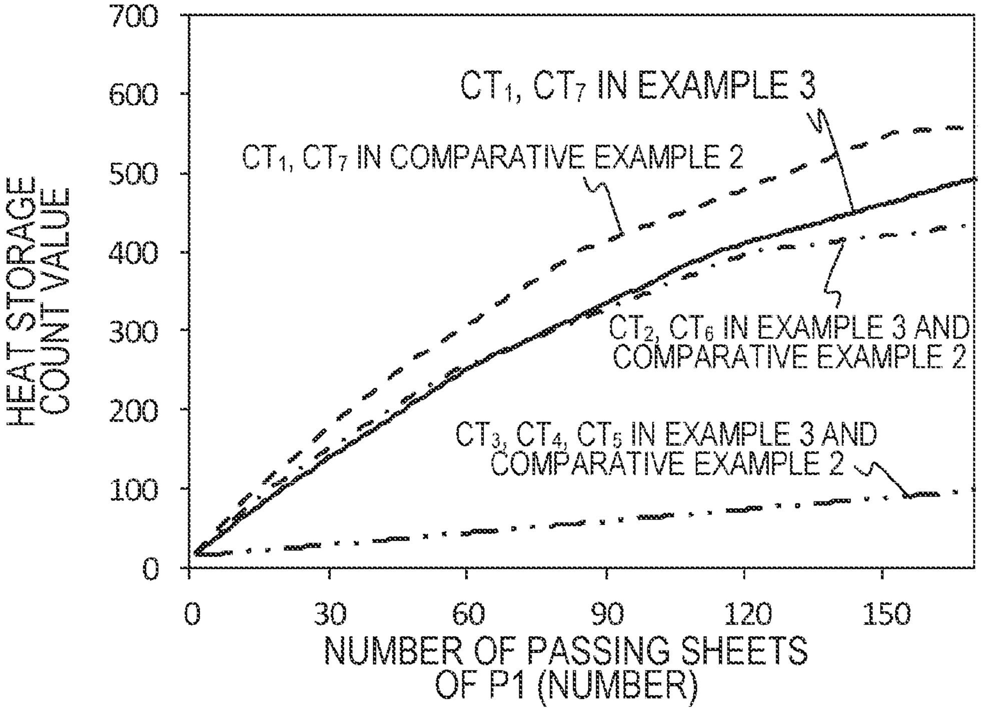
FIGS. 27A and 27B are explanatory views of the effect of Example 3 in Specific Example 1.
Figure 27B:
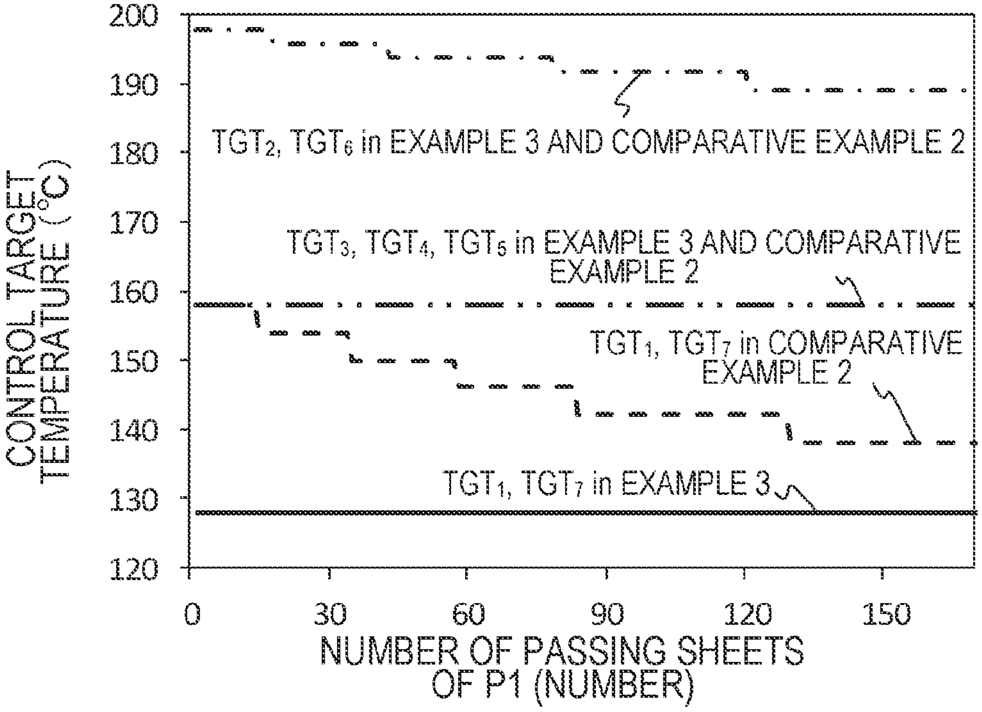

In Specific Example 1, FIG. 27A shows how the heat storage count value $CT_i$ of the heating region $A_i$ has changed with respect to the number of passing sheets of recording material P1. Furthermore, FIG. 27B shows how the control target temperature $TGT_i$ during sheet passing in the heating region $A_i$ has changed with respect to the number of passing sheets of recording material P1. The solid line denotes the transition of the heat storage count value $CT_i$ and the control target temperature $TGT_i$ of the heating region ($A_1$ and $A_7$) classified as the non-sheet passing heating region AN in Example 3. A one dot chain line denotes the transition of the heat storage count value $CT_i$ and the control target temperature $TGT_i$ of the heating region ($A_2$ and $A_5$) classified as the image heating region AI. A two-dot chain line denotes the transition of the heat storage count value $CT_i$ and the control target temperature $TGT_i$ of the heating region ($A_3$, $A_4$, and $A_5$) classified as the non-image heating region AP. For comparison, the transition of the heat storage count value $CT_i$ and the control target temperature $TGT_i$ of the heating regions $A_1$ and $A_7$ in Comparative Example 2 is indicated by a broken line. The heat storage count value $CT_i$ and the control target temperature $TGT_i$ of the heating regions $A_2$ and $A_6$ and the heating regions $A_3$, $A_4$, and $A_5$ in Comparative Example 2 have the same transition as in Example 3, so that the explanation thereof is omitted.

In the heating regions ($A_2$ and $A_6$) corresponding to the image heating region AI of Specific Example 1, the heat storage count values $CT_2$ and $CT_6$ increases as the number of prints increases. Accordingly, the control target temperatures $TGT_2$ and $TGT_6$ gradually decrease from 198° C. at the time of printing of the first sheet and become 189° C. at the time of printing of the 170th sheet. Furthermore, in the heating regions ($A_3$, $A_4$, and $A_5$) corresponding to the non-image heating region AP, although the heat storage count values $CT_3$, $CT_4$, and $CT_5$ increase, the heat storage count value is 100 or less even after passing 170 sheets. Therefore, in Specific Example 1, the control target temperatures $TGT_3$, $TGT_4$, and $TGT_5$ become constant 158° C. from the first sheet to the 170th sheet.

In addition, in the heating regions ($A_1$ and $A_7$) for the non-sheet passing heating region AN in Example 3, the heat storage count values $CT_1$ and $CT_7$ increase as the number of prints increases. At this time, since the non-sheet passing heating region temperature correction term is set to $K_{AN}$=0° C., the control target temperatures $TGT_1$ and $TGT_7$ become constant 128° C. from the first sheet to the 170th sheet. That is, as described above, the control target temperature which can reduce the heat generating quantity most (keep the most power saving) while maintaining the stable conveyance of the recording material P is obtained.

In addition, in the heating regions ($A_1$ and $A_7$) in Comparative Example 2, the heat storage count values $CT_1$ and $CT_7$ increase as the number of prints increases. The control target temperatures $TGT_1$ and $TGT_7$ of Comparative Example 1 are determined according to the equation of $TGT_i = T_{AP} - K_{AP}$, and therefore gradually decline from 158° C. at the time of printing of the first sheet and reach 138° C. at the time of printing of the 170th sheet. Compared with Example 3, Comparative Example 2 has a higher control target temperature, and it can be seen that excessive power is consumed by that amount.

As described above, in Example 3, by changing the control target temperature $TGT_i$ between the non-image heating region AP and the non-sheet passing heating region AN, the heat generating quantity of the heating block $HB_i$ corresponding to the non-sheet passing heating region AN is lower than the heat generating quantity of the heating block $HB_i$ corresponding to the non-image heating region AP. Therefore, power saving can be achieved as compared with the case where the non-image heating region AP and the non-sheet passing heating region AN are not distinguished.

Further, in the present example, the heat storage count value $CT_i$ is calculated according to the thermal history of each heating region $A_i$, and the control target temperature $TGT_i$ is corrected according to the value of the heat storage count value $CT_i$. At that time, the temperature correction term $K_{AN}$ of non-sheet passing heating region which is a correction amount in the non-sheet passing heating region AN is set to be a value different from the image heating region temperature correction term $K_{AP}$ which is a correction amount in the non-image heating region AP. Thereby, it is possible to prevent the control target temperature $TGT_i$ in the non-sheet passing heating region AN from falling below the lower limit temperature at which the recording material P can be stably conveyed, and to stably convey the recording material P.

Example 4

Example 4 of the present invention will be described. The basic configuration and operation of the image forming apparatus and the image heating apparatus of Example 4 are the same as those of Example 3. Therefore, an element having the same function or configuration as those of Example 3 is denoted by the same reference numeral, and a detailed description thereof will be omitted. Items not specifically described in Example 4 are the same as those in Example 3.

Example 4 is different from Example 3 in the method of controlling the heat generating quantity of the heating block $HB_i$ at the inter-sheet interval. In Example 4, whether the recording material passes through the heating region $A_i$ when the subsequent recording material is conveyed to the fixing nip portion N is determined based on the size information of the recording material at the inter-sheet interval, and the heat generating quantity control of the heating block $HB_i$ is made different accordingly.

As a situation in which this control is executed, in the case where the size of the recording material changes when performing the continuous image formation, for example, it is conceivable that two print jobs having different sizes of recording materials are continuously executed. In this situation, in the case where a recording material (later print job), the size (paper width) of which is smaller than that of the preceding recording material (previous print job) follows, a heating region which is out of the passing region of the recording material is generated at the time of fixing the subsequent recording material (for example, heating regions at both ends of paper width). That is, in the heating process of the preceding recording material, the heating region overlaps with the passing region of the recording material but does not overlap with the passing region of the recording material in the subsequent heat treatment of the recording material. With respect to the heating region which is out of the passing region of the subsequent recording material, in the present example, the heat generating quantity control is executed beforehand as the non-sheet passing heating region before the fixing process of the subsequent recording material is started, that is, at the inter-sheet interval time between the preceding recording material and the subsequent recording material.

When it is determined that the subsequent recording material passes through the heating region $A_i$, the same idea as in Example 3 is applied, and the control target temperature $TGT_i$ at the inter-sheet interval is set as $TGT_i=T_{AP}-K_{AP}$. On the other hand, when it is determined that the subsequent recording material does not pass through the heating region $A_i$, there is no possibility of fixing failure occurring in the heating region $A_i$. Therefore, the idea of the non-sheet passing heating region AN is applied and the control target temperature $TGT_i$ is set as $TGT_i=T_{AN}-K_{AN}$. That is, the control target temperature $TGT_i$ is low as compared with the case where it is determined that the subsequent recording material passes through the heating region $A_i$.

As described above, at the inter-sheet interval of Example 4, by lowering the control target temperature $TGT_i$ in the heating region $A_i$ in which the subsequent recording material does not pass compared with that in Example 3, the heat generating quantity of the corresponding heating block $HB_i$ is lowered. Therefore, it is possible to further save power as compared with Example 3.

Example 5

Example 5 of the present invention will be described. The basic configuration and operation of the image forming apparatus and the image heating apparatus of Example 5 are the same as those of Example 3. Therefore, an element having the same function or configuration as those of Example 3 is denoted by the same reference numeral, and a detailed description thereof will be omitted. Items not specifically described in Example 5 are the same as those in Example 3.

Example 5 is different from Example 3 in the method of controlling the heat generating quantity of the heating block $HB_i$ at the pre-rotation. In Example 5, whether the recording material passes through the heating region $A_i$ when the recording material is conveyed to the fixing nip portion N at the pre-rotation is determined based on the size information of the recording material at the pre-rotation, and the heat generating quantity control of the heating block $HB_i$ is made different accordingly. That is, when the recording material reaches the fixing nip portion N after the pre-rotation, the control target temperature at which the heating region reaches needs not be uniform in the entire heating region when a heating region deviating from the conveyance region of the recording material is included in the heating region. In the present example, the control target temperature at the end of the pre-rotation in the heating region deviating from the conveyance region of the recording material to be conveyed first after the pre-rotation is controlled to be lower than the control target temperature at the end of the pre-rotation in the heating region overlapping the conveyance region of the recording material.

When it is determined that the recording material passes through the heating region $A_i$, as in Example 3, the control target temperature $TGT_i$ is calculated according to (Equation 8), and the heat generating quantity of the heating block $HB_i$ is controlled. On the other hand, if it is determined that the recording material does not pass through the heating region $A_i$, the control target temperature $TGT_i$ is calculated according to the following (Equation 10).

$$TGT_i=(T_{AN}-K_{AN}-T0_i)+3\times t+T0_i \qquad \text{(Equation 10)}$$

In (Equation 10), the $T_{AN}$ is the non-sheet passing heating region reference temperature, and the $K_{AI}$ is the non-sheet passing heating region temperature correction term, and the control target temperature $TGT_i$ is linearly changed from $T\mathbf{0}_i$ to $T_{AN}-K_{AN}$ over 3 seconds. In (Equation 8), the control target temperature is changed up to $T_{AI}-K_{AI}$, while the control target temperature in (Equation 10) becomes a low value. However, since the recording material does not pass through the heating region $A_i$, that is, the image area does not pass through the heating region $A_i$, there is no possibility of generating fixing failure. Incidentally, when setting the control target temperature $TGT_i$ of the pre-rotation according to (Equation 10), the addition amount WUC of the heat storage count value $CT_i$ at the pre-rotation is set as shown in FIG. 28. The addition amount is made smaller than when the control target temperature $TGT_i$ in the pre-rotation is set according to the (Equation 8) (FIG. 25D).

As described above, at the pre-rotation of Example 5, by lowering the control target temperature $TGT_i$ in the heating region $A_i$ in which the subsequent recording material does not pass compared with that in Example 3, the heat generating quantity of the corresponding heating block $HB_i$ is lowered. Therefore, it is possible to further save power as compared with Example 3.

Example 6

Example 6 of the present invention will be described. The basic configuration and operation of the image forming apparatus and the image heating apparatus of Example 6 are the same as those of Example 3. Therefore, an element having the same function or configuration as those of Example 3 is denoted by the same reference numeral, and a detailed description thereof will be omitted. Items not specifically described in Example 6 are the same as those in Example 3.

Example 6 differs from Example 3 in the control method of the fixing apparatus 200 in the case where the paper width end of the recording material P and the divided position of the heating region do not coincide. Depending on the size of the recording material, there may be a heating region through which the paper width end passes, that is, in one heating region, there may be a heating region in which the heating range overlaps both the passing region of the recording material and the non-passing region deviating from the passing region. In Example 6, in the case where the heating region $A_i$ through which the paper width end passes is set as the heating region $A_j$, in accordance with the thermal history in a non-sheet passing area in the heating region $A_j$ and the thermal history in a sheet passing area within the heating region $A_j$, it is determined whether to start the next printing operation.

Figure 30A:
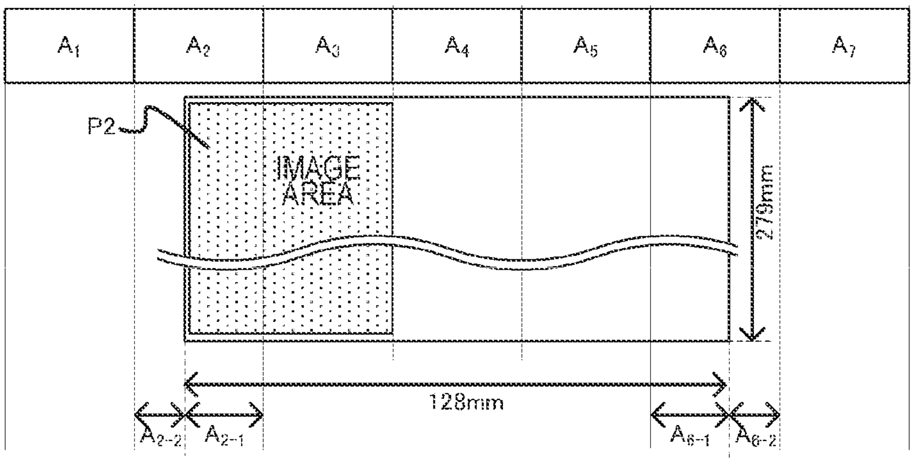
FIGS. 30A to 30C are explanatory views of a recording material in Specific Example 2 and Specific Example 3.
Figure 30B:
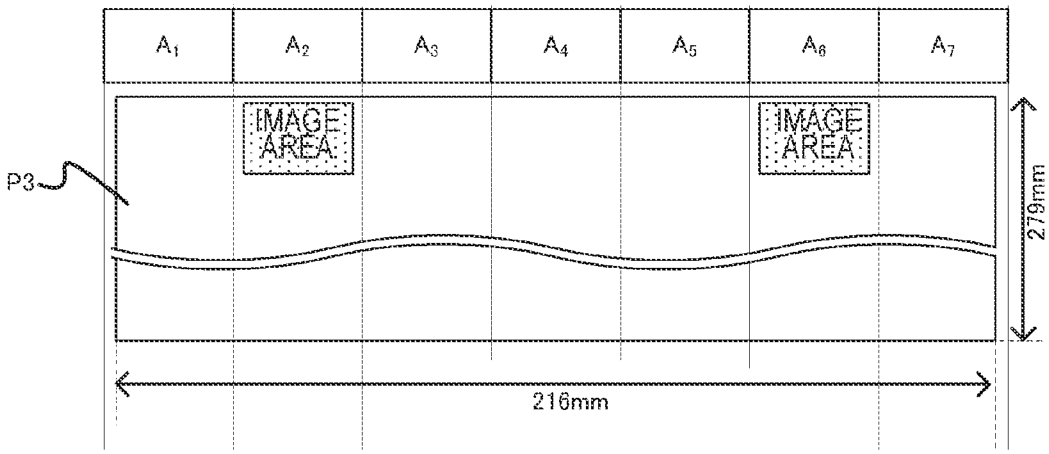
Figure 30C:
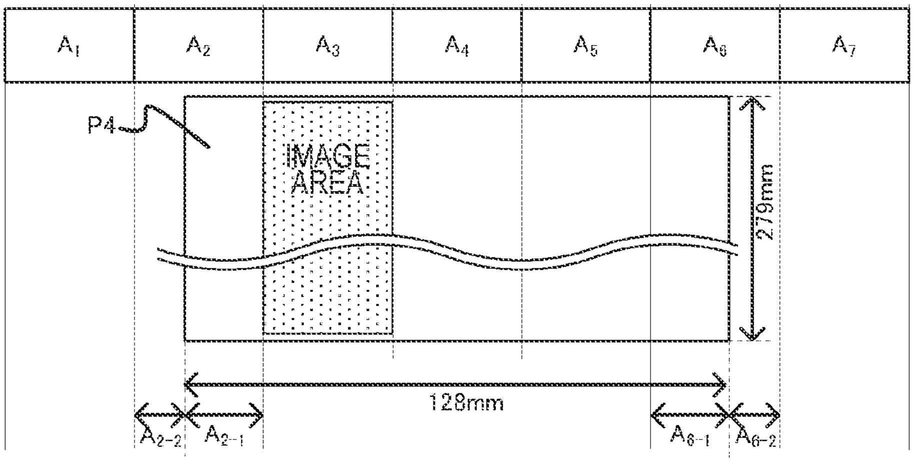

With reference to FIGS. 30A to 30C, the details of the heat generating quantity control method of the heater 300 in Example 4 will be described. In this example, control when printing a recording material P (hereinafter referred to as a recording material P2) having a paper width of 128 mm and a paper length of 279 mm as shown in FIG. 30A is taken as an example.

When a recording material, such as the recording material P2, where the paper width end and the divided position of the heating region do not coincide with each other is passed, the temperature of the non-sheet passing area $A_{j-2}$ (the range indicated by $A_{2-2}$ and $A_{6-2}$ in FIG. 30A) in the heating region $A_j$ (j=2 and 6) through which the paper width end passes is increased more than usual. A reason why such a phenomenon where the temperature rises in the non-sheet passing portion occurs is because the heat generating quantity of the heating region $A_1$ is determined for the purpose of heating the sheet passing area $A_{j-1}$ (the area indicated by $A_{2-1}$ and $A_{6-1}$ in FIG. 30A) in the heating region $A_j$. That is, the heat generating quantity becomes excessive with respect to the non-sheet passing area $A_{j-2}$ where no recording material is present.

When printing on the recording material P2 is repeated, the non-sheet passing area $A_{j-2}$ rises in temperature than the sheet passing area $A_{j-1}$ due to the influence of temperature rise in the non-sheet passing portion, so that a difference in heat storage amount between the sheet passing area $A_{j-1}$ and the non-sheet passing area $A_{j-2}$ becomes large. When a recording material P (hereinafter referred to as recording material P3) having a wider paper width than that of the recording material P2 is printed in a state in which the difference in the heat storage amount is extremely large, an image in a range in which the temperature rise in the non-sheet passing portion having the large heat storage amount occurs is excessively heated, hot offset occurs, and there is a risk of degrading the image quality.

In order to prevent this, in Example 6, apart from the heat storage count value $CT_i$, a non-sheet passing portion heat storage count value $CT_{Ni}$ is provided. As will be described later, there is provided a period during which the temperature rising region is cooled down before the printing of the recording material P3 is started in accordance with the values of $CT_i$ and $CT_{Ni}$. The non-sheet passing portion heat storage count value $CT_{Ni}$ (i=j) store and counts the thermal history (heating history and heat radiation history) of the non-sheet passing area $A_{j-2}$ as a parameter correlated with the heat storage amount in the non-sheet passing area $A_{j-2}$. The larger the value is, the larger the heat storage amount is. When the temperature rises due to the temperature rise in the non-sheet passing portion, the storage count value $CT_{Nj}$ of non-sheet passing portion becomes larger than the heat storage count value $CT_j$. At the storage count value $CT_{Nj}$ of non-sheet passing portion, at the same timing as the updating of the heat storage count value $CT_j$, $dCT_{Nj}$ expressed by the following (Equation 11) is cumulatively added.

$$dCT_{Nj}=(TC-DC_N)+WUC \quad \text{(Equation 11)}$$

The TC and WUC in (Equation 11) are the same as those described in (Equation 9) of Example 1, and are values corresponding to the heat storage count value $CT_j$ and $TGT_j$ determined from the heat storage count value $CT_j$. The $DC_N$ in (Equation 11) indicates the amount of heat radiation due to heat transfer or radiation, and is set as shown in FIG. 29A in accordance with the storage count value $CT_{Nj}$ of non-sheet passing portion.

In Example 6, the imaginary control target temperature $TGT_{Nj}$ is calculated according to the storage count value $CT_{Nj}$ of non-sheet passing portion. The control target temperature $TGT_{Nj}$ is obtained as an ideal control target temperature when assuming that an area that is the non-sheet passing area $A_{j-2}$ is the image area in the next printing operation, and is calculated as $TGT_{Nj}=T_{AI}-K_{NAI}$ as well as the control target temperature of the image heating region AI. Here, the $T_{AI}$ is the above-mentioned image heating region reference temperature, and the $T_{AI}$=198° C. Further, $K_{NAI}$ is a temperature correction term of the heating region corresponding to the non-sheet passing area $A_{j-2}$, and is set according to the storage count value $CT_{Nj}$ of non-sheet passing portion as shown in FIG. 29B.

The imaginary control target temperature $TGT_{Nj}$ calculated in this way is equal to or lower than the control target temperature $TGT_j$ obtained from the heat storage count value $CT_j$, since the storage count value $CT_{Nj}$ of non-sheet passing portion is larger than the heat storage count value $CT_1$ of the sheet passing area $A_{j-1}$. Ideally, the control target temperature of the heating region $A_j$ is set to the control target temperature $TGT_{Nj}$ if focusing only on the area that is the non-sheet passing area $A_{j-2}$; however, in the heating region $A_1$, there is also an area that is the sheet passing area $A_{j-1}$, and the control target temperature is set as $TGT_j$ in order to give priority to the control of that area. That is, the range that is the non-sheet passing area $A_{j-2}$ is controlled with the control target temperature that is higher than the ideal control target temperature by the temperature difference $\Delta T_j=TGT_j-TGT_{Nj}$.

According to experiments by the inventors, it is found that, in the image forming apparatus 100 of this example, when the temperature difference $\Delta T_j$ is 5° C. or more, hot offset may occur due to printing of the recording material P3. Therefore, in Example 6, when the temperature difference $\Delta T_j$ is 5° C. or more, control is performed such that the printing on the recording material P3 is temporarily waited, and the area of the non-sheet passing area $A_{j-2}$ is cooled by heat radiation (hereinafter referred to as cooling control). Then, when the temperature difference $\Delta T_j$ becomes lower than 5° C. by the cooling control, printing of the recording material P3 is started.

Next, the control operation of Example 6 will be described by giving Specific Example 2 shown below as a concrete print example. In Specific Example 2, the predetermined number of sheets of recording material P2 (paper width 128 mm, paper length 279 mm) shown in FIG. 30A is continuously printed from the state where the fixing apparatus 200 is in a room temperature state, that is, from the state where the heat storage count value $CT_i$ of each heating region $A_i$ is 0. It is assumed that the printed image is located in all of the areas passing through the heating regions $A_2$ and $A_3$ on the recording material P2. Also, immediately after the predetermined number of sheets of recording materials P2 is continuously printed, one recording material P3 shown in FIG. 30B is printed. It is assumed that the recording material P3 is LETTER size (paper width 216 mm and paper length 279 mm), and an image is arranged in an area corresponding to the heating regions $A_2$ and $A_6$ at the leading edge in the conveying direction.

Figures 31A, 31B:
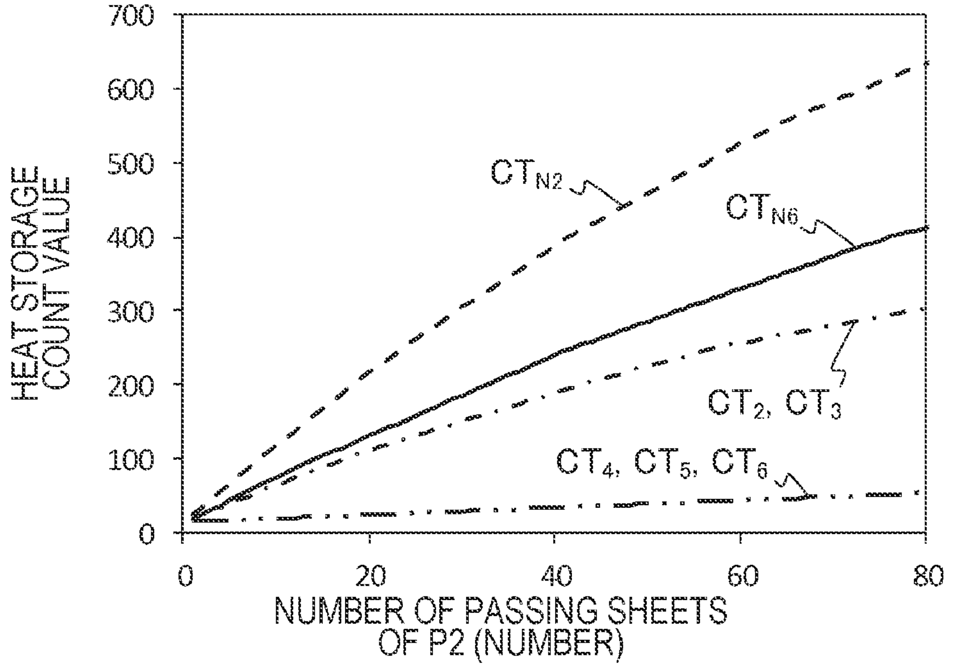
FIGS. 31A and 31B are explanatory views of the effect of Example 5 in Specific Example 2.

FIG. 31A shows how the heat storage count value $CT_i$ and the non-sheet passing portion heat storage count value $CT_{Ni}$ have changed with respect to the number of passing sheets of recording material P2 in Specific Example 2. A one dot chain line denotes the transition of the heat storage count value $CT_i$ of the heating region ($A_2$ and $A_3$) classified as the image heating region AI. A two-dot chain line denotes the transition of the heat storage count value $CT_i$ of the heating region ($A_4$, $A_5$, and $A_6$) classified as the non-image heating region AP. Further, a broken line is a transition of the non-sheet passing portion heat storage count value $CT_{N2}$ in the non-sheet passing area $A_{2-2}$. A solid line is a transition of the non-sheet passing portion heat storage count value $CT_{N6}$ in the non-sheet passing area $A_{6-2}$. Note that the heat storage count value $CT_1$ and $CT_7$ of the heating regions $A_1$ and $A_7$ in Example 6 have the same transition as in Example 3, so that the explanation thereof is omitted. In Specific Example 2, each heat storage count value increases as the number of passing sheets of recording material P2 increases. Further, the non-sheet passing portion heat storage count values $CT_{N2}$ and $CT_{N6}$ are higher than the heat storage count values $CT_2$ and $CT_6$ due to the influence of the temperature rise in the non-sheet passing portion.

FIG. 31B shows whether to perform the cooling control when attempting to pass the recording material P3 immediately after 10, 30, 50 and 70 sheets of the recording material P2 have been passed. When the number of passing sheets of recording material P2 is relatively small, the influence of the temperature rise in the non-sheet passing portion in the non-sheet passing area $A_{j-2}$ is small. Therefore, the temperature difference $\Delta T_j$ between the control target temperature $TGT_j$ and the control target temperature $TGT_{Nj}$ is small. For example, in Specific Example 2, when the number of passing sheets of recording material P2 is 10 or 30, since the temperature difference $\Delta T_j$ is less than 5° C., the cooling control is not performed. The printing of the recording material P3 is immediately started. On the other hand, when the number of passing sheets of recording material P2 is large, the influence of the temperature rise in the non-sheet passing portion in the non-sheet passing area $A_{j-2}$ is large. Therefore, the temperature difference $\Delta T_j$ between the control target temperature $TGT_j$ and the control target temperature $TGT_{Nj}$ is large. For example, in Specific Example 2, when the number of passing sheets of recording material P2 is 50 or 70, since the temperature difference $\Delta T_j$ is 5° C. or more, printing of the recording material P3 is started after the cooling control.

As described above, in Example 6, the temperature difference $\Delta T_j$ is calculated by providing the storage count value $CT_{Nj}$ of non-sheet passing portion separately from the heat storage count value $CT_j$. It is determined whether to perform the cooling control before printing of the recording material P3 is started in accordance with the value of the temperature difference $\Delta T_j$. With this configuration, it is prevented that a hot offset occurs at the time of printing of the recording material P3 and the image quality is deteriorated.

Further, the storage count value $CT_{Nj}$ of non-sheet passing portion is calculated by each of the heating regions ($A_2$ and $A_6$ in Specific Example 2) through which left and right paper width ends pass. With this configuration, it is possible to more appropriately determine implementation of cooling control. For example, an example (Specific Example 3) in which 50 sheets of recording material P4 are continuously passed as shown in FIG. 30C instead of the recording material P2 in Specific Example 2 will be described. It is assumed that the recording material P4 has the same size as the recording material P2 and an image is arranged only in an area passing through the heating region $A_3$. In this case, the heat storage count value $CT_2$ and the non-sheet passing portion heat storage count value $CT_{N2}$ change with the same value as the heat storage count value $CT_6$ and the non-sheet passing portion heat storage count value $CT_{N6}$, respectively. Therefore, a temperature difference $\Delta T_2$ has the same value as $\Delta T_6$. The temperature differences $\Delta T_2$ and $\Delta T_6$ immediately after printing 50 sheets of the recording material P4 are 4° C. which is the same as the temperature difference $\Delta T_6$ in Specific Example 2. Because the temperature difference $\Delta T_1$ is less than 5° C., the cooling control is not performed. In Specific Example 2, since the temperature difference $\Delta T_2$ is 5° C., the cooling control is performed. On the other hand, in Specific Example 3, it is possible to increase the image productivity by not performing the cooling control.

As described above, in Example 6, by calculating the storage count value $CT_{Nj}$ of non-sheet passing portion on the left and right, respectively, it is possible to more appropriately determine the execution of the cooling control according to the image to be printed. Therefore, it is possible to enhance image productivity.

Modification 1

In Examples 3 to 6, by increasing or decreasing the control target temperature $TGT_i$ according to the heat storage amount, the supply power calculated by the PI control (proportional integral control) is adjusted. As a result, the heat generating quantity of the heating block $HB_i$ has been adjusted. However, for example, as shown in Modification 1 below, a method may be adopted in which the heat generating quantity is directly increased or decreased according to the heat storage amount and the heat generating quantity of the heating block $HB_i$ is adjusted. Hereinafter, a method for adjusting the heat generating quantity of the heating element that heats the image heating region AI of Modification 1 will be described. The adjustment method of the heat generating quantities of the non-image heating region AP and the non-sheet passing heating region AN is the same as that of the image heating region AI, except for the setting values of the respective parameters, so that the description is omitted.

In Modification 1, when the heating region $A_i$ is classified as the image heating region AI, the control target temperature $TGT_i$ is set to $TGT_i = T_{AI}$. Here, $T_{AI}$ is the image heating region control target temperature, which is a fixed value of $T_{AI}$=198° C. Subsequently, supply power $WT_i$ to the heating block $HB_i$ is calculated by P control (proportional integral control) so that the detected temperature of each thermistor is equal to the control target temperature $TGT_i$. The power $W_i$ actually supplied to the heating block $HB_i$ is calculated by multiplying the supply power $WT_i$ by the image heating region power correction coefficient $K_{WAI}$ as shown in the following (Equation 12).

$$W_i = WT_i \times K_{WAI} \quad \text{(Equation 12)}$$

Here, the image heating region power correction coefficient $K_{WAI}$ is calculated according to the heat storage count value $CT_i$. Since the image heating region power correction coefficient $K_{WAI}$ decreases as the heat storage count value $CT_i$ increases. Therefore, the power $W_i$ actually supplied to the heating block $HB_i$ is reduced. Note that, the heating count TC value used for calculation of the heat storage count value $CT_i$ in Modification 1 is a value corresponding to the power $W_i$ actually supplied to the heating block $HB_i$, and is set so that TC becomes larger as $W_i$ is larger.

As described above, in Modification 1, the power supply amount is directly increased or decreased according to the heat storage amount to adjust the heat generating quantity of the heating block $HB_i$. Similarly to the method of increasing or decreasing the control target temperature $TGT_i$ according to the heat storage amount, it is possible to provide an image heating apparatus excellent in power saving performance.

Other Examples

In Examples 3 to 6, the control target temperature $TGT_i$ is obtained by adding or subtracting the correction term corresponding to the heat storage amount from the reference temperature, but correction may be made by other methods. For example, the control target temperature $TGT_i$ may be corrected by multiplying the coefficient according to the heat storage amount. Also, the temperature correction term $K_{AI}$ of image heating region, the temperature correction term $K_{AP}$ of non-image heating region, and the temperature correction term $K_{AN}$ of non-sheet passing heating region in Examples 3 to 6 are set as independent parameters, respectively. However, among them, a plurality of parameters may be common.

Also, in the example, the heat storage count value representing the heat storage amount corresponding to the thermal history is obtained by cumulatively adding the parameter values related to heating and heat radiation such as the TC, RMC, DC, and WUC. However, other methods may be used to obtain the heat storage amount according to the thermal history. For example, in the standby state in which the printing operation is not performed, the heat storage amount can be predicted from the time transition of the detected temperature of the thermistor. That is, by utilizing the phenomenon that the temperature of each member is hard to cool as the heat storage amount is larger, it is predicted that the smaller the variation amount of the thermistor detected temperature at the lapse of the predetermined time is, the larger the heat storage amount is, which thereby can be reflected in the control.

Also, in the examples, although the division number and divided position of the heating region $A_i$ and the heating block $HB_i$ are equally divided into seven, the effect of the present invention is not limited to this example. For example, it may be divided at a position matching the paper width end of a standard size such as JIS B5 paper (182 mm×257 mm), and A5 paper (148 mm×210 mm).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-131620, filed Jul. 1, 2016, No. 2016-131594, filed Jul. 1, 2016 which are hereby incorporated by reference herein in their entirety.

What is claimed is:

1. An image heating apparatus that heats an image formed on a recording material, the image heating apparatus comprising:

a tubular film arranged to contact the recording material, the tubular film including a base layer made of heat-resistant resin or metal, a rubber layer provided on an outer side of the base layer, and a releasing layer provided on a surface of the tubular film and made of heat-resistant resin;

a heater provided in an inner space of the tubular film, the heater having a plurality of heating elements arranged in a direction orthogonal to a conveying direction of the recording material;

a roller contacting an outer surface of the tubular film and configured to form a nip portion for conveying the recording material in cooperation with the heater via the tubular film, the roller includes a rubber layer;

a plurality of temperature detecting elements corresponding to the plurality of heating elements configured to detect a temperature of each of the plurality of heating elements; and a control portion configured to control electric power to be supplied to the plurality of heating elements, the control portion being capable of individually controlling electric power to be supplied to the plurality of heating elements so that each of the plurality of temperature detecting elements is maintained at a target temperature, wherein the control portion sets target temperatures corresponding to the plurality of heating elements when controlling each of the plurality of heating elements, according to a first thermal history of a first heating region heated by a first heating element among the plurality of heating elements, a second thermal history of a second heating region heated by a second heating element adjacent to the first heating element, and a density of the image formed on the recording material, the first thermal history of the first heating region heated by the first heating element and the second thermal history of the second heating region heated by the second heating element are variable according to a heat storage amount of the rubber layer of the film and a heat storage amount of the rubber layer of the roller, the control portion calculates a first heat storage amount in the first heating region according to a distance from a front end to a rear end of a first image on a first recording material heated by the first heating region, and calculates a second heat storage amount in the second heating region according to a distance from a front end to a rear end of a second image on the first recording material heated by the second heating region, and when a second recording material is conveyed to the nip portion after the first recording material, the control portion sets the target temperature of the first heating element according to the first heat storage amount and the second heat storage amount.

* * * * *